US010171866B2

(12) United States Patent
Kobayashi

(10) Patent No.: US 10,171,866 B2
(45) Date of Patent: Jan. 1, 2019

(54) DISPLAY SYSTEM, DISPLAY DEVICE, HEAD-MOUNTED DISPLAY DEVICE, DISPLAY CONTROL METHOD, CONTROL METHOD FOR DISPLAY DEVICE, AND COMPUTER PROGRAM

(71) Applicant: SEIKO EPSON CORPORATION, Tokyo (JP)

(72) Inventor: Shinichi Kobayashi, Azumino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 3 days.

(21) Appl. No.: 15/465,093

(22) Filed: Mar. 21, 2017

(65) Prior Publication Data
US 2017/0289615 A1    Oct. 5, 2017

(30) Foreign Application Priority Data

Mar. 29, 2016   (JP) ................................ 2016-064878
Mar. 29, 2016   (JP) ................................ 2016-064879

(51) Int. Cl.
*H04N 21/43* (2011.01)
*H04N 21/242* (2011.01)
*H04N 21/4363* (2011.01)
*H04N 5/765* (2006.01)

(52) U.S. Cl.
CPC ....... *H04N 21/43637* (2013.01); *H04N 5/765* (2013.01); *H04N 21/242* (2013.01); *H04N 21/4302* (2013.01)

(58) Field of Classification Search
CPC .......... H04N 21/43637; H04N 21/242; H04N 21/4302
See application file for complete search history.

(56) References Cited

U.S. PATENT DOCUMENTS

2012/0133733 A1*   5/2012   Sakaniwa .......... H04N 13/0025
                                                          348/43
2014/0104143 A1*   4/2014   Benson .................... G09G 5/00
                                                            345/8

FOREIGN PATENT DOCUMENTS

JP          2013-61521         4/2013

* cited by examiner

*Primary Examiner* — Yassin Alata
(74) *Attorney, Agent, or Firm* — Oliff PLC

(57) ABSTRACT

A display system includes a control device, a first display device, and a second display device. The control device includes a wireless communication section that wirelessly transmits video data. The first display device includes a wireless communication section that receives the video data and an OLED unit that displays a video on the basis of the video data. The second display device includes a wireless communication section that receives the video data and an OLED unit that displays a video on the basis of the video data. The display system detects deviation between the videos displayed by the OLED units.

19 Claims, 35 Drawing Sheets

DISPLAY SYSTEM, DISPLAY DEVICE, HEAD-MOUNTED DISPLAY DEVICE, DISPLAY CONTROL METHOD, CONTROL METHOD FOR DISPLAY DEVICE, AND COMPUTER PROGRAM

BACKGROUND

1. Technical Field

The present invention relates to a display system, a display device, a head-mounted display device, a display control method, a control method for the display device, and a computer program.

2. Related Art

There has been known a display device that receives a video signal and displays a video (see, for example, JP-A-2013-61521 (Patent Literature 1). A head mounted display described in Patent Literature 1 displays an image on the basis of a video signal received by a HDMI (registered trademark) receiver.

It is possible to transmit video signals to, for example, one device to a plurality of display devices using a HDMI (High-Definition Multimedia Interface) and various communication means. In such a configuration, there is no example in which videos displayed by the respective display devices are matched.

SUMMARY

An advantage of some aspects of the invention is to provide a display system, a display device, a display control method, a control method for a display device, and a computer program that enable a plurality of display devices to display matched videos.

An aspect of the invention is directed to a display system including: a transmitting device configured to transmit video data; and a first display device and a second display device configured to display videos on the basis of the video data transmitted by the transmitting device. The transmitting device includes a data transmitting section configured to wirelessly transmit the video data formed by continuous frames to the first display device and the second display device. The first display device includes: a first video receiving section configured to receive the video data transmitted by the transmitting device; and a first display section configured to display a video on the basis of the video data received by the first video receiving section. The second display device includes: a second video receiving section configured to receive the video data transmitted by the transmitting device; and a second display section configured to display a video on the basis of the video data received by the second video receiving section. The display system detects deviation between the video displayed by the first display section and the video displayed by the second display section.

According to the aspect of the invention, when the transmitting device transmits the video data to the plurality of display devices, it is possible to detect deviation between the videos displayed by the plurality of display devices. Therefore, for example, since it is possible to detect deviation between timings for displaying the videos, it is possible to match the videos displayed by the plurality of display devices by taking measures against the deviation of this type.

Another aspect of the invention is directed to the display system described above, in which the first display device includes a first inter-device communication section configured to communicate with the second display device, the second display device includes a second inter-device communication section configured to communicate with the first display device, and the first inter-device communication section included in the first display device and the second inter-device communication section included in the second display device execute the communication to detect the deviation between the video displayed by the first display section and the video displayed by the second display section.

According to the aspect of the invention, when the transmitting device transmits the video data to the plurality of display devices, it is possible to detect deviation between the videos displayed by the plurality of display devices. Therefore, for example, since it is possible to detect deviation between timings for displaying the videos, it is possible to match the videos displayed by the plurality of display devices by taking measures against the deviation of this type.

Another aspect of the invention is directed to the display system described above, in which the transmitting device transmits the video data formed by frames, the first display device displays the video with the first display section in units of frames on the basis of the video data received by the first video receiving section, the second display device displays the video with the second display section in units of frames on the basis of the video data received by the second video receiving section, and the first inter-device communication section and the second inter-device communication section execute the communication to detect deviation between the frame displayed by the first display section and the frame displayed by the second display section.

According to the aspect of the invention, it is possible to detect deviation between the frames displayed by the plurality of display devices. Therefore, it is possible to match display timings of the videos displayed by the plurality of display devices.

Another aspect of the invention is directed to the display system described above, in which the transmitting device transmits the video data and frame identification information for identifying the respective frames of the video data, and the first inter-device communication section and the second inter-device communication section execute the communication to compare frame identification information of the frame displayed by the first display section and frame identification information of the frame displayed by the second display section and detect deviation.

According to the aspect of the invention, since it is possible to identify the frames transmitted by the transmitting section, it is possible to more accurately detect deviation between the frames displayed by the plurality of display devices.

Another aspect of the invention is directed to the display system described above, in which the first display device transmits data including the frame identification information of the frame displayed by the first display section to the second display device with the first inter-device communication section, and the second display device receives the data transmitted by the first display device with the second inter-device communication section, compares the frame identification information included in the data received by the second inter-device communication section with the frame identification information of the frame displayed by the second display section, and detects deviation.

According to the aspect of the invention, by transmitting the frame identification information from one display device to the other display device, it is possible to surely detect, in the other display device, deviation between the frames displayed by the plurality of display devices.

Another aspect of the invention is directed to the display device described above, in which, when the frame displayed by the first display section is a frame transmitted by the transmitting device later than the frame displayed by the second display section, the second display device resets display of the frames received by the first video receiving section and displays, with the first display section, the frames received by the first video receiving section next.

According to the aspect of the invention, when deviation is present between the frames displayed by the two display devices, display of a display device on a display side of an old frame, that is, a display device on a delayed display side is reset. Consequently, it is possible to eliminate the deviation between the frames displayed by the plurality of display devices.

Another aspect of the invention is directed to the display system described above, in which, when the frame displayed by the first display section is a frame transmitted by the transmitting device later than the frame displayed by the second display section, the second display device stops the display of the second display section.

According to the aspect of the invention, when deviation is present between the frames displayed by the two display devices, it is possible to stop display of the display device on the display side of an old frame, that is, the display device on the delayed display side. Consequently, it is possible to avoid a state in which the plurality of display devices continue the display in a state in which the frames deviate.

Another aspect of the invention is directed to the display system described above, in which the first display device includes a storing section configured to store the frames received by the first video receiving section, and, when the frame displayed by the first display section is a frame transmitted by the transmitting device later than the frame displayed by the second display section, the first display device displays the frames stored in the storing section a plurality of times with the first display section.

According to the aspect of the invention, when deviation is present between the frames displayed by the two display devices, a display device on a display side of a new frame, that is, a display device on an advanced display side displays the same frame a plurality of times. Consequently, it is possible to eliminate advance of the frame to be displayed and eliminate deviation between the frames displayed by the plurality of display devices.

Another aspect of the invention is directed to the display system described above, in which the first display device includes a storing section configured to store the frames received by the first video receiving section, and, when the frame displayed by the first display section is a frame transmitted by the transmitting device later than the frame displayed by the second display section, the first display device stops the display by the first display section by time equivalent to time for displaying a predetermined number of the frames and thereafter displays the frames stored in the storing section with the first display section.

According to the aspect of the invention, when deviation is present between the frames displayed by the two display devices, the display device on the display side of a new frame, that is, the display device on the advanced display side stops the display and eliminates advance of the frame to be displayed. Consequently, it is possible to eliminate the deviation between the frames displayed by the plurality of display devices.

Another aspect of the invention is directed to the display system, in which the first display device includes a first transmitting section configured to transmit information related to the video displayed by the first display section to the transmitting device, the second display device includes a second transmitting section configured to transmit information related to the video displayed by the second display section to the transmitting device, and the transmitting device includes a control section configured to detect, on the basis of the information transmitted by the first display device and the second display device, deviation between the video displayed by the first display section and the video displayed by the second display section.

According to the aspect of the invention, when the transmitting device transmits video data to the plurality of display devices, it is possible to detect deviation between videos displayed by the plurality of display devices. Therefore, for example, since it is possible to detect deviation between timings for displaying the videos, it is possible to match the videos displayed by the plurality of display devices by taking measures against such deviation.

Another aspect of the invention is directed to the display system described above, in which the transmitting device transmits the video data formed by the frames, the first display device displays the video with the first display section in units of frames on the basis of the video data received by the first video receiving section, the second display device displays the video with the second display section in units of frames on the basis of the video data received by the second video receiving section, and the control section included in the transmitting device detects deviation between the frame displayed by the first display section and the frame displayed by the second display section.

According to the aspect of the invention, it is possible to detect deviation between the frames displayed by the plurality of display devices. Therefore, it is possible to match display timings of the videos displayed by the plurality of display devices.

Another aspect of the invention is directed to the display system described above, in which the transmitting device transmits the video data and frame identification information for identifying the respective frames of the video data, the first display device transmits, with the first transmitting section, the frame identification information of the frame displayed by the first display section, the second display device transmits, with the second transmitting section, the frame identification information of the frame displayed by the second display section, and the control section included in the transmitting device detects, on the basis of the frame identification information transmitted by the first display device and the frame identification information transmitted by the second display device, deviation between the frame displayed by the first display section and the frame displayed by the second display section.

According to the aspect of the invention, it is possible to identify the frames transmitted by the transmitting device. Therefore, it is possible to more accurately detect deviation between the frames displayed by the plurality of display devices.

Another aspect of the invention is directed to the display system described above, in which, when the frame displayed by the first display section is a frame transmitted from the transmitting device later than the frame displayed by the second display section, the transmitting device transmits the video data corresponding to the frame displayed by the first display section to the second display device.

According to the aspect of the invention, when deviation is present between the frames displayed by the two display devices, the display system causes the display device on the display side of an old frame to display the frame displayed by the display device on the display side of a new frame. That is, the display system transmits the frame displayed by the display device on the advanced display side to the display device on the delayed display side. Consequently, it is possible to eliminate the deviation between the frames displayed by the plurality of display devices.

Another aspect of the invention is directed to the display system described above, in which, when the frame displayed by the first display section is a frame transmitted from the transmitting device later than the frame displayed by the second display section, the transmitting device transmits control data for instructing a stop of the display of the first display section to the second display device.

According to the aspect of the invention, when deviation is present between the frames displayed by the two display devices, the display system stops the display of the display device on the display side of a new frame, that is, the display device on the advanced display side. Consequently, it is possible to avoid a state in which the plurality of display devices continue the display in a state in which the frames deviate.

Another aspect of the invention is directed to the display system described above, in which, when the frame displayed by the first display section is a frame transmitted from the transmitting device later than the frame displayed by the second display section, the transmitting device transmits the video data corresponding to the frame displayed by the second display section to the first display device.

According to the aspect of the invention, when deviation is present between the frames displayed by the two display devices, the display system causes the display device on the display side of a new frame to display the frame displayed by the display device on the display side of an old frame. That is, the display system transmits the frame to the display device on the advanced display side according to the display device on the delayed display side and causes the display device on the advanced display side to display the frame. Consequently, it is possible to eliminate the deviation between the frames displayed by the plurality of display devices.

Another aspect of the invention is directed to the display system described above, in which, when the frame displayed by the first display section is a frame transmitted from the transmitting device later than the frame displayed by the second display section, the transmitting device transmits control data for instructing a stop of the display of the second display section to the first display device.

According to the aspect of the invention, when deviation is present between the frames displayed by the two display devices, the display system stops the display of the display device on the display side of an old frame, that is, the display device on the delayed display side. Consequently, it is possible to avoid a state in which the plurality of display devices continue the display in a state in which the frames deviate.

Another aspect of the invention is directed to a display device that displays a video, the display device including: a video receiving section configured to receive wirelessly-transmitted video data; a display section configured to display a video on the basis of the video data received by the video receiving section; an inter-device communication section configured to communicate with another display device; and a control section configured to execute, through the inter-device communication section, the communication with the other display device and detect deviation between the video displayed by the display section and a video displayed by the other display device.

According to the aspect of the invention, the display device can detect the deviation between the video displayed by the display device and the video displayed by the other display device. Therefore, for example, since it is possible to detect deviation between timings for displaying the videos, it is possible to match the videos displayed by the plurality of display devices by taking measures against the deviation of this type.

Another aspect of the invention is directed to the display device described above, in which the display device displays, with the display section, in units of frames, an image based on the video data received by the video receiving section, and the control section detects deviation between the frame displayed by the display section and the frame displayed by the other display device.

According to the aspect of the invention, it is possible to detect the deviation between the frame displayed by the display device and the frame displayed by the other display device. Therefore, it is possible to match display timings of the videos displayed by the plurality of display devices.

Another aspect of the invention is directed to the display device described above, in which the display device receives, with the video receiving section, frame identification information for identifying the respective frames included in the video data.

According to the aspect of the invention, it is possible to identify the frames received and displayed by the display device. Therefore, it is possible to more accurately detect deviation between the frames displayed by the plurality of display devices.

Another aspect of the invention is directed to the display device described above, in which the control section detects deviation by comparing the frame identification information of the frame displayed by the display section and the frame identification information of the frame displayed by the other display device.

According to the aspect of the invention, it is possible to identify the frames transmitted by the transmitting device. Therefore, it is possible to more accurately detect deviation between the frames displayed by the plurality of display devices.

Another aspect of the invention is directed to the display device described above, in which the display device receives, through the inter-device communication section, the frame identification information of the frame displayed by the other display device, and the control section detects deviation by comparing the frame identification information of the frame displayed by the other display device received by the inter-device communication section with the frame identification information of the frame displayed by the display section.

According to the aspect of the invention, since the display device transmits and receives the frame identification information, it is possible to surely detect deviation between the frames displayed by the plurality of display devices.

Another aspect of the invention is directed to the display device described above, in which the display device transmits, through the inter-device communication section, the frame identification information of the frame displayed by the display section to the other display device.

According to the aspect of the invention, since the display device transmits and receives the frame identification information, it is possible to surely detect deviation between the frames displayed by the plurality of display devices.

Another aspect of the invention is directed to a head-mounted display device mounted on a head of a user, the head-mounted display device including a first display device and a second display device configured to receive video data and display videos on the basis of the received video data. The first display device includes: a first video receiving section configured to receive the video data; a first display section configured to cause, on the basis of the video data received by the first video receiving section, one eye of the user to visually recognize the video; and a first inter-device communication section configured to communicate with the second display device. The second display device includes: a second video receiving section configured to receive the video data; a second display section configured to cause, on the basis of the video data received by the second video receiving section, the other eye of the user to visually recognize a video; and a second inter-device communication section configured to communicate with the first display device. The first inter-device communication section included in the first display device and the second inter-device communication section included in the second display device execute the communication to detect deviation between the videos visually recognized by a right eye and a left eye of the user.

According to the aspect of the invention, in a configuration in which the video data is transmitted to the head-mounted display device and the head-mounted display device causes the user to visually recognize the videos on the basis of the video data, it is possible to detect deviation between the videos visually recognized by the respective left and right eyes of the user. Therefore, for example, since it is possible to detect deviation between timings for displaying the videos, it is possible to match the videos visually recognized by the user by taking measures against the deviation of this type. It is possible to prevent or reduce a sense of discomfort of the user involved in the deviation between the videos and so-called visually induced motion sickness.

Another aspect of the invention is directed to a head-mounted display device mounted on a head of a user, the head-mounted display device including a first display device and a second display device configured to receive video data transmitted by a transmitting device and display videos on the basis of the received video data. The first display device includes: a first video receiving section configured to receive the video data transmitted by the transmitting device; a first display section configured to cause, on the basis of the video data received by the first video receiving section, one eye of the user to visually recognize a video; and a first transmitting section configured to transmit information related to the video displayed by the first display section to the transmitting device. The second display device includes: a second video receiving section configured to receive the video data transmitted by the transmitting device; a second display section configured to cause, on the basis of the video data received by the second video receiving section, the other eye of the user to visually recognize a video; and a second transmitting section configured to transmit information related to the video displayed by the second display section to the transmitting device.

According to the aspect of the invention, when the videos based on the video data are displayed to cause both the eyes of the user to visually recognize the videos by the head-mounted display device mounted on the head of the user, it is possible to provide the information concerning the videos displayed by the first and second display devices to the transmitting device that transmits the video data. Therefore, the transmitting device can detect display states in the first and second display devices and detect, for example, deviation between the videos displayed by the display devices. Therefore, for example, since it is possible to detect deviation between timings for displaying the videos, it is possible to match the videos displayed by the plurality of display devices by taking measures against the deviation of this type.

Another aspect of the invention is directed to a display control method in a display system including a transmitting device that transmits video data and a first display device and a second display device that display videos on the basis of the video data transmitted by the transmitting device, the display control method including: the transmitting device wirelessly transmitting the video data formed by continuous frames to the first display device and the second display device; the first display device receiving the video data transmitted by the transmitting device and displaying a video with a first display section on the basis of the received video data; the second display device receiving the video data transmitted by the transmitting device and displaying a video with a second display section on the basis of the received video data; and detecting deviation between the video displayed by the first display section and the video displayed by the second display section.

According to the aspect of the invention, when the transmitting device transmits the video data to the plurality of display devices, it is possible to detect deviation between the videos displayed by the plurality of display devices. Therefore, for example, since it is possible to detect deviation between timings for displaying the videos, it is possible to match the videos displayed by the plurality of display devices by taking measures against the deviation of this type.

Another aspect of the invention is directed to the display control method described above, in which the display control method further includes: the first display device communicating with the second display device in a first inter-device communication section; and the second display device communicating with the first display device in a second inter-device communication section, and the first inter-device communication section and the second inter-device communication section execute the communication to detect the deviation between the video displayed by the first display section and the video displayed by the second display section.

According to the aspect of the invention, when the transmitting device transmits the video data to the plurality of display devices, it is possible to detect deviation between the videos displayed by the plurality of display devices. Therefore, for example, since it is possible to detect deviation between timings for displaying the videos, it is possible to match the videos displayed by the plurality of display devices by taking measures against the deviation of this type.

Another aspect of the invention is directed to the display control method described above, in which the display control method further includes: the first display device transmitting information related to the video displayed by the first display section to the transmitting device; the second display device transmitting information related to the video displayed by the second display section to the transmitting device; and the transmitting device detecting, on the basis of the information transmitted by the first display device and the second display device, deviation between the video displayed by the first display section and the video displayed by the second display section.

According to the aspect of the invention, when the transmitting device transmits the video data to the plurality of display devices, it is possible to detect deviation between the videos displayed by the plurality of display devices. Therefore, for example, since it is possible to detect deviation between timings for displaying the videos, it is possible to match the videos displayed by the plurality of display devices by taking measures against the deviation of this type.

Another aspect of the invention is directed to a control method for a display device that receives wirelessly-transmitted video data and displays a video with a display section on the basis of the video data, the control method including executing communication with another display device and detecting deviation between the video displayed by the display section and a video displayed by the other display device.

By executing the control method according to the aspect of the invention, the display device can detect deviation between the video displayed by the display device and the video displayed by the other display device. Therefore, for example, since it is possible to detect deviation between timings for displaying the videos, it is possible to match the videos displayed by the plurality of display devices by taking measures against the deviation of this type.

Another aspect of the invention is directed to a computer program executable by a computer that controls a display device that receives wirelessly-transmitted video data and displays a video with a display section on the basis of the video data, the computer program causing the computer to execute communication with another display device and detect deviation between the video displayed by the display section and a video displayed by the other display device.

By executing the computer program according to the aspect of the invention, the display device can detect deviation between the video displayed by the display device and the video displayed by the other display device. Therefore, for example, since it is possible to detect deviation between timings for displaying the videos, it is possible to match the videos displayed by the plurality of display devices by taking measures against the deviation of this type.

Another aspect of the invention is directed to a computer program executable by a computer that controls a transmitting device that transmits video data to a first display device and a second display device, the computer program causing the computer to: wirelessly transmit the video data formed by continuous frames to the first display device and the second display device; receive, from the first display device, information related to a video displayed by a first display section included in the first display device; receive, from the second display device, information related to a video displayed by a second display section included in the second display device; and detect, on the basis of the information received from the first display device and the second display device, deviation between the video displayed by the first display section and the video displayed by the second display section.

According to the aspect of the invention, when the transmitting device transmits the video data to the plurality of display devices, it is possible to detect deviation between the videos displayed by the plurality of display devices. Therefore, for example, since it is possible to detect deviation between timings for displaying the videos, it is possible to match the videos displayed by the plurality of display devices by taking measures against the deviation of this type.

The invention can also be implemented in various forms other than the display system, the display devices, the display method, the control method for the display device, and the computer programs explained above. For example, the invention can be implemented in forms of a recording medium in which the computer programs are recorded, a server device that distributes the computer programs, a transmission medium for transmitting the computer programs, a data signal obtained by embodying the computer programs in a carrier wave.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

Figure 1:
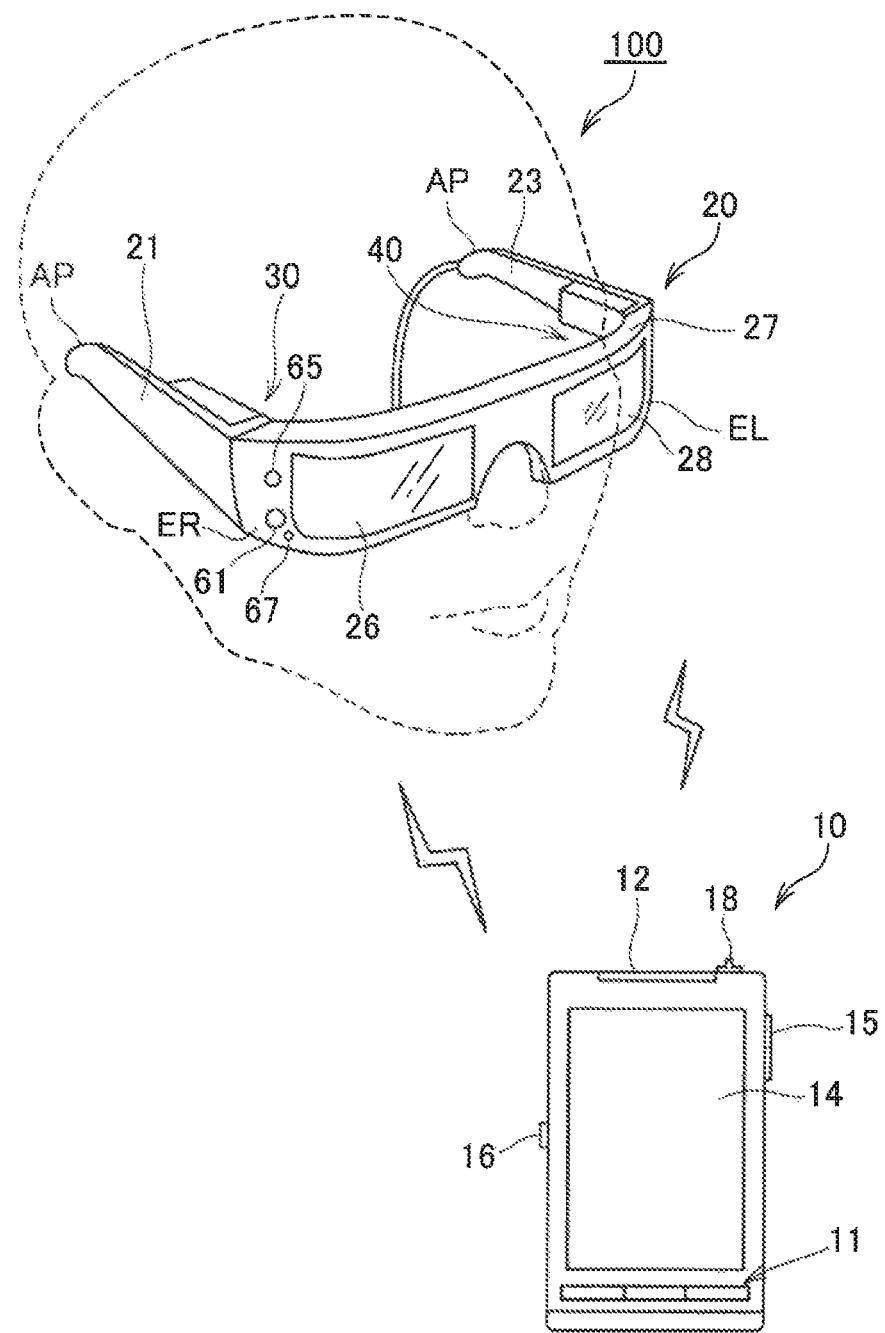
FIG. 1 is an explanatory diagram showing the exterior configuration of a display system in a first embodiment.

FIG. 1 is an explanatory diagram showing the configuration of a display system 100 according to a first embodiment applied with the invention. The display system 100 includes a HMD (Head Mounted Display) 20 that causes a user to visually recognize a virtual image in a state in the HMD 20 is worn on the head of the user and a control device 10 (a transmitting device) connected to the HMD 20 by wireless communication.

The control device 10 includes various buttons, switches, and a track pad 14 that receive operation by the user. The control device 10 functions as a controller with which the user operates the display system 100.

The HMD 20 is a wearing body worn on the head of the user. In this embodiment, the HMD 20 has an eyeglass shape. In the HMD 20, a first display device 30 and a second display device 40 are attached to a main body including a right holding section 21, a left holding section 23, and a front frame 27. The HMD 20 is seen as an eyeglass-type integrated device in appearance. However, in the HMD 20, the first display device 30 and the second display device 40, which are different devices, are attached to an eyeglass-type frame. The first display device 30 that causes the right eye of the user to visually recognize an image and the second display device 40 that causes the left eye to visually recognize the image are devices independent from each other.

The right holding section 21 and the left holding section 23 respectively extend backward from both end portions of the front frame 27 and, like temples of glasses, hold the HMD 20 on the head of the user. Of both the end portions of the front frame 27, an end portion located on the right side of the user in the worn state of the HMD 20 is referred to as end portion ER. An end portion located on the left side of the user is referred to as end portion EL. The right holding section 21 is provided to extend from the end portion ER of the front frame 27 to a position corresponding to the right temporal region of the user in the worn state of the HMD 20. The left holding section 23 is provided to extend from the end portion EL to a position corresponding to the left temporal region of the user in the worn state of the HMD 20.

The first display device 30 is located on the right side when viewed from the user in the worn state in which the user wears the HMD 20. The first display device 30 is disposed to be fixed to the right holding section 21 and the front frame 27. The second display device 40 is located on the left side when viewed from the user in the worn state of the HMD 20. The second display device 40 is disposed to be fixed to the left holding section 23 and the front frame 27.

A right light guide plate 26, which is an optical member included in the first display device 30, and a left light guide plate 28, which is an optical member included in the second display device 40, are fixed to the front frame 27. The right light guide plate 26 is located in front of the right eye of the user in the worn state of the HMD 20 and causes the right eye to visually recognize an image. The left light guide plate 28 is located in front of the left eye of the user in the worn state of the HMD 20 and causes the left eye to visually recognize the image.

The right light guide plate 26 and the left light guide plate 28 in this embodiment are optical components such as prisms formed of light-transmissive resin or the like. As explained below, the right light guide plate 26 and the left light guide plate 28 guide image light to the eyes of the user and cause the eyes to visually recognize an image. Dimming plates (not shown in the figure) functioning as wavelength filters may be provided on the surfaces of the right light guide plate 26 and the left light guide plate 28. In this case, by selecting optical characteristics of the dimming plates as appropriate, it is possible to adjust transmittance of light in any wavelength region such as visible light, an infrared ray, or an ultraviolet ray. It is possible to adjust a light amount of external light made incident on the right light guide plate 26 and the left light guide plate 28 from the outside and transmitted through the right light guide plate 26 and the left light guide plate 28.

The front frame 27 has a shape obtained by coupling one end of the right light guide plate 26 and one end of the left light guide plate 28 each other. A position of the coupling corresponds to the middle of the forehead of the user in the worn state in which the user wears the HMD 20. In the front frame 27, a nose pad section in contact with the nose of the user in the worn state of the HMD 20 may be provided in the coupling position of the right light guide plate 26 and the left light guide plate 28. In this case, the HMD 20 can be held on the head of the user by the nose pad section and the right holding section 21 and the left holding section 23. A belt (not shown in the figure) in contact with the back of the head of the user in the worn state of the HMD 20 may be coupled to the right holding section 21 and the left holding section 23. In this case, the HMD 20 can be held on the head of the user by the belt.

A camera 61 (an image pickup section) is disposed in the front frame 27 of the HMD 20. In an example shown in FIG. 1, on the front surface of the front frame 27, the camera 61 is disposed on the end portion ER side of the front frame 27 not to block the external light transmitted through the right light guide plate 26 and the left light plate 28. The camera 61 may be disposed on the end portion EL side or may be disposed in a coupling section of the right light guide plate 26 and the left light guide plate 28.

The camera 61 is a digital camera including an image pickup device such as a CCD or a CMOS and an image pickup lens. The camera 61 in this embodiment is a monocular camera but may a stereo camera. The camera 61 picks up an image of at least a part of an outside scene (a real space) in a front side direction of the HMD 20, in other words, a field of view direction of the user in the state in which the HMD 20 is worn. In another expression, the camera 61 can also be considered to pick up an image in a range or a direction overlapping a field of view of the user and pick up an image in a direction in which the user gazes. The breadth of an angle of view of the camera 61 can be set as appropriate. However, in this embodiment, as explained below, the angle of view includes an outer world visually recognized by the user through the right light guide plate 26 and the left light guide plate 28. More desirably, an image pickup range of the camera 61 is set such that an image of the entire field of view of the user visually recognizable through the right light guide plate 26 and the left light guide plate 28 can be picked up.

In this embodiment, the camera 61 configures a part of the first display device 30. The camera 61 executes image pickup according to control by a control section 310 (FIG. 7) of the first display device 30 and outputs picked-up image data.

Figure 2:
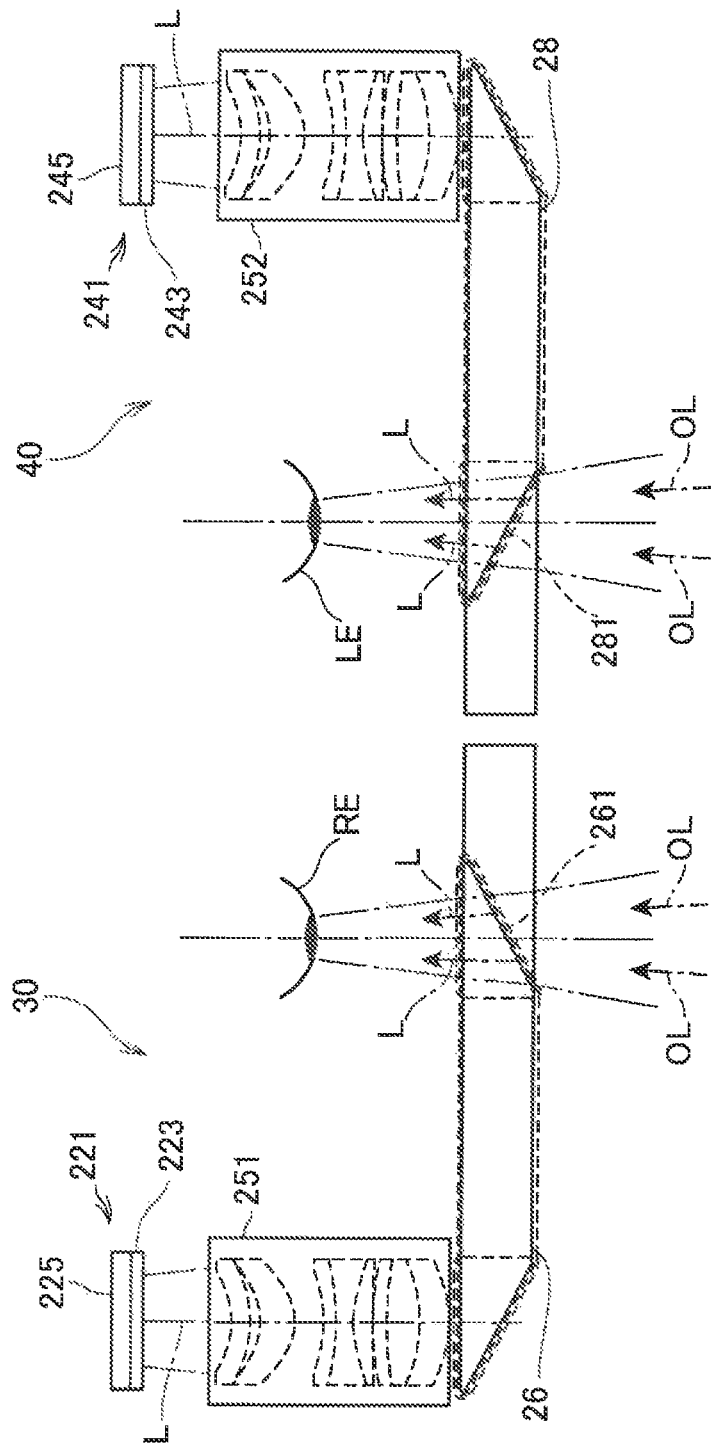
FIG. 2 is a diagram showing the configuration of optical systems of a first display device and a second display device.

FIG. 2 is a main part plan view showing the configuration of an optical system included in the HMD 20. In FIG. 2, for explanation, a left eye LE and a right eye RE of the user are shown.

In the HMD 20, the first display device 30 and the second display device 40 respectively cause the right eye RE and the left eye EL to visually recognize an image.

The first display device 30 includes an OLED (Organic Light Emitting Diode) unit 221 that emits image light. The first display device 30 includes a right optical system 251 including a lens group that guides image light L emitted by the OLED unit 221. The image light L is guided to the right light guide plate 26 by the right optical system 251.

The OLED unit 221 includes an OLED panel 223 and an OLED driving circuit 225 that drives the OLED panel 223. The OLED panel 223 is a spontaneous light emitting display panel configured by arranging, in a matrix shape, light emitting elements that respectively emit color lights of R (red), G (green), and B (blue) with organic electroluminescence. The OLED panel 223 includes a plurality of pixels in units of one pixel including one each of R, G, and B pixels and forms an image with the pixels arranged in the matrix shape. The OLED driving circuit 225 executes, according to control by a control section 150 (FIG. 6), selection of the light emitting elements included in the OLED panel 223 and energization to the light emitting elements and causes the light emitting elements of the OLED panel 223 to emit lights. The OLED driving circuit 225 is fixed to the rear surface of the OLED panel 223, that is, the rear side of a light emission surface by bonding or the like. The OLED driving circuit 225 may be configured by, for example, a semiconductor device that drives the OLED panel 223 and mounted on a substrate (not shown in the figure) fixed to the rear surface of the OLED panel 223. A temperature sensor 238 is mounted on the substrate.

Note that the OLED panel 223 may be configured by arranging light emitting elements, which emit white light, in a matrix shape and arranging color filters corresponding to the colors of R, G, and B to be superimposed on the light emitting elements. the OLED panel 223 of a WRGB configuration including light emitting elements that emit white (W) light in addition to the light emitting elements that respectively emit the color lights of R, G, and B, may be used.

The right optical system 251 includes a collimate lens that changes the image light L emitted from the OLED panel 223 to light beams in a parallel state. The image light L changed to the light beams in the parallel state by the collimate lens is made incident on the right light guide plate 26. In an optical path for guiding light on the inside of the right light guide plate 26, a plurality of reflection surfaces for reflecting the image light L are formed. The image light L is guided to the right eye RE side through a plurality of times of reflection on the inside of the right light guide plate 26. In the right light guide plate 26, a half mirror 261 (a reflection surface) located in front of the right eye RE is formed. The image light L is reflected by the half mirror 261 and emitted from the right light guide plate 26 toward the right eye RE. The image light L forms an image on the retina of the right eye RE and causes the user to visually recognize the image.

The second display device 40 includes an OLED unit 241 that emits image light and a left optical system 252 including a lens group that guides the image light L emitted by the OLED unit 241. The image light L is guided to the left light guide plate 28 by the left optical system 252.

The OLED unit 241 includes an OLED panel 243 and an OLED driving circuit 245 that drives the OLED panel 243. The OLED panel 243 is a spontaneous light emitting display panel configured the same as the OLED panel 223. The OLED driving circuit 245 executes, according to the control by the control section 150 (FIG. 6), selection of the light emitting elements included in the OLED panel 243 and energization to the light emitting elements and causes the light emitting elements of the OLED panel 243 to emit lights. The OLED driving circuit 245 is fixed to the rear surface of the OLED panel 243, that is, the rear side of a light emission surface by bonding or the like. The OLED driving circuit 245 may be configured by, for example, a semiconductor device that drives the OLED panel 243 and mounted on a substrate (not shown in the figure) fixed to the rear surface of the OLED panel 243. A temperature sensor 239 is mounted on the substrate.

The left optical system 252 includes a collimate lens that changes the image light L emitted from the OLED panel 243 to light beams in a parallel state. The image light L changed to the light beams in the parallel state by the collimate lens is made incident on the left light guide plate 28. The left light guide plate 28 is an optical element on which a plurality of reflection surfaces for reflecting the image light L are formed and is, for example, a prism. The image light L is guided to the left eye LE side through a plurality of times of reflection on the inside of the left light guide plate 28. On the left light guide plate 28, a half mirror 281 (a reflection surface) located in front of the left eye LE is formed. The image light L is reflected by the half mirror 281 and emitted from the left light guide plate 28 toward the left eye LE. The image light L forms an image on the retina of the left eye LE and causes the user to visually recognize the image.

The HMD 20 functions as a see-through type display device. That is, the image light L reflected by the half mirror 261 and external light OL transmitted through the right light guide plate 26 are made incident on the right eye RE of the user. The image light L reflected by the half mirror 281 and the external light OL transmitted through the half mirror 281 are made incident on the left eye EL. In this way, the HMD 20 makes the image light L of the image processed on the inside and the external light OL incident on the eyes of the user to be superimposed one on top of the other. For the user, an outside scene is seen through the right light guide plate 26 and the left light guide plate 28. An image formed by the image light L is visually recognized to be superimposed on the outside scene.

The half mirror 261 is an image extracting section that reflects image light output by the first display device 30 and extracts an image. The half mirror 261 can be considered a display section. The half mirror 281 is an image extracting section that reflects image light output by the second display device 40 and extracts an image. The half mirror 281 can be considered a display section.

Note that the right optical system 251 and the right light guide plate 26 can be collectively referred to as "right light guide section" as well. The left optical system 252 and the left light guide plate 28 can be collectively referred to as "left light guide section" as well. The configuration of the right light guide section and the left light guide section is not limited to the example explained above. Any system can be used as long as the right light guide section and the left light guide section form a virtual image in front of the eyes of the user using image light. For example, a diffraction grating may be used or a transreflective film may be used.

Referring back to FIG. 1, the control device 10 and the HMD 20 are connected by a wireless communication line and can transmit and receive various data including image data.

The control device 10 includes, as operated sections operated by the user, buttons 11, an LED indicator 12, a track pad 14, up-down keys 15, a changeover switch 16, and a power switch 18.

The buttons 11 include a menu key, a home key, and a return key for performing, for example, operation of an operating system 143 (FIG. 6) executed by the control device 10 and include, in particular, keys and switches displaced by pressing operation among the keys and the switches. The LED indicator 12 lights or flashes according to an operation state of the control device 10. The up-down keys 15 are used to input an instruction for increasing and reducing volume output from an earphone (not shown in the figure) and input an instruction for increasing and reducing brightness of display of the HMD 20. The changeover switch 16 is a switch for switching an input corresponding to operation of the up-down keys 15. The power switch 18 is a switch for switching on/off of a power supply of the control device 10 and is configured by, for example, a slide switch.

The track pad 14 includes an operation surface for detecting contact operation and outputs an operation signal according to operation on the operation surface. A detection type on the operation surface is not limited. An electrostatic type, a pressure detection type, an optical type, and the like can be adopted.

Although not shown in the figure, the control device 10 includes a touch operation section that detects touch operation. The touch operation section does not include switches and the like displaced by operation. For example, icons indicating operation positions and operation contents are disposed by display on a screen or printing. Contact (touch operation) on the touch operation section is detected by a touch sensor 13 (FIG. 5) explained below.

Figure 3:
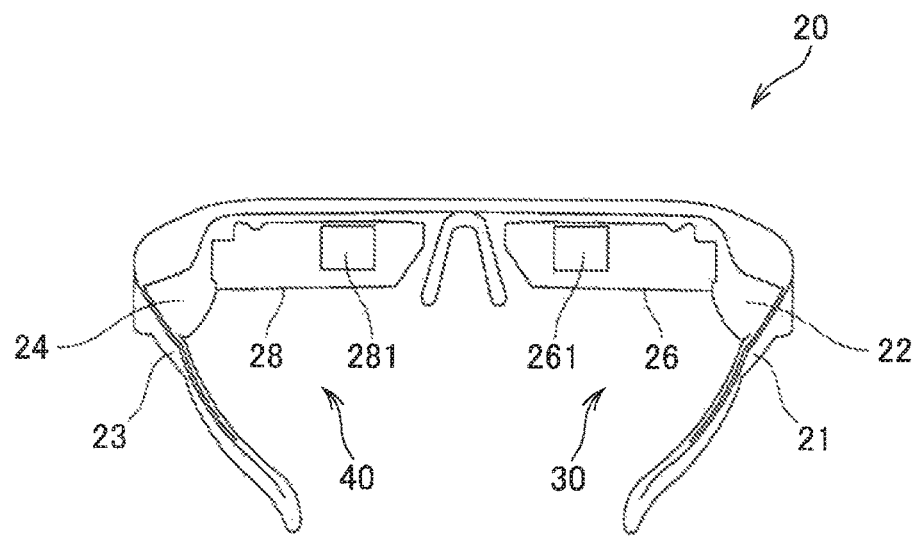
FIG. 3 is a diagram showing display regions of the first display device and the second display device.
Figure 4:
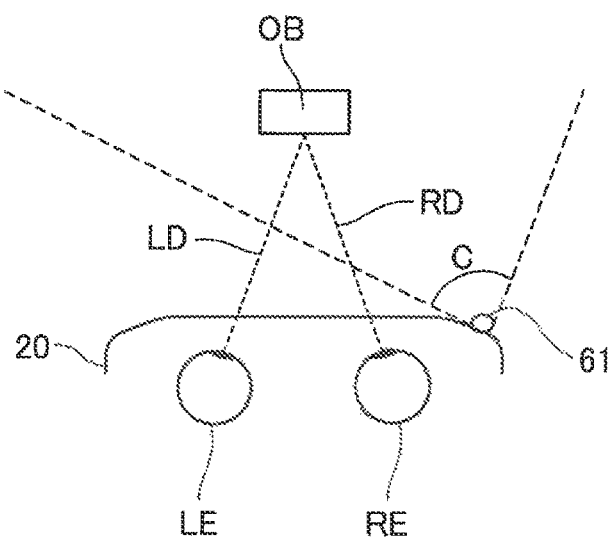
FIG. 4 is an explanatory diagram showing correspondence between an image pickup range of a camera and a real field of view.

FIGS. 3 and 4 are diagrams showing a main part configuration of the HMD 20. FIG. 3 is a main part perspective view of the HMD 20 viewed from the head side of the user. FIG. 4 is an explanatory diagram of an angle of view of the camera 61.

FIG. 3 shows a side in contact with the head of the user of the HMD 20, in other words, a side seen for the right eye RE and the left eye LE of the user. In other words, the rear sides of right light guide plate 26 and the left light guide plate 28 are seen.

In FIG. 3, the half mirror 261 that radiates image light on the right eye RE of the user and the half mirror 281 that radiates image light on the left eye LE are seen as substantially square regions. The entire right light guide plate 26 and the entire left light guide plate 28 including the half mirrors 261 and 281 transmit the external light as explained above. Therefore, for the user, an outside scene is visually recognized through the entire right light guide plate 26 and the left light guide plate 28. Rectangular display images are visually recognized in the positions of the half mirrors 261 and 281.

In this way, the first display device 30 causes the user to visually recognize an image with the rectangular display region formed by the half mirror 261. The second display device 40 causes the user to visually recognize the image with the rectangular display region formed by the half mirror 281. The half mirror 261 is equivalent to an image display region of the first display device 30. The half mirror 281 is equivalent to an image display region of the second display device 40.

FIG. 4 is a diagram schematically showing the position of the camera 61 in plan view together with the right eye RE and the left eye LE of the user. An angle of view (an image pickup range) of the camera 61 is indicated by C. Note that the angle of view C in the horizontal direction is shown in FIG. 4. However, an actual angle of view of the camera 61 expands in the up-down direction as well like a general digital camera.

The optical axis of the camera 61 is set in a direction including a visual line direction of the right eye RE and the left eye LE. An outside scene that the user can visually recognize in the worn state of the HMD 20 is not limited to infinity. For example, as shown in FIG. 4, when the user gazes a target object OB with both the eyes, a visual line of the user is directed to the target object OB as indicated by signs RD and LD in the figure. In this case, the distance from the user to the target object OB is often approximately 30 cm to 10 m and is more often approximately 1 m to 4 m. Therefore, concerning the control device 10, standards of an upper limit and a lower limit of the distance from the user to the target object OB during normal use may be set. The standards may be calculated by an investigation or an experiment or may be set by the user. The optical axis and the angle of view of the camera 61 are desirably set such that the target object OB is included in the angle of view when the distance to the target object OB during the normal use is equivalent to the set standard of the upper limit and when the distance is equivalent to the set standard of the lower limit.

In general, an angular field of view of a human is approximately 200 degrees in the horizontal direction and 125 degrees in the vertical direction. In the angular field of view, an effective field of view excellent in an information reception ability is approximately 30 degrees in the horizontal direction and approximately 20 degrees in the vertical direction. Further, a stable gazing field in which a gazing point of the human is quickly and stably seen is approximately 60 to 90 degrees in the horizontal direction and approximately 45 to 70 degrees in the vertical direction. In this case, when the gazing point is the target object OB shown in FIG. 4, the effective field of view is approximately 30 degrees in the horizontal direction and approximately 20 degrees in the vertical direction centering on the visual lines RD and LD. The stable gazing field is approximately 60 to 90 degrees in the horizontal direction and approximately 45 to 70 degrees in the vertical direction. The angular field of view is approximately 200 degrees in the horizontal direction and approximately 125 degrees in the vertical direction. Further, an actual field of view visually recognized by the user through the HMD 20 and through the right light guide plate 26 and the left light guide plate 28 can be referred to as actual field of view (FOV). In the configuration of this embodiment shown in FIGS. 1 and 2, the actual field of view is equivalent to an actual field of view visually recognized by the user through the right light guide plate 26 and the left light guide plate 28. The actual field of view is narrower than the angular field of view and the stable gazing field but is wider than the effective field of view.

The angle of view C of the camera 61 desirably enables image pickup of a range wider than the field of view of the user. Specifically, the angle of view C is desirably at least wider than the effective field of view of the user. The angle of view C is more desirably wider than the actual field of view of the user. The angle of view C is still more desirably wider than the stable gazing field of the user. The angle of view C is most desirably wider than the angular field of view of both the eyes of the user.

The camera 61 may include a so-called wide angle lens as an image pickup lens and may be configured to be capable of performing image pickup in a wide angle of view. The wide angle lens may include a lens called a super-wide angle lens or a quasi-wide angle lens or may be a single focus lens or a zoom lens. The camera 61 may include a lens group including a plurality of lenses.

Figure 5:
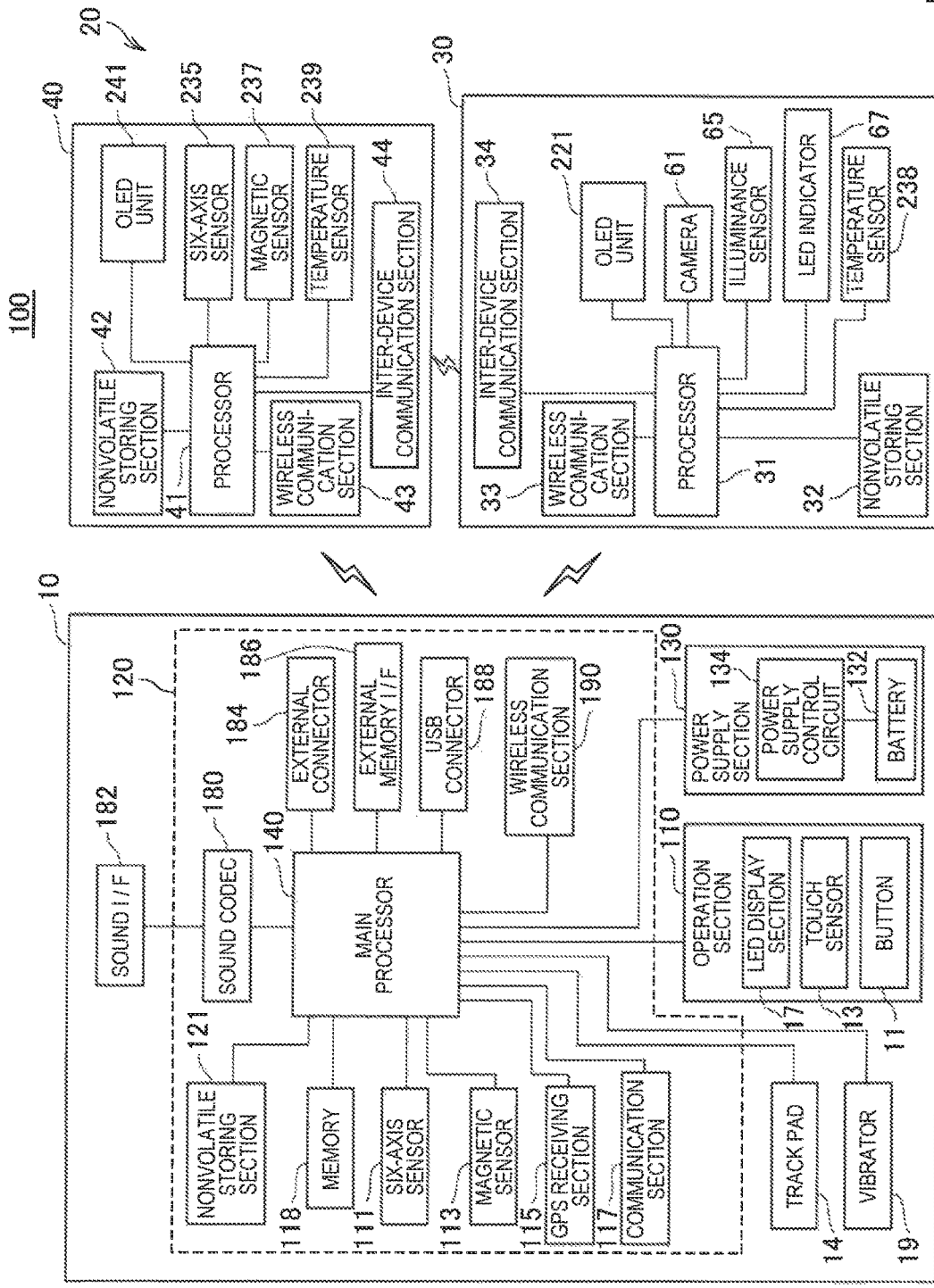
FIG. 5 is a block diagram of devices configuring the display system.

FIG. 5 is a block diagram showing sections configuring the display system 100.

The control device 10 includes a main processor 140 that executes a computer program to control the control device 10. A memory 118 and a nonvolatile storing section 121 are connected to the main processor 140. The track pad 14 and an operation section 110 are connected to the main processor 140 as input devices. A six-axis sensor 111, a magnetic sensor 113, and a GPS 115 are connected to the main processor 140 as sensors. A communication section 117, a sound codec 180, an external connector 184, an external memory interface 186, a USB connector 188, and a wireless communication section 190 are connected to the main processor 140. These sections function as interfaces with the outside.

The main processor 140 is mounted on a controller board 120 incorporated in the control device 10. The memory 118, the nonvolatile storing section 121, and the like are mounted on the controller board 120 in addition to the main processor 140. In this embodiment, the six-axis sensor 111, the magnetic sensor 113, the GPS 115, the communication section 117, the memory 118, the nonvolatile storing section 121, the sound codec 180, and the like are mounted on the controller board 120. The external connector 184, the external memory interface 186, and the USB connector 188 may be mounted on the controller board 120.

The memory 118 configures a work area in which, when the main processor 140 executes a computer program, the computer program to be executed and data to be processed are temporarily stored. The nonvolatile storing section 121 is configured by a flash memory or an eMMC (Embedded Multi Media Card). The nonvolatile storing section 121 stores computer programs to be executed by the main processor 140 and various data that the main processing 140 processes by executing the computer programs.

The main processor 140 detects contact operation on the operation surface of the track pad 14 and acquires an operation position on the basis of an operation signal input from the track pad 14.

The operation section 110 includes the buttons 11, the touch sensor 13, and the LED display section 17. The touch sensor 13 detects touch operation on the touch operation section included in the control device 10. When operation of the buttons 11 is performed and when the touch sensor 13 detects the touch operation, an operation signal is output from the operation section 110 to the main processor 140.

The LED display section 17 includes an LED included in the LED indicator 12 (FIG. 1) and a driving circuit that lights the LED. The LED display section 17 lights, flashes, and extinguishes the LED according to control by the main processor 140. The LED display section 17 may control luminance of light emission of the LED. The LED display section 17 may include LEDs of three colors of red, blue, and green. In this case, it is also possible to cause the LED indicator 12 to emit light in any color by adjusting the luminances of the LEDs of the respective colors.

The six-axis sensor 111 is a motion sensor (an inertial sensor) including a three-axis acceleration sensor and a three-axis gyro (angular velocity) sensor. The six-axis sensor 111 may adopt an IMU (Inertial Measurement Unit) obtained by integrating the sensors as a module.

The magnetic sensor 113 is, for example, a three-axis terrestrial magnetism sensor. If a detection result of terrestrial magnetism of the magnetic sensor 113 is used, it is possible to specify a three-dimensional direction of the control device 10 based on the ground.

The GPS (Global Positioning System) 115 includes a not-shown GPS antenna. The GPS 115 receives a radio signal transmitted from a GPS satellite and detects a coordinate of the present position of the control device 10.

The six-axis sensor 111, the magnetic sensor 113, and the GPS 115 output detection values to the main processor 140 according to a sampling cycle designated in advance. Alternatively, the six-axis sensor 111, the magnetic sensor 113, and the GPS 115 output, according to a request of the main processor 140, the detection values to the main processing 140 at timing designated by the main processor 140.

The communication section 117 executes wireless communication between the communication section 117 and an external device. The communication section 117 includes an antenna, an RF circuit, a baseband circuit, and a communication control circuit. Alternatively, the communication section 117 is configured by a device obtained by integrating the antenna, the RF circuit, the baseband circuit, the communication control circuit, and the like. The communication section 117 performs wireless communication conforming to a standard such as Bluetooth (registered trademark) or a wireless LAN (Wi-Fi (registered trademark)). For example, the control device 10 executes, with the communication section 117, communication with a content server (not shown in the figure) and acquires content data including videos and sound from the content server. The communication section 117 may be connected to a communication cable and execute communication via a wired communication line.

The sound interface 182 is an interface that inputs and outputs sound signals. Although not shown in the figure, the display system 100 can include a headphone and a speaker that output sound to the user. In this case, the headphone and the speaker are connected to the sound interface 182. The sound codec 180 outputs a sound signal to the headphone and the speaker via the sound interface 182. A microphone (not shown in the figure) may be connected to the sound interface 182. In this case, a sound signal is input to the sound interface 182 from the microphone. The sound codec 180 converts the sound signal input via the sound interface 182 into digital sound data and outputs the digital sound data to the main processor 140.

The external connector 184 is a connector that connects an external device that communicates with the main processor 140. The external connector 184 is, for example, an interface that connects the external device to the main processor 140. The external connector 184 is used, for example, when debugging of a computer program executed by the main processor 140 and collection of logs of operations of the control device 10, the first display device 30, the second display device 40, and the like are performed.

The external memory interface 186 is an interface to which a portable memory device can be connected. The external memory interface 186 includes a memory card slot, in which a card-type recording medium is inserted and data can be read from the card-type recording medium, and an interface circuit. A size, a shape, and a standard of the card-type recording medium are not limited and can be changed as appropriate.

The USB (Universal Serial Bus) connector 188 includes a connector and an interface circuit conforming to a USB standard. A USB memory device, a smartphone, a computer, and the like can be connected to the USB connector 188. A size and a shape of the USB connector 188 and a version of an applied USB standard can be selected and changed as appropriate.

The control device 10 includes a vibrator 19. The vibrator 19 includes a motor (not shown in the figure) and an eccentric rotor (not shown in the figure) and generates vibration according to the control by the main processor 140. For example, when operation on the operation section 110 is detected or when the power supply of the control device 10 is turned on and off, the control device 10 generates vibration with the vibrator 19 in a predetermined vibration pattern.

The wireless communication section 190 executes wireless communication between the wireless communication section 190 and each of the first display device 30 and the second display device 40. The wireless communication section 190 includes an antenna, an RF circuit, a baseband circuit, and a communication control circuit or includes a device obtained by integrating the antenna, the RF circuit, the baseband circuit, the communication control circuit, and the like. A communication system executed by the wireless communication section 190 can be, for example, Bluetooth, a wireless LAN (including Wi-Fi), or other short-range wireless communication systems. The wireless communication section 190 transmits, according to the control by the main processor 140, video data forming content data to each of the first display device 30 and the second display device 40.

The wireless communication section 190 may include a first communication module that communicates with the first display device 30 and a second communication module that communicates with the second display device 40. In this case, each of the first and second communication modules includes an antenna, an RF circuit, a baseband circuit, and a communication control circuit or includes a device obtained by integrating the antenna, the RF circuit, the baseband circuit, the communication control circuit, and the like.

The HMD 20 includes various sensors for detecting a state of the HMD 20 and the camera 61. Specifically, the HMD 20 includes the camera 61, an illuminance sensor 65, a six-axis sensor 235, and a magnetic sensor 237. The HMD 20 includes an LED indicator 67 that indicates an operation state of the HMD 20. The sections only have to be provided in the HMD 20. Therefore, the first display device 30 may include the sections or the second display device 40 may include the sections. In this embodiment, the first display device 30 includes the camera 61, the illuminance sensor 65, and the LED indicator 67. The second display device 40 includes the six-axis sensor 235, the magnetic sensor 237, and the temperature sensor 239. This is an example. It is possible to change, as appropriate, whether the first display device 30 or the second display device 40 includes or both of the first display device 30 and the second display device 40 include sensors and a temperature sensor 68.

The first display device 30 includes a processor 31 that executes a computer program to control the first display device 30. A nonvolatile storing section 32 is connected to the processor 31. A wireless communication section 33 and an inter-device communication section 34 are connected to the processor 31. The OLED unit 221 is connected to the processor 31. The processor 31 controls display of an image by the OLED unit 221. The camera 61, the illuminance sensor 65, the LED indicator 67, and the temperature sensor 238 are connected to the processor 31.

The nonvolatile storing section 32 is configured by a semiconductor storage device such as an EEPROM (Electrically Erasable Programmable Read-Only Memory) or a flash memory. The nonvolatile storing section 32 stores, in a nonvolatile manner, computer programs to be executed by the processor 31, data referred to during the execution of the computer programs, and the like. The nonvolatile storing section 32 stores various data to enable the processor 31 to read the data. The nonvolatile storing section 32 stores, for example, data concerning light emission characteristics and display characteristics of the OLED unit 221 and data concerning characteristics of the sensors included in the first display device 30.

The wireless communication section 33 executes wireless communication between the wireless communication section 33 and the control device 10. The wireless communication section 33 includes an antenna, an RF circuit, a baseband circuit, and a communication control circuit or includes a device obtained by integrating the antenna, the RF circuit, the baseband circuit, the communication control circuit, and the like. The wireless communication section 33 is configured to be capable of communicating with the wireless communication section 190. A communication system executed by the wireless communication section 33 is common to at least a part of a communication system executed by the wireless communication section 190 and can be, for example, Bluetooth, a wireless LAN (including Wi-Fi), or other short-range wireless communication systems. The wireless communication section 33 receives, according to control by the processor 31, video data and/or control data transmitted by the wireless communication section 190.

The inter-device communication section 34 executes wireless communication between the inter-device communication section 34 and an inter-device communication section 44 included in the second display device 40 and transmits and receives various data including control data. A communication system executed by the inert-device communication section 34 can be, for example, NFC (Near Field Communication), Bluetooth, a wireless LAN (including Wi-Fi), or other short-range wireless communication systems.

The camera 61 executes image pickup according to the control by the processor 31 and outputs picked-up image data or a signal indicating an image pickup result to the processor 31.

As shown in FIG. 1, the illuminance sensor 65 is provided at the end portion ER of the front frame 27 and disposed to receive external light coming from the front of the user wearing the HMD 20. The illuminance sensor 65 outputs a detection value corresponding to a light reception amount (light reception intensity). The processor 31 is capable of acquiring a detection value of the illuminance sensor 65.

As shown in FIG. 1, the LED indicator 67 is disposed near the camera 61 at the end portion ER of the front frame 27. The LED indicator 67 lights according to the control by the processor 31, for example, lights during execution of image pickup by the camera 61 and informs that the image pickup is being performed.

The temperature sensor 238 detects temperature and outputs a voltage value or a resistance value corresponding to the detected temperature as a detection value. The temperature sensor 238 is mounted on the rear surface side of the OLED panel 223 (FIG. 2). The temperature sensor 238 may be mounted on, for example, a substrate on which the OLED driving circuit 225 is mounted. With this configuration, the temperature sensor 238 mainly detects the temperature of the OLED panel 223. The processor 31 is capable of acquiring the detection value of the temperature sensor 238.

The processor 31 performs setting and initialization of sampling cycles of the sensors, that is, the camera 61, the illuminance sensor 65, and the temperature sensor 238. The processor 31 acquires, according to the sampling cycles of the sensors, the picked-up image data generated by the camera 61 and the detection values of the illuminance sensor 65 and the temperature sensor 238. The processor 31 transmits (outputs), at timing set in advance, the detection values and the picked-up image data of the sensors to the control device 10. The processor 31 may include a function of temporarily retaining the detection values and the picked-up image data of the sensors according to the timing for transmitting the detection values and the picked-up image data to the control device 10. The picked-up image data and the detection values may be temporarily stored in, for example, a memory (not shown in the figure) incorporated in the processor 31. The processor 31 may include a function of converting the detection values into data of a unified data format according a difference among signal formats or data formats of the detection values of the sensors and transmitting the detection values to the control device 10. The processor 31 has a function of starting and stopping energization to the LED indicator 67. The processor 31 lights or flashes the LED indicator 67 according to timing when the camera 61 starts and ends the image pickup.

The second display device 40 includes a processor 41 that executes a computer program to control the second display device 40. A nonvolatile storing section 42 is connected to the processor 41. A wireless communication section 43 and the inter-device communication section 44 are connected to the processor 41. The OLED unit 241 is connected to the processor 41. The processor 41 controls display of an image by the OLED unit 241. The six-axis sensor 235, the magnetic sensor 237, and the temperature sensor 239 are connected to the processor 41.

The nonvolatile storing section 42 is configured by a semiconductor storage device such as an EEPROM or a flash memory. The nonvolatile storing section 42 stores, in a nonvolatile manner, computer programs to be executed by the processor 41, data referred to during the execution of the computer programs, and the like. The nonvolatile storing section 42 stores various data to enable the processor 41 to read the data. The nonvolatile storing section 42 stores, for example, data concerning light emission characteristics and display characteristics of the OLED unit 241 and data concerning characteristics of the sensors included in the second display device 40.

The wireless communication section 43 executes wireless communication between the wireless communication section 43 and the control device 10. The wireless communication section 43 includes an antenna, an RF circuit, a baseband circuit, and a communication control circuit or includes a device obtained by integrating the antenna, the RF circuit, the baseband circuit, the communication control circuit, and the like. The wireless communication section 43 is configured to be capable of communicating with the wireless communication section 190. A communication system executed by the wireless communication section 43 is common to at least a part of the communication system executed by the wireless communication section 190 and can be, for example, Bluetooth, a wireless LAN (including Wi-Fi), or other short-range wireless communication systems. The wireless communication section 43 receives, according to control by the processor 41, video data and/or control data transmitted by the wireless communication section 190.

The inter-device communication section 44 executes wireless communication between the inter-device communication section 44 and the inter-device communication section 34 included in the first display device 30 and transmits and receives various data including control data. A communication system executed by the inert-device communication section 44 is common to at least a part of the communication system executed by the inter-device communication system 34 and can be, for example, NFC, Bluetooth, a wireless LAN (including Wi-Fi), or other short-range wireless communication systems.

The six-axis sensor 235 is a motion sensor (an inertial sensor) including a three-axis acceleration sensor and a three-axis gyro (angular velocity) sensor. The six-axis sensor 235 may adopt an IMU (Inertial Measurement Unit) obtained by integrating the sensors as a module.

The magnetic sensor 237 is, for example, a three-axis terrestrial magnetism sensor. If a detection result of terrestrial magnetism of the magnetic sensor 237 is used, it is possible to specify a three-dimensional direction of the HMD 20 based on the ground.

The processor 41 is capable of acquiring detection values of the six-axis sensor 235 and the magnetic sensor 237.

The temperature sensor 239 detects temperature and outputs a voltage value or a resistance value corresponding to the detected temperature as a detection value. The temperature sensor 239 is mounted on the rear surface side of the OLED panel 243 (FIG. 2). The temperature sensor 239 may be mounted on, for example, a substrate on which the OLED driving circuit 245 is mounted. With this configuration, the temperature sensor 239 mainly detects the temperature of the OLED panel 243. The processor 41 is capable of acquiring the detection value of the temperature sensor 239.

The temperature sensor 239 may be incorporated in the OLED panel 243 or the OLED driving circuit 245. The substrate may be a semiconductor substrate. Specifically, when the OLED panel 243 functions as an Si-OLED and is mounted as an integrated circuit on an integrated semiconductor chip together with the OLED driving circuit 245 and the like, the temperature sensor 239 may be mounted on the semiconductor chip.

The processor 41 performs setting and initialization of sampling cycles of the sensors, that is, the six-axis sensor 235, the magnetic sensor 237, and the temperature sensor 239. The processor 41 acquires, according to the sampling cycles of the sensors, the detection values of the six-axis sensor 235, the magnetic sensor 237, and the temperature sensor 239. The processor 41 transmits (outputs), at timing set in advance, the detection values and the picked-up image data of the sensors to the control device 10. The processor 41 may include a function of temporarily retaining the detection values and the picked-up image data of the sensors according to the timing for transmitting the detection values and the picked-up image data to the control device 10. The picked-up image data and the detection values may be temporarily stored in, for example, a memory (not shown in the figure) incorporated in the processor 41. The processor 41 may include a function of converting the detection values of the sensors into data of a unified data format according a difference among signal formats or data formats of the detection values of the sensors and transmitting the data to the control device 10.

The control device 10 includes a power supply section 130 and operates with electric power supplied from the power supply section 130. The power supply section 130 includes a rechargeable battery 132 and a power supply control circuit 134 that performs detection of a residual capacity of the battery 132 and control of charging to the battery 132. The power supply control circuit 134 is connected to the main processor 140. The power supply control circuit 134 outputs a detection value of the residual capacity or a detection value of a voltage of the battery 132 to the main processor 140. The main processor 140 may be capable of controlling a supply state of electric power from the power supply section 130 to the sections of the control device 10.

Each of the first display device 30 and the second display device 40 includes a not-shown battery. Each of the first display device 30 and the second display device 40 supplies electric power from the battery to the sections. It is also possible to provide one battery in the HMD 20 and supply electric power from the one battery to the first display device 30 and the second display device 40.

Figure 6:
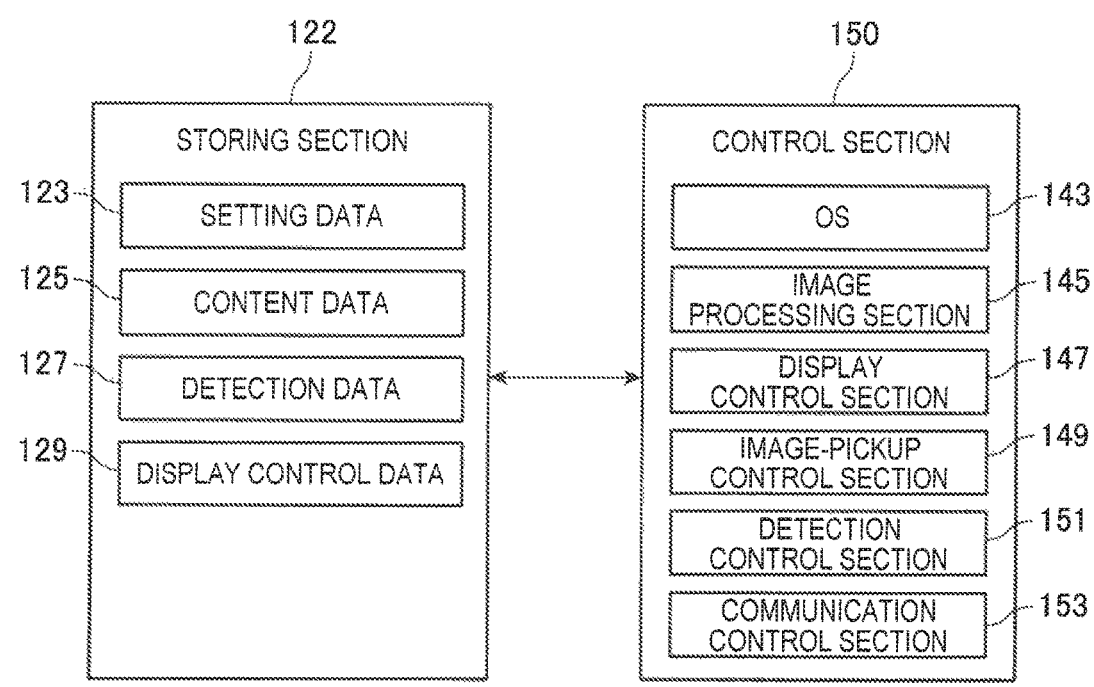
FIG. 6 is a functional block diagram of a control device.

FIG. 6 is a functional block diagram of a storing section 122 and the control section 150 configuring a control system of the control device 10. The storing section 122 shown in FIG. 6 is a logical storing section configured by the nonvolatile storing section 121 (FIG. 5). The main processor 140 executes computer programs, whereby the control section 150 and various functional sections included in the control section 150 are formed by cooperation of software and hardware. The control section 150 and the functional sections configuring the control section 150 are configured by, for example, the main processor 140, the memory 118, and the nonvolatile storing section 121.

The control section 150 executes various kinds of processing using data stored by the storing section 122 to control the control device 10.

The storing section 122 stores various data to be processed by the control section 150. The storing section 122 stores setting data 123, content data 125, detection data 127, and display control data 129. The setting data 123 includes various setting values related to the operation of the control device 10. When the control section 150 uses parameters, determinants, operational expressions, LUTs (LookUp Tables), and the like in controlling the control device 10, the parameters, the determinants, the operational expressions, the LUTs, and the like may be included in the setting data 123.

The setting data 123 includes data of various kinds of setting related to communication executed by the control device 10 between the control device 10 and the first display device 30 and the second display device 40. Examples of this kind of data include data for designating a communication system, identification data for identifying the control device 10, the first display device 30, and the second display device 40, and authentication data such as a password.

The content data 125 is data of contents including images and videos displayed by the first display device 30 and the second display device 40 according to the control by the control section 150. The content data 125 includes video data (which may be a moving image or may be a still image). The content data 125 may include sound data. The content data 125 may include image data of a plurality of images. The plurality of images are not limited to a form in which the first display device 30 and the second display device 40 simultaneously display the plurality of images and may be, for example, a form in which the first display device 30 and the second display device 40 display the plurality of images in order.

The content data 125 may be bidirectional content. When the bidirectional content is displayed by the HMD 20, the control device 10 receives operation of the user and the control section 150 executes processing for coping with the received operation. In this case, the content data 125 may include image data of a menu screen displayed when the operation is received and data defining processing and the like corresponding to items included in the menu screen.

When the content data 125 stored in the storing section 122 is data of AR (Augmented Reality) content, the control section 150 may perform AR display on the basis of the content data 125. In the AR display, the control section 150 displays an image that achieves a so-called AR effect (hereinafter referred to as AR image) according to a target object in a real space visually recognized by the user through the right light guide plate 26 and the left light guide plate 28. When the AR display is performed, in a state in which the user is viewing the target object present in the real space, for the user, the AR image is seen in a position overlapping the target object or a position corresponding to the target object. Therefore, the user can visually recognize the target object in the real space with a virtual display object including characters and images added to the target object in the real space. Therefore, there is an effect that the user feels as if the reality is augmented.

The detection data 127 is detection values of the sensors (including the picked-up image data of the camera 61) included in the first display device 30 and the second display device 40. When receiving data including the detection values of the sensors from the first display device 30 or the second display device 40, the control section 150 stores the detection values of the sensors as the detection data 127.

The display control data 129 includes various setting data concerning processing for transmitting video data to the first display device 30 and the second display device 40 and processing for controlling display of the first display device 30 and the second display device 40. For example, the display control data 129 includes a log of transmission results of transmission of video data to the first display device 30 and the second display device 40 by the wireless communication section 190. For example, the display control data 129 includes data indicating processing executed by the control section 150 when display deviation explained below occurs in the first display device 30 and the second display device 40.

The control section 150 includes the functions of the operating system (OS) 143, an image processing section 145, a display control section 147, an image-pickup control section 149, a detection control section 151, and a communication control section 153. The function of the operating system 143 is a function of a control program stored by the storing section 122. The functions of the other sections are functions of application programs executed on the operating system 143.

The image processing section 145 generates, on the basis of the content data 125, video data having a data format processable by the first display device 30 and the second display device 40. The video data generated by the image processing section 145 is data processed according to, for example, display resolutions of the OLED units 221 and 241 and relative positions of the right light guide plate 26 and the left light guide plate 28 and the head of the user. The image processing section 145 may perform, according to necessity, resolution conversion processing for converting the resolution of image data into resolution suitable for the first display device 30 and the second display device 40. The image processing section 145 may execute, for example, image adjustment processing for adjusting the luminance and the chroma of image data and 2D/3D conversion processing for creating 2D image data from 3D image data or creating 3D image data from 2D image data.

The image processing section 145 is not limited to a configuration realized by the main processor 140 executing the computer program and may be configured by hardware (e.g., a DSP (Digital Signal Processor)) separate from the main processor 140.

The display control section 147 generates, on the basis of the image data processed by the image processing section 145, control data for instructing a start and an end of display in the first display device 30 and the second display device 40. The display control section 147 generates control data for designating display luminance of the OLED units 221 and 241. The control data generated by the display control section 147 is transmitted from the wireless communication section 190 according to the control by the communication control section 153. When display deviation occurs between the first display device 30 and the second display device 40, the display control section 147 controls operation for eliminating the display deviation.

The image-pickup control section 149 generates control data for instructing image pickup execution by the camera 61. The control data is transmitted from the wireless communication section 190 to the first display device 30 according to the control by the communication control section 153. When the wireless communication section 190 receives the picked-up image data of the camera 61 transmitted by the first display device 30, the image-pickup control section 149 stores the received picked-up image data in the storing section 122.

The detection control section 151 generates control data for instructing acquisition of the detection values of the sensors included in the first display device 30 and the second display device 40. The detection control section 151 may generate control data targeting the camera 61 or may generate control data targeting the sensors other than the camera 61. The control data is transmitted from the wireless communication section 190 to the first display device 30 and the second display device 40 according to the control by the communication control section 153. When the wireless communication section 190 receives data including the detection values transmitted by the first display device 30 and the second display device 40, the image-pickup control section 149 stores the received data in the storing section 122.

The communication control section 153 controls the wireless communication section 190 to execute communication between the communication control section 153 and the first display device 30 and the second display device 40. The communication control section 153 establishes, according to data concerning the communication included in the setting data 123, a wireless communication line between the communication control section 153 and each of the wireless communication sections 33 and 43. The communication control section 153 transmits video data and control data generated by the control section 150 to one or both of the first display device 30 and the second display device 40. The communication control section 153 executes processing for receiving control data transmitted by the first display device 30 and processing for receiving control data transmitted by the second display device 40.

Figure 7:
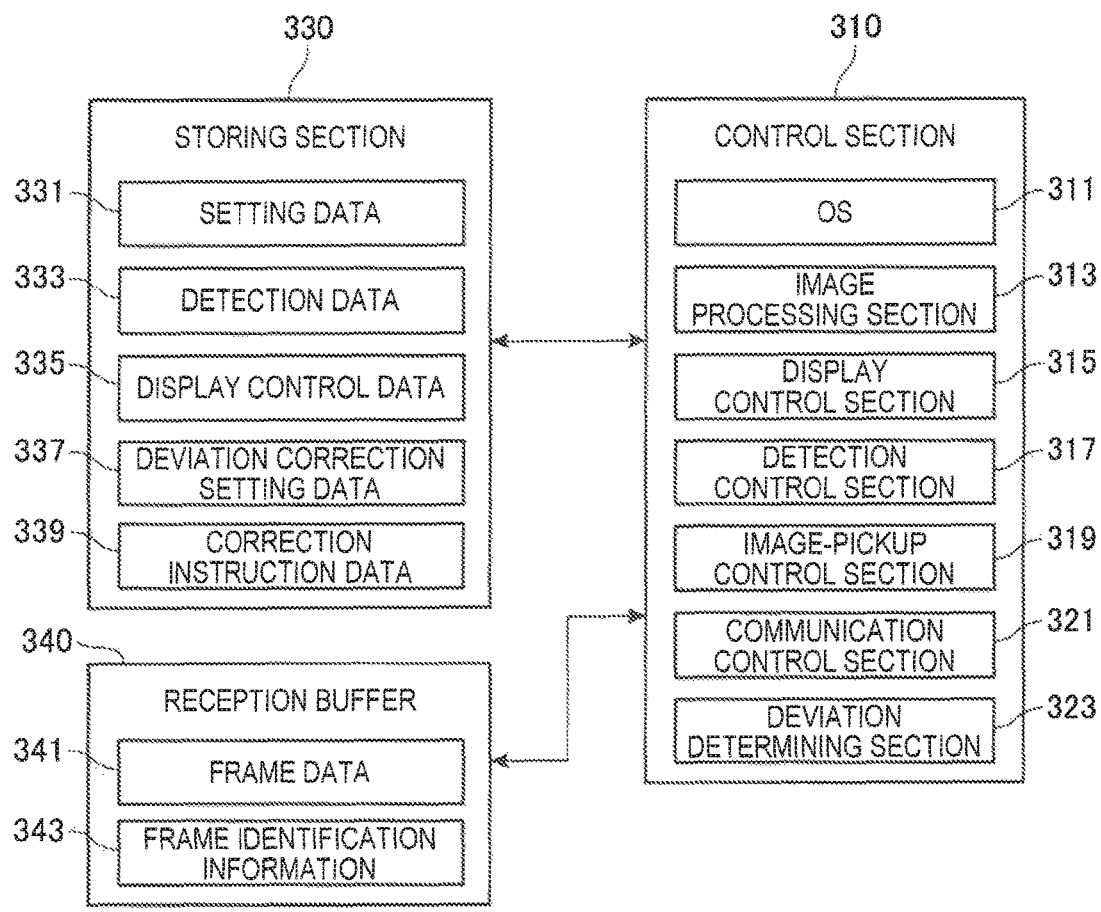
FIG. 7 is a functional block diagram of the first display device.

FIG. 7 is a functional block diagram of the control section 310, a storing section 330, and a reception buffer 340 configuring a control system of the first display device 30. The storing section 330 shown in FIG. 7 is a logical storing section configured by the nonvolatile storing section 32 (FIG. 5). The reception buffer 340 is a logical storing section configured by the nonvolatile storing section 32 and/or a memory incorporated in the processor 31. The processor 31 executes computer programs, whereby the control section 310 and various functional sections included in the control section 310 are formed by cooperation of software and hardware.

The control section 310 executes various kinds of processing using data stored by the storing section 330 to control the first display device 30.

The storing section 330 stores various data to be processed by the control section 310. The storing section 330 stores setting data 331, detection data 333, display control data 335, deviation correction setting data 337, and correction instruction data 339. The setting data 331 includes various setting values related to the operation of the first display device 30. When the control section 310 uses parameters, determinants, operational expressions, LUTs, and the like in controlling the first display device 30, the parameters, the determinants, the operational expressions, the LUTs, and the like may be included in the setting data 331.

The setting data 331 includes data of various kinds of setting related to communication executed by the first display device 30 between the first display device 30 and the control device 10. The setting data 331 includes various data used when communication with the second display device 40 is executed by the inter-device communication section 34 (FIG. 5). Examples of this kind of data include data for designating a communication system, identification data for identifying the control device 10, the first display device 30, and the second display device 40, and authentication data such as a password.

The detection data 333 is the detection values of the sensors (including the picked-up image data of the camera 61) included in the first display device 30. When acquiring the picked-up image data of the camera 61 and the detection values of the illuminance sensor 65 and the temperature sensor 238, the control section 310 stores the picked-up image data and the detection values in the storing section 330 as the detection data 333.

The display control data 335 includes various setting data concerning processing for displaying video data received from the control device 10. For example, the display control data 335 includes data related to control of the OLED unit 221 performed when the video data is displayed.

The deviation correction setting data 337 includes data indicating processing executed by the control section 310 when display deviation explained below occurs between the first display device 30 and the second display device 40.

The correction instruction data 339 is data of an instruction transmitted to the second display device 40 when display deviation occurs between the first display device 30 and the second display device 40.

The reception buffer 340 is a temporary storage region for storing video data and the like received by the first display device 30 from the control device 10. The reception buffer 340 stores frame data 341 and frame identification information 343. The frame data 341 is data of frames forming the video data received from the control device 10. The frame identification information 343 is information for identifying the respective frames forming the video data received from the control device 10. The frame identification information 343 is transmitted from the control device 10 in association with the frames of the video data. The reception buffer 340 stores the frame data 341 and the frame identification information 343 in association with each other.

The control section 310 includes functions of an operating system (OS) 311, an image processing section 313, a display control section 315, a detection control section 317, an image-pickup control section 319, a communication control section 321, and a deviation determining section 323. The function of the operating system 311 is a function of a control program stored by the storing section 330. The functions of the other sections are functions of application programs executed on the operating system 311.

The image processing section 313 executes processing for displaying, with the OLED unit 221, the frame data 341 stored by the reception buffer 340 and generates video data suitable for display by the OLED unit 221.

The display control section 315 controls the OLED unit 221 on the basis of the image data generated by the image processing section 313 to display a video on the right light guide plate 26. The display control section 315 controls luminance and the like in the OLED unit 221 according to control data transmitted from the control device 10.

The display control section 315 acquires, from the reception buffer 340, the frame identification information 343 corresponding to the frame data 341 acquired by the image processing section 313 from the reception buffer 340.

The detection control section 317 acquires detection values of the illuminance sensor 65 and the temperature sensor 238 according to control data transmitted from the control device 10 and stores the detection values as the detection data 333.

The image-pickup control section 319 causes, according to control data transmitted from the control device 10, the camera 61 to execute image pickup and stores picked-up image data output by the camera 61 in the storing section 330 as the detection data 333.

The communication control section 321 controls the wireless communication section 33 to execute communication between the communication control section 321 and the control device 10. The communication control section 321 receives control data transmitted by the wireless communication section 190 of the control device 10. The communication control section 321 receives video data transmitted by the control device 10 and stores the video data in the reception buffer 340. The frame data 341 stored by the reception buffer 340 is data of frames forming the video data received by the communication control section 321. The reception buffer 340 can store data of one or a plurality of frames. The communication control section 321 stores the received video data in the reception buffer 340 in units of frames.

The communication control section 321 transmits, with the wireless communication section 33, the detection data 333 stored by the storing section 330 to the control device 10. Consequently, the control device 10 can acquire detection values of the sensors included in the first display device 30. Timing when the communication control section 321 transmits the detection data 333, types of the detection values of the sensors to be transmitted, and the like are designated by control data transmitted to the first display device 30 by the control device 10.

The communication control section 321 executes, through the inter-device communication section 34, wireless communication and transmits and receives various control data between the communication control section 321 and the second display device 40.

The deviation determining section 323 specifies, on the basis of control data transmitted from the second display device 40, a frame displayed by the second display device 40. The deviation determining section 323 specifies a frame displayed by the display control section 315 and determines whether display deviation is present between the frame and the frame displayed by the second display device 40. When determining that display deviation occurs, the deviation determining section 323 executes processing for correcting the display deviation.

Figure 8:
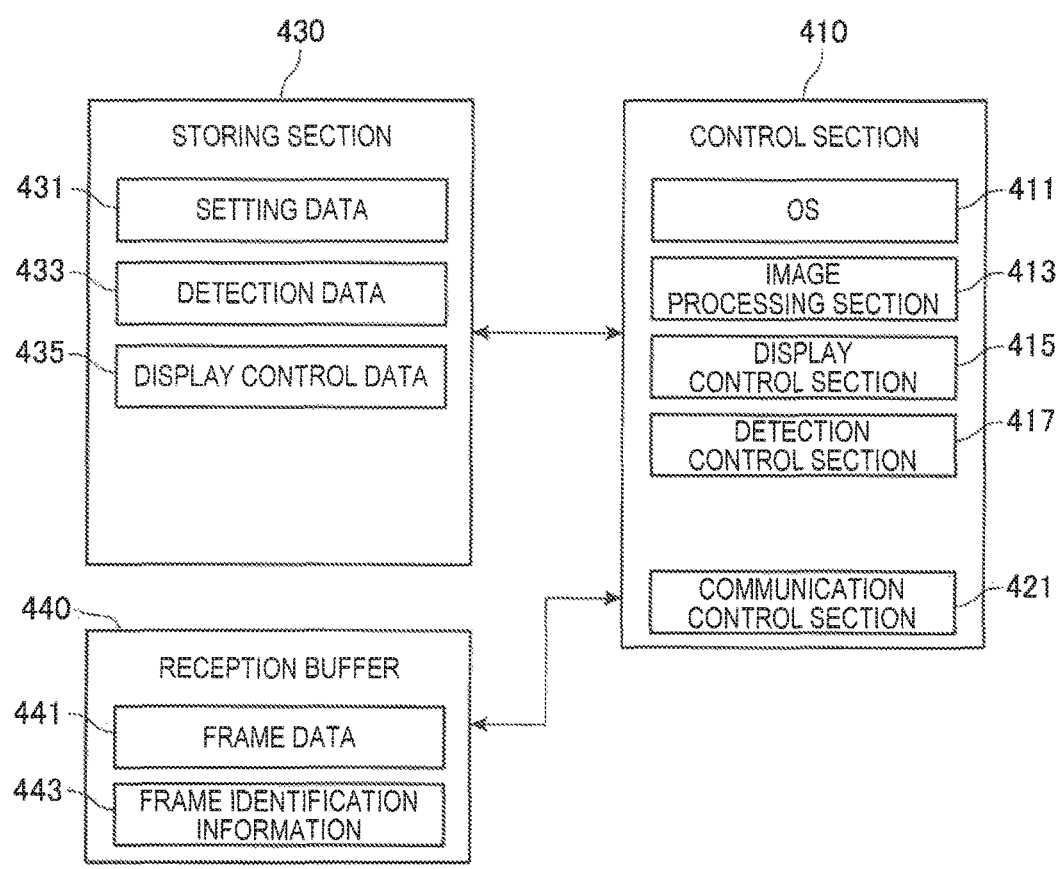
FIG. 8 is a functional block diagram of the second display device.

FIG. 8 is a functional block diagram of a control section 410, a storing section 430, and a reception buffer 440 configuring a control system of the second display device 40. The storing section 430 shown in FIG. 8 is a logical storing section configured by the nonvolatile storing section 42 (FIG. 5). The reception buffer 440 is a logical storing section configured by the nonvolatile storing section 42 and/or a memory incorporated in the processor 41. The processor 41 executes computer programs, whereby the control section 410 and various functional sections included in the control section 410 are formed by cooperation of software and hardware. The control section 410 and the functional sections configuring the control section 410 are configured by, for example, the processor 41 and the nonvolatile storing section 42.

The control section 410 executes various kinds of processing using data stored by the storing section 430 to control the second display device 40.

The storing section 430 stores various data to be processed by the control section 410. The storing section 430 stores setting data 431, detection data 433, and display control data 435. The setting data 431 includes various setting values related to the operation of the second display device 40. When the control section 410 uses parameters, determinants, operational expressions, LUTs, and the like in controlling the second display device 40, the parameters, the determinants, the operational expressions, the LUTs, and the like may be included in the setting data 431.

The setting data 431 includes data of various kinds of setting related to communication performed between the second display device 40 and the control device 10. The setting data 431 includes various data used when communication with the first display device 30 is executed by the inter-device communication section 44 (FIG. 5). Examples of this kind of data include data for designating a communication system, identification data for identifying the control device 10, the first display device 30, and the second display device 40, and authentication data such as a password.

The detection data 433 is the detection values of the sensors included in the second display device 40. When acquiring detection values of the six-axis sensor 235, the magnetic sensor 237, and the temperature sensor 239, the control section 410 stores the detection values in the storing section 430 as the detection data 433.

The display control data 435 includes various setting data concerning processing for displaying video data received from the control device 10. For example, the display control data 435 includes data related to control of the OLED unit 241 performed when the video data is displayed. The display control data 435 includes frame identification information 443 of a frame displayed by a display control section 415 as explained below.

The reception buffer 440 is a temporary storage region for storing video data received by the second display device 40 from the control device 10. The reception buffer 440 stores frame data 441 and frame identification information 443. The frame data 441 is data of frames forming the video data received from the control device 10. The frame identification information 443 is information for identifying the respective frames forming the video data received from the control device 10. The frame identification information 443 is transmitted from the control device 10 in association with the frames of the video data. The reception buffer 440 stores the frame data 441 and the frame identification information 443 in association with each other.

The control section 410 includes functions of an operating system (OS) 411, an image processing section 413, a display control section 415, a detection control section 417, and a communication control section 421. The function of the operating system 411 is a function of a control program stored by the storing section 430. The functions of the other sections are functions of application programs executed on the operating system 411.

The image processing section 413 executes processing for displaying, with the OLED unit 241, the frame data 441 stored by the reception buffer 440 and generates video data suitable for display by the OLED unit 241.

The display control section 415 controls the OLED unit 241 on the basis of the image data generated by the image processing section 413 to display a video on the left light guide plate 28. The display control section 415 controls luminance and the like in the OLED unit 241 according to control data transmitted from the control device 10.

The display control section 415 acquires, from the reception buffer 440, the frame identification information 443 corresponding to the frame data 441 acquired by the image processing section 413 from the reception buffer 440. The display control section 415 stores the acquired frame identification information 443 in the storing section 430 as the display control data 435. The frame identification information 443 corresponds to a frame displayed by the OLED unit 241 according to control by the display control section 415.

The detection control section 417 acquires detection values of the illuminance sensor 65 and the temperature sensor 238 according to control data transmitted from the control device 10 and stores the detection values as the detection data 433.

The communication control section 421 controls the wireless communication section 43 to execute communication between the communication control section 421 and the control device 10. The communication control section 421 receives control data transmitted by the wireless communication section 190 of the control device 10. The communication control section 421 receives video data transmitted by the control device 10 and stores the video data in the reception buffer 440. The communication control section 421 transmits, with the wireless communication section 43, the detection data 433 stored by the storing section 430 to the control device 10.

The communication control section 421 executes, through the inter-device communication section 44, wireless communication between the communication control section 421 and the inter-device communication section 34 and performs, for example, transmission of control data to the first display device 30. For example, the communication control section 421 transmits the frame identification information 443 included in the display control data 435 to the first display device 30.

Figure 9:
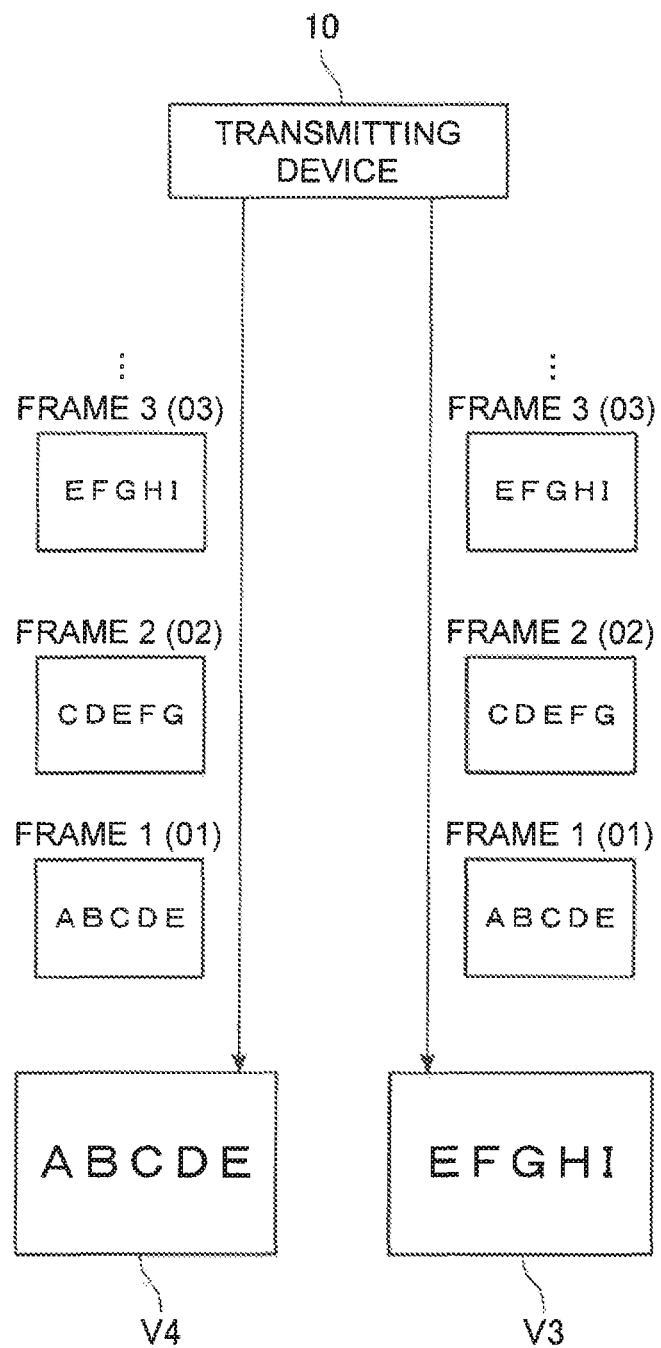
FIG. 9 is an explanatory diagram schematically showing the operation and display deviation of the display system in the first embodiment.

FIG. 9 is an explanatory diagram schematically showing the operation and display deviation of the display system 100. In FIG. 9, reference sign V3 denotes a display region where the first display device 30 displays an image. The display region is equivalent to, for example, a region where an image is displayed by the half mirror 261 (FIG. 3). Reference sign V4 denotes a display region where the second display device 40 displays an image. The display region is equivalent to, for example, a region where an image is displayed by the half mirror 281 (FIG. 3).

As shown in FIG. 9, the control device 10 transmits video data to each of the first display device 30 and the second display device 40. The video data transmitted by the control device 10 is formed by a plurality of frames. For example, when the control device 10 transmits video data of 30 FPS (Frames Per Second), video data of thirty frames is transmitted per one second. The control device 10 transmits the video data to each of the first display device 30 and the second display device 40 in units of frames. In FIG. 9, an example is shown in which the control device 10 performs the transmission frame by frame. However, naturally, the control device 10 is also capable of collectively transmitting a plurality of frames.

Each of the first display device 30 and the second display device 40 receives, in units of frames, the video data transmitted by the control device 10. The first display device 30 stores, in units of frames, the video data received from the control device 10 in the reception buffer 340 (FIG. 7) as the frame data 341. The second display device 40 stores the video data received from the control device 10 in the reception buffer 440 (FIG. 8) as the frame data 441.

The control device 10 transmits the frames of the video data and frame identification information for identifying the frames to each of the first display device 30 and the second display device 40 in association with each other. In an example shown in FIG. 9, the control device 10 sequentially transmits a frame 1, a frame 2, a frame 3, and the like. The frame identification information of the frame 1 is "01". The frame identification information of the frame 2 is "02". The frame identification information is information capable of specifying the respective frames. The frame identification information may be given in advance to the content data 125 stored by the control device 10 or may be given by the control device 10. The frame identification information shown in FIG. 9 is continuous numbers. However, the frame identification information is not limited to this example and only has to be data of a form that can identify the respective frames. The frame identification information only has to be capable of distinguishing the respective frames from the other frames within at least ten frames before and after the frames. The frame identification information is desirably information that can identify the respective frames from the other frames among twenty frames or a plurality of frames displayed in one second. Therefore, the frame identification information may be information peculiar to all the frames. However, a number of pieces of frame identification information set in advance may be cyclically given. For example, when the control device 10 transmits the frames at 30 FPS, the control device 10 may cyclically give thirty pieces of frame identification information different from one another to the respective frames.

The control device 10 may add the frame identification information to vertical synchronization signals (Vsync) included in data of the respective frames of the video data and transmit the frame identification information. The control device 10 may encode the vertical synchronization signals and include the frame identification information in the vertical synchronization signals. In this case, the vertical synchronization signals can also be used as signals for transmitting the frame identification information.

The control section 310 of the first display device 30 receives the video data transmitted by the control device 10, stores the video data in the reception buffer 340 in units of frames as the frame data 341, and stores the frame identification information of the received frames as the frame identification information 343. The frame data 341 and the frame identification information 343 stored in the reception buffer 340 are associated while maintaining association at the time when the control device 10 transmits the video data.

The control section 310 reads out, in units of frames, in the order of reception, the frame data 341 stored in the reception buffer 340 and displays the frame data 341 with the OLED unit 221. At this point, the control section 310 acquires the frame identification information 343 of the frame displayed by the OLED unit 221 from the reception buffer 340. Therefore, the control section 310 can specify the frame identification information of the frame being displayed.

The control section 410 of the second display device 40 receives the video data transmitted by the control device 10, stores the video data in the reception buffer 440 in units of frames as the frame data 441, and stores the frame identification information of the received frames as the frame identification information 443. The frame data 441 and the frame identification information 443 stored in the reception buffer 440 are associated while maintaining association at the time when the control device 10 transmits the video data.

The control section 410 reads out, in units of frames, in the order of reception, the frame data 441 stored in the reception buffer 440 and displays the frame data 441 with the OLED unit 241. At this point, the control section 410 acquires the frame identification information 443 of the frame displayed by the OLED unit 241 from the reception buffer 440. Therefore, the control section 410 can specify the frame identification information of the frame being displayed.

The control device 10 transmits the frames of the same video data to the first display device 30 and the second display device 40. Timing when the control device 10 transmits the frames to the first display device 30 and timing when the control device 10 transmits the frames to the second display device 40 are synchronized. Therefore, the first display device 30 and the second display device 40 display, at the same timing, the same frame transmitted by the control device 10. Consequently, the same frame is visually recognized by the right eye RE and the left eye LE of the user.

Display deviation sometimes occurs between the first display device 30 and the second display device 40. For example, as shown in FIG. 9, the display deviation is a phenomenon in which the frame displayed in the display region V3 by the first display device 30 and the frame displayed in the display region V4 by the second display device 40 deviate from each other. In FIG. 9, an example is shown in which the frame 1 transmitted by the control device 10 before the frame 3 is displayed in the display region V4 at timing when the frame 3 is displayed in the display region V3. In this case, different frames are visually recognized by the right eye RE and the left eye LE of the user. Therefore, a sense of discomfort of the user is caused.

The display deviation is caused because, for example, one of the first display device 30 and the second display device 40 has failed in the reception of the frames transmitted by the control device 10. This phenomenon could occur when there is a marked difference between a communication state between the control device 10 and the first display device 30 and a communication state between the control device 10 and the second display device 40. The display deviation is also caused because display timing is delayed in one of the first display device 30 and the second display device 40 because of a failure of processing of the video data or a delay of the processing.

When the display deviation occurs between the first display device 30 and the second display device 40, the display system 100 performs deviation correction processing for correcting the display deviation and shifting to a state in which the first display device 30 and the second display device 40 display the same frame.

In the deviation correction processing, the display system 100 detects the display deviation by collating the frame identification information of the frame displayed by the first display device 30 and the frame identification information of the frame displayed by the second display device 40. When the display deviation is detected, processing for coping with the display deviation is performed such that a sense of discomfort of the user is not caused by the display deviation.

In this embodiment, an example is explained in which the first display device 30 executes processing for detecting display deviation. An example is explained in which the first display device 30 and the second display device 40 execute, according to control by the first display device 30, processing for coping with the display deviation. Since the first display device 30 executes the processing for detecting display deviation, when receiving and displaying the video data transmitted from the control device 10, the second display device 40 transmits the frame identification information of the frame to be displayed to the first display device 30. The first display device 30 detects display deviation using the frame identification information received from the second display device 40.

The detection of display deviation and the processing for coping with the display deviation in the display system 100 are explained in detail below.

Figure 10:
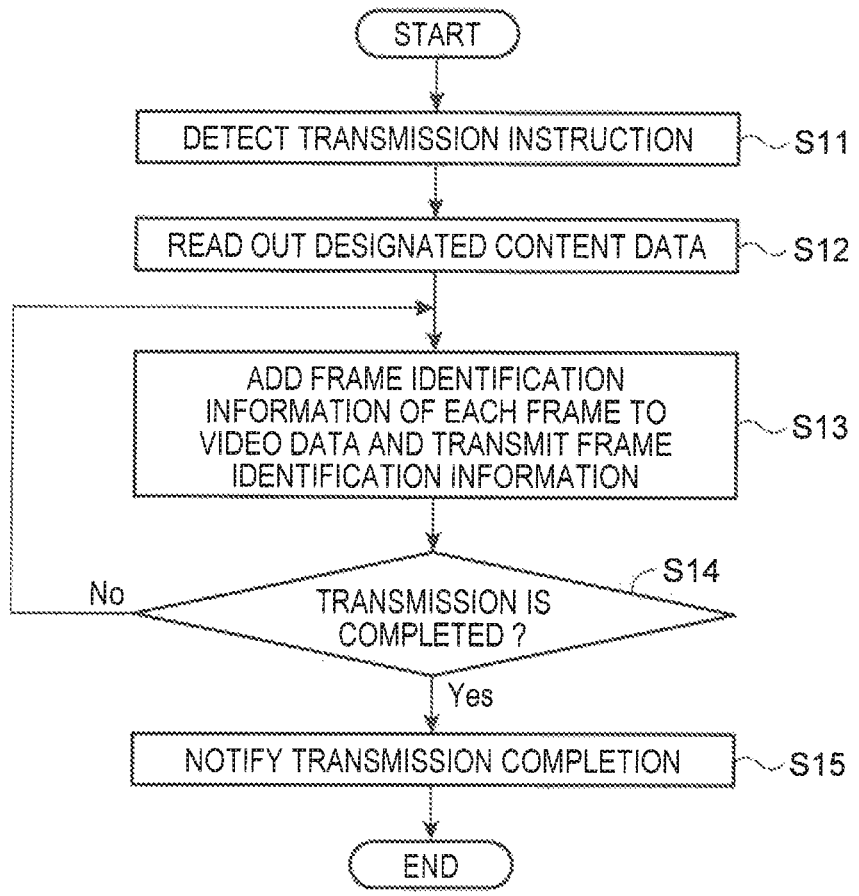
FIG. 10 is a flowchart for explaining the operation of the control device in the first embodiment.

FIG. 10 is a flowchart for explaining the operation of the control device 10 in the first embodiment.

When detecting that an instruction for transmission of the content data 125 is received by the operation section 110 (step S11), the control section 150 of the control device 10 reads out the content data 125 designated by the instruction from the storing section 122 (step S12). The control section 150 performs, on video data of the content data 125 read out from the storing section 122, processing for adding frame identification information to frames and transmits data of the frames and the frame identification information (step S13).

In step S13, the control section 150 transmits the data of the frames and the frame identification information to each of the first display device 30 and the second display device 40. The control section 150 desirably synchronizes timing for transmitting the data to the first display device 30 and timing for transmitting the data to the second display device 40. Under conditions in which a communication environment is satisfactory, the first display device 30 and the second display device 40 receive, from the control device 10, the data of the frames added with the same frame identification information simultaneously or with a time difference of a degree regarded as substantially simultaneous.

The control section 150 determines whether the transmission of all the frames forming the designated content data 125 is completed (step S14). While the transmission is not completed (No in step S14), the control section 150 executes step S13. When the transmission is completed (Yes in step S14), the control section 150 transmits control data for notifying the transmission completion of the content data 125 to the first display device 30 and the second display device 40 (step S15) and ends the processing.

Figure 11:
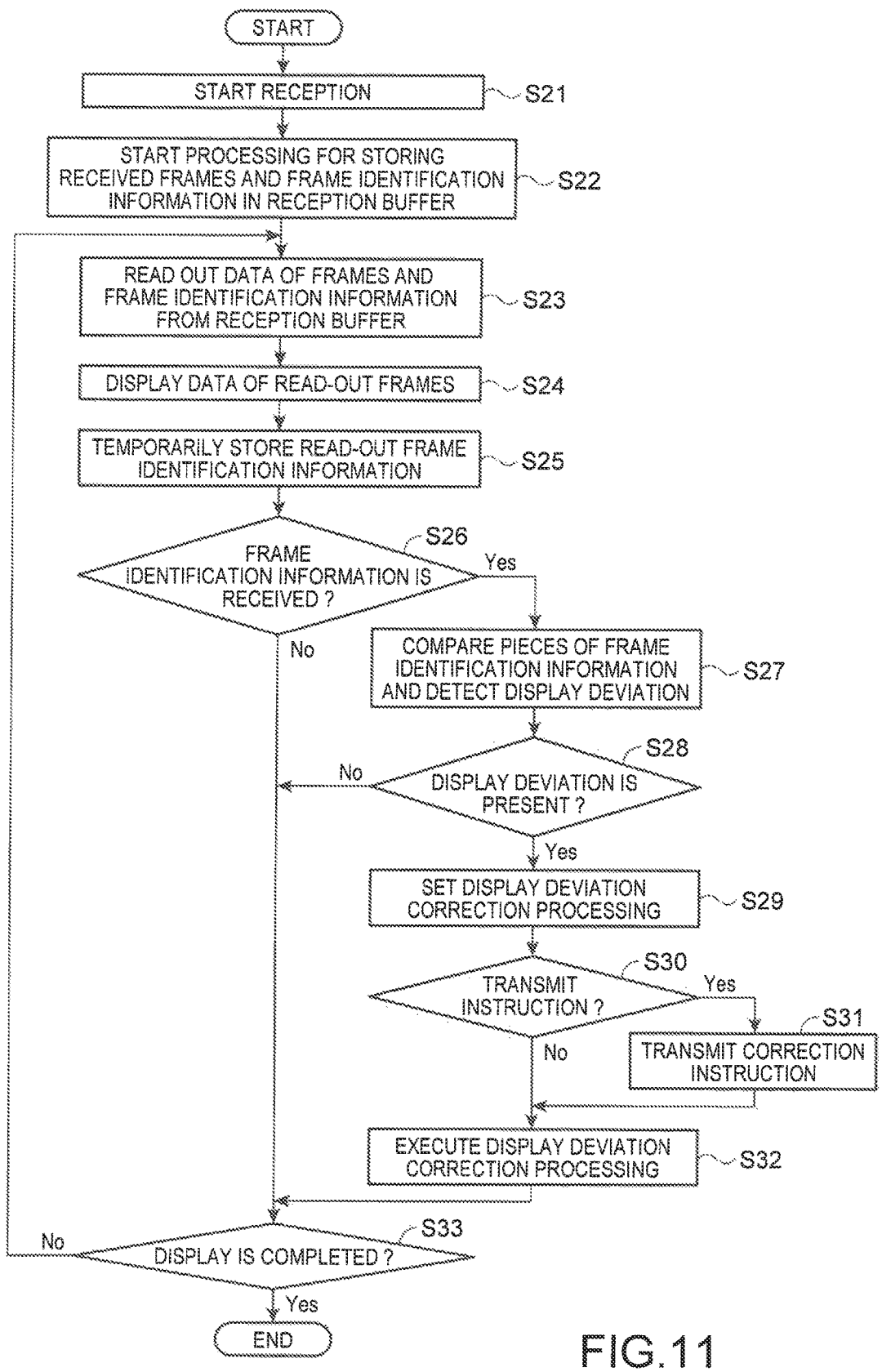
FIG. 11 is a flowchart for explaining the operation of the first display device in the first embodiment.

FIG. 11 is a flowchart for explaining the operation of the first display device 30.

The control section 310 of the first display device 30 starts, according to the control data transmitted by the control device 10, reception of the video data transmitted by the control device 10 (step S21). The control section 310 starts processing for storing, in the reception buffer 340, the frames received from the control device 10 and the frame identification information corresponding to the received frames (step S22).

The control section 310 reads out the frame data 341 and the frame identification information 343 corresponding to the frame data 341 from the reception buffer 340 (step S23) and displays an image on the basis of the read-out frame data (step S24). When the reception buffer 340 stores data of a plurality of frames, the control section 310 reads out the frames in order from the oldest frame among the frames not displayed. That is, the control section 310 reads out and displays the data of the frames in the order of the reception from the control device 10.

The control section 310 temporarily stores the frame identification information read out in step S23 in the storing section 330 or a not-shown RAM (step S25).

The control section 310 determines whether the frame identification information is received from the second display device 40 (step S26).

When the frame identification information is received (Yes in step S26), the control section 310 detects display deviation on the basis of the received frame identification information (step S27). Specifically, the control section 310 compares the frame identification information received from the second display device 40 and the frame identification information temporarily stored in step S25. The control section 310 determines, on the basis of whether the pieces of frame identification information coincide, whether the frame displayed by the first display device 30 and the frame displayed by the second display device 40 deviate from each other. In step S27, the control section 310 performs processing for calculating the number of deviating frames by comparing the pieces of frame identification information.

That is, in this embodiment, as a specific example of a configuration in which the inter-device communication section 34 and the inter-device communication section 44 execute communication to detect deviation between the frames displayed by the OLED units 221 and 241, an example is explained in which the control section 310 performs the detection. In this example, the second display device 40 transmits information to the first display device 30 and the first display device 30 detects deviation. Specifically, the control section 410 controls the inter-device communication section 44 to transmit the frame identification information of the frame displayed by the OLED unit 241 to the first display device 30. The first display device 30 receives, through the inter-device communication section 34, the frame identification information transmitted by the second display device 40. The control section 310 compares the frame identification information with the frame identification information of the frame displayed by the OLED unit 221.

As another example, it is also possible that the first display device 30 transmits the frame identification information to the second display device 40 and the control section 410 compares the pieces of frame identification information and detects display deviation. The processing for comparing the pieces of frame identification information is an example of processing for detecting display deviation. For example, the inter-device communication section 34 and the inter-device communication section 44 may communicate with each other to detect deviation between timing when the OLED unit 221 displays a frame and timing when the OLED unit 241 displays the frame. Specifically, deviation of display may be detected by detecting a difference between timing when the OLED unit 221 displays a frame including frame identification information set in advance and timing when the OLED unit 241 displays the frame.

When the pieces of frame identification information coincide with each other and the control section 310 determines that display deviation is absent (No in step S28), the control section 310 shifts to step S33 explained below. When the pieces of frame identification information do not coincide with each other, the control section 310 determines that display deviation is present (Yes in step S28) and sets display deviation correction processing to be executed (step S29). In step S29, the control section 310 sets contents of processing executed to correct the display deviation and the number of frames to be corrected.

As the display deviation correction processing executed in the display system 100, for example, four kinds of methods can be used. The control section 310 may set in advance to execute any one of the four kinds of display deviation correction processing. A plurality of kinds of display deviation correction processing among the four kinds of display deviation correction processing may be executable according to the control by the control section 310. In this case, the control section 310 may be capable of setting a kind of the display deviation correction processing to be executed or may execute the display deviation correction processing of a kind selected in advance.

When the display deviation occurs, the frame displayed by one of the first display device 30 and the second display device 40 is a frame transmitted by the control device 10 earlier than the frame displayed by the other device, that is, an old frame. In the following explanation, an example is explained in which the frame displayed by the second display device 40 is older than the frame displayed by the first display device 30. That is, the second display device 40 displays the frame later than the first display device 30. In this example, the first display device 30 can also be referred to as a device on a preceding side of the frame to be displayed and the second display device 40 can also be referred to as a device on a delayed side of the frame to be displayed. Naturally, opposite display deviation could occur in the display system 100. The display deviation can also be corrected.

Specific methods of the display deviation correction processing are (1) to (4) described below.

(1) The display of the second display device 40 is rest and the second display device 40 is shifted to a state in which the second display device 40 displays the latest frame received from the control device 10.

(2) The display of the second display device 40 is stopped.

(3) The first display device 30 displays the same frame a plurality of times while the frames displayed by the second display section 40 are switched in order.

(4) The display of the first display device 30 is temporarily stopped while the frames displayed by the second display device 40 are switched in order.

The method (1) is explained below with reference to FIG. 13. The method (2) is explained below with reference to FIG. 14. The method (3) is explained below with reference to FIG. 15. The method (4) is explained below with reference to FIG. 16.

The control section 310 sets the display deviation correction processing (step S29) and determines whether an instruction is transmitted to the second display device 40 in the set display deviation correction processing (step S30). For example, when the display deviation correction processing is executed according to the methods (1) and (2) described above, the control section 310 transmits an instruction to the second display device 40.

When transmitting the instruction to the second display device 40 (Yes in step S30), the control section 310 transmits control data indicating the instruction related to the correction to the second display device 40 (step S31) and shifts to step S32. When not transmitting the instruction to the second display device 40 (No in step S30), the control section 310 shifts to step S32.

In step S32, the control section 310 executes the display deviation correction processing set in step S29 and shifts to step S33.

In step S33, the control section 310 determines whether to end the display. When a condition for completing the display is satisfied, for example, when the control device 10 ends the transmission of the video data or when a display stop is instructed by control data from the control device 10 (Yes in step S33), the control section 310 ends the processing.

When the display is not completed (No in step S33), the control section 310 returns to step S23.

Figure 12:
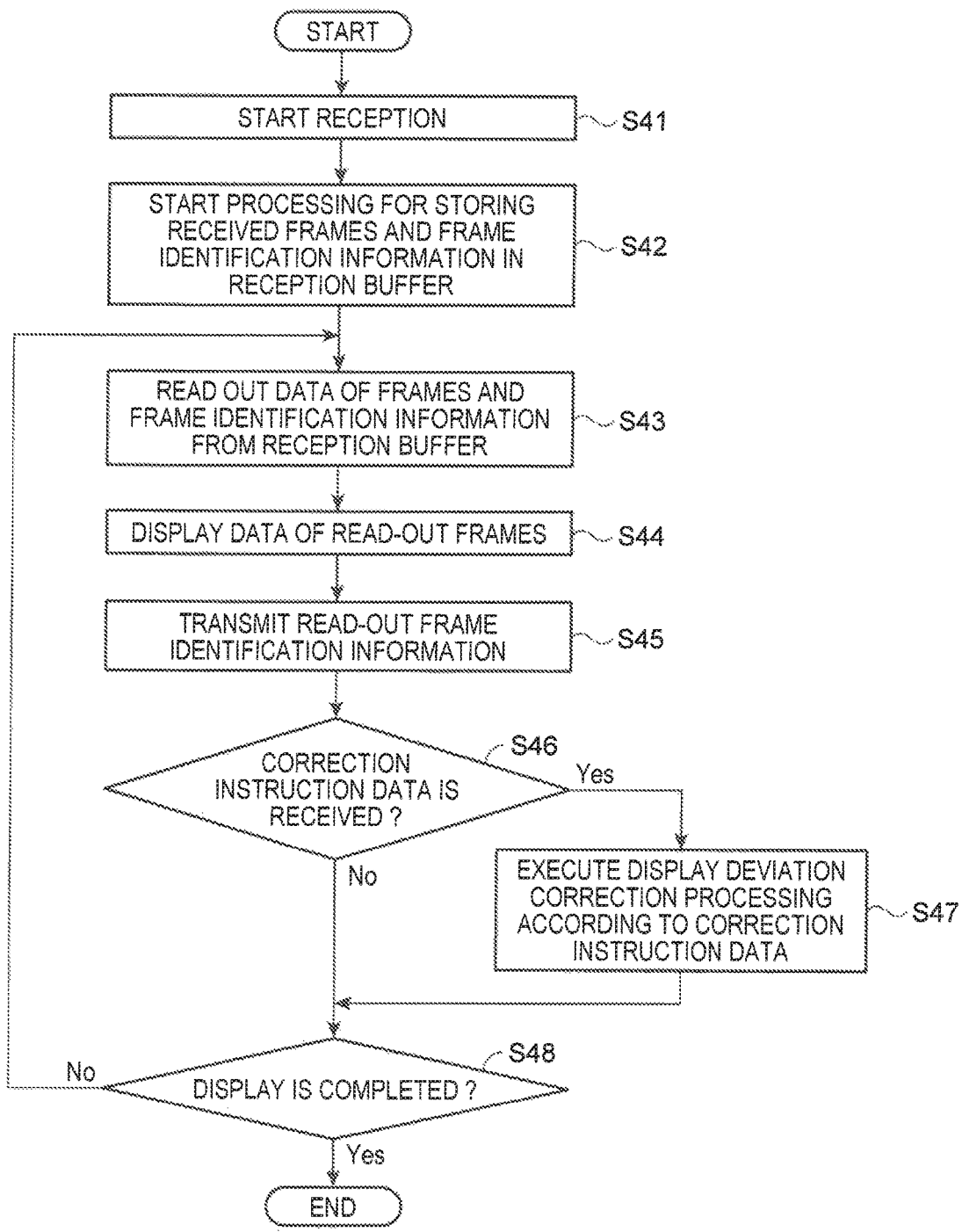
FIG. 12 is a flowchart for explaining the operation of the second display device in the first embodiment.

FIG. 12 is a flowchart for explaining the operation of the second display device 40.

The control section 410 of the second display device 40 starts, according to control data transmitted by the control device 10, reception of video data transmitted by the control device 10 (step S41). The control section 410 starts processing for storing frames received from the control device 10 and frame identification information corresponding to the received frames in the reception buffer 440 (step S42).

The control section 410 reads out the frame data 441 and the frame identification information 443 corresponding to the frame data 441 from the reception buffer 440 (step S43) and displays an image on the basis of the read-out frame data 441 (step S44). When the reception buffer 440 stores data of a plurality of frames, the control section 410 reads out the frames in order from the oldest frame among the frames not displayed. That is, the control section 410 reads out and displays the data of the frames in the order of the reception from the control device 10.

The control section 410 transmits the frame identification information read out in step S43 to the first display device 30 (step S45).

The control section 410 determines whether control data indicating an instruction concerning the display deviation correction processing is received from the first display device 30 (step S46).

When receiving the instruction (Yes in step S46), the control section 410 executes the display deviation correction processing according to the received instruction (step S47) and shifts to step S48. Specific contents of the display deviation correction processing executed in step S47 are explained below with reference to FIGS. 13 to 16.

When not receiving the instruction from the first display device 30 (No in step S46), the control section 410 shifts to step S48.

In step S48, the control section 410 determines whether to end the display. When a condition for completing the display is satisfied, for example, when the control device 10 ends the transmission of the video data or when a display stop is instructed by control data from the control device 10 (Yes in step S48), the control section 410 ends the processing. When the display is not completed (No in step S48), the control section 410 returns to step S43.

Figure 13:
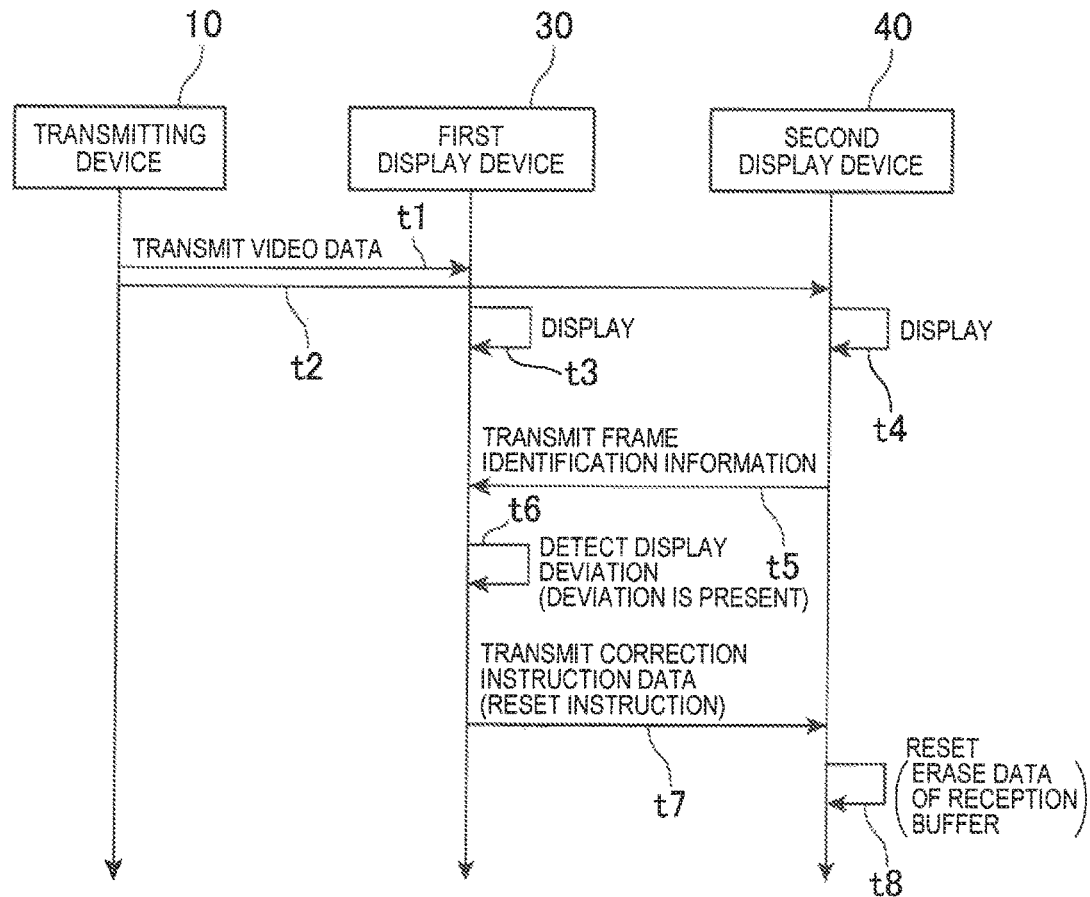
FIG. 13 is a sequence chart showing an operation example of the display system in the first embodiment.

FIG. 13 is a sequence chart showing the operation of the display system 100 concerning the display deviation correction processing. Specifically, FIG. 13 shows an example in which the display system 100 executes the display deviation correction processing according to the method (1) described above. As explained above, in the following explanation, operation performed when display deviation in which the display of the second display device 40 is delayed occurs is explained as an example.

The control device 10 executes processing for transmitting video data to the first display device 30 (step t1) and processing for transmitting video data to the second display device 40 (step t2). The two kinds of processing are executed in synchronization with each other as shown in FIG. 9. Frames of the video data are transmitted to the first display device 30 and the second display device 40 at the same timing or timing that can be regarded as substantially simultaneous.

The first display device 30 displays, in units of frames, the video data received from the control device 10 (step t3). The second display device 40 displays, in units of frames, the video data received from the control device 10 (step t4). When displaying the frames of the video data, the second display device 40 transmits frame identification information to the first display device 30 (step t5). The first display device 30 performs processing for detecting display deviation (step t6). The above operation is as explained with reference to FIGS. 10 to 12.

In the example shown in FIG. 13, the control section 310 transmits control data for instructing reset to the second display device 40 (step t7). When receiving the control data for instructing reset from the first display device 30, the control section 410 executes data reset and erases the frame data 441 stored in the reception buffer 440 (step t8). In the data rest, the control section 410 may erase the frame identification information 443 stored by the reception buffer 440. In the data reset, the control section 410 may erase the frame being displayed and temporarily stop the display.

By performing the data reset, the control section 410 stores a frame received from the control device 10 next in the reception buffer 440 and displays data of the frame. Therefore, it is possible to eliminate a state in which the display of the second display device 40 is later than the display of the first display device 30 and correct the display deviation.

Figure 14:
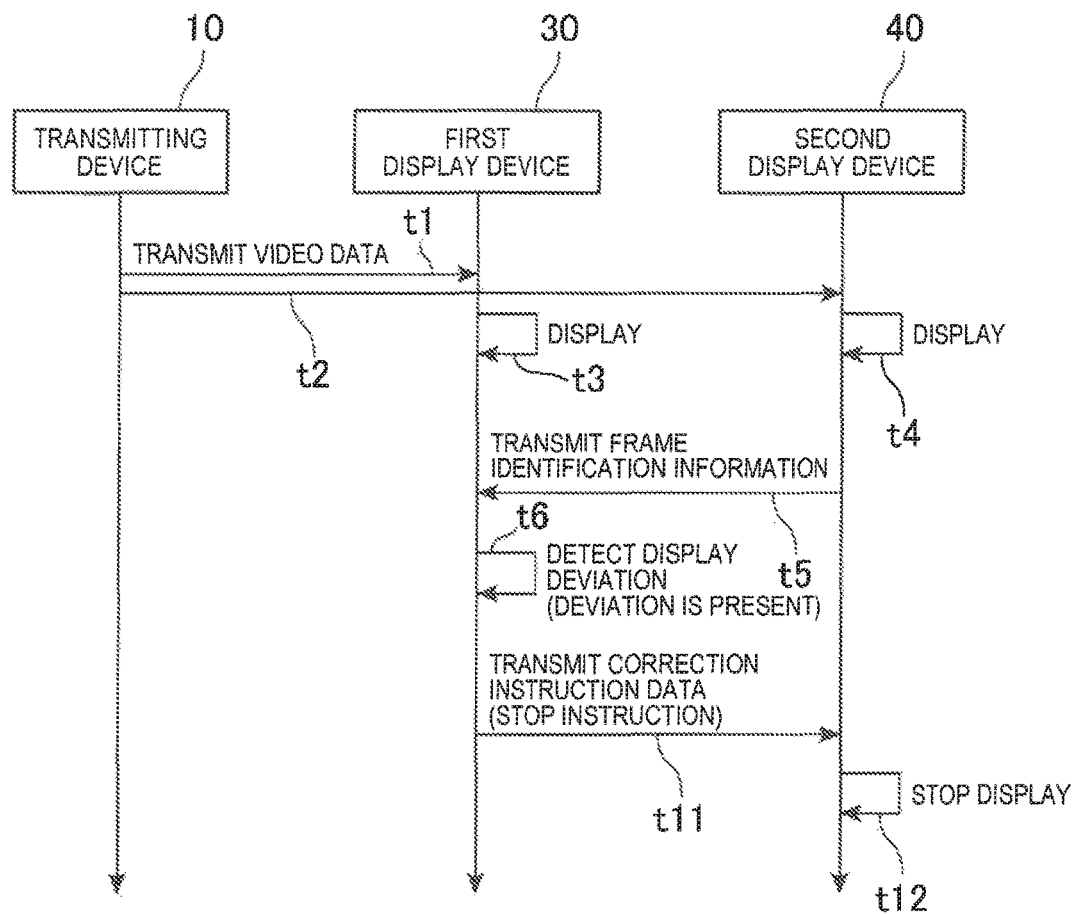
FIG. 14 is a sequence charge showing an operation example of the display system in the first embodiment.

FIG. 14 is a sequence chart showing the operation of the display system 100 concerning the display deviation correction processing. Specifically, FIG. 14 shows an example in which the display system 100 executes the display deviation correction processing according to the method (2) described above. Note that kinds of processing same as the kinds of processing in the operation shown in FIG. 13 are denoted by the same step numbers.

The control device 10 executes processing for transmitting video data to the first display device 30 (step t1) and processing for transmitting video data to the second display device 40 (step t2). The first display device 30 displays, in units of frames, the video data received from the control device 10 (step t3). The second display device 40 displays, in units of frames, the video data received from the control device 10 (step t4). When displaying the frames of the video data, the second display device 40 transmits frame identification information to the first display device 30 (step t5). The first display device 30 performs processing for detecting display deviation (step t6).

In the example shown in FIG. 14, the control section 310 transmits control data for instructing a display stop to the second display device 40 (step t11). When receiving the control data for instructing the display stop from the first display device 30, the control section 410 erases the frame being displayed and stops the display (step t12).

Consequently, the OLED unit 241 (FIG. 5) displays nothing. For the user wearing the HMD 20, an image is displayed to the right eye RE by the OLED unit 221. On the other hand, the displayed image is not visually recognized by the left eye LE.

In the HMD 20, the first display device 30 and the second display device 40 respectively cause the right eye RE and the left eye LE to visually recognize an image. Therefore, when display deviation occurs, the user feels a strong sense of discomfort. In this case, if the display of one of the OLED units 221 and 241 is stopped, the user visually recognizes the image on one side of the right eye RE or the left eye LE. Therefore, it is possible to prevent the user from feeling a sense of discomfort because of inconsistency of the left display and the right display. In the HMD 20, when the display of the OLED unit 241 is stopped, an outside scene is visually recognized by the left eye LE with the external light OL transmitted through the left light guide plate 28. Naturally, the outside scene matches an outside scene visually recognized by the right eye RE with the external light OL transmitted through the right light guide plate 26. Therefore, it is less likely that a sense of discomfort is given to the user when the OLED unit 241 stops the display.

Figure 15:
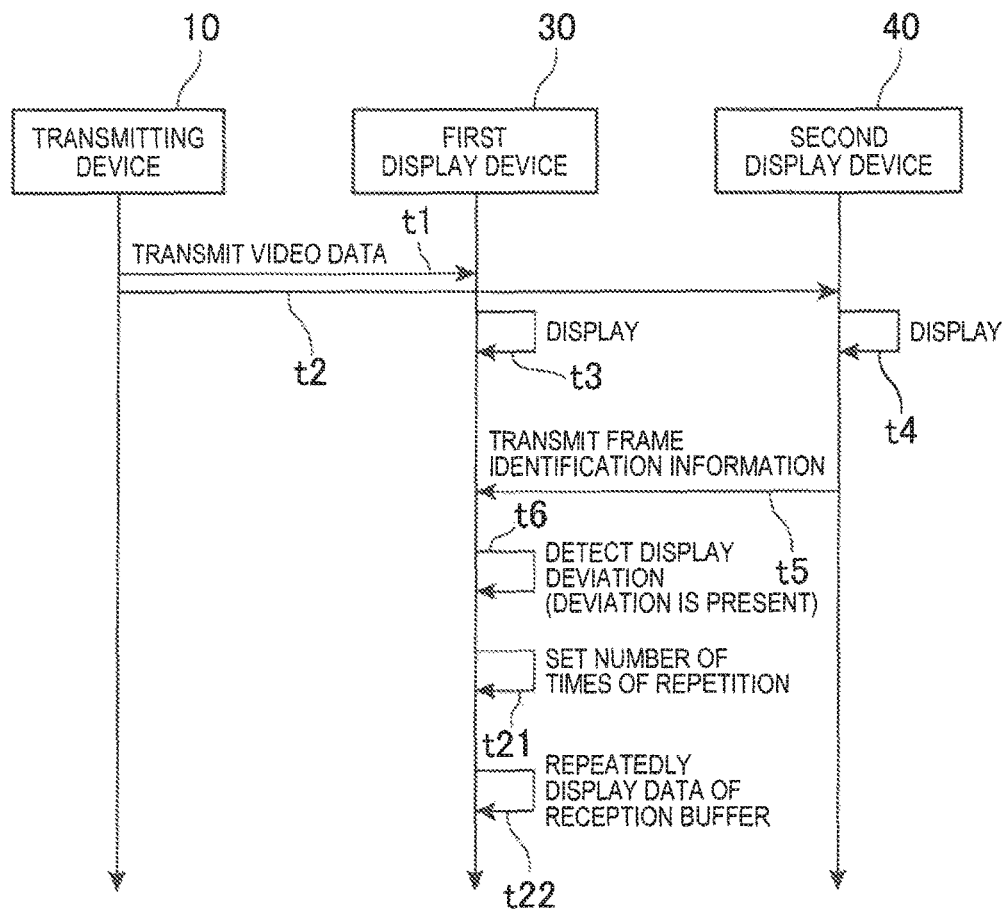
FIG. 15 is a sequence chart showing an operation example of the display system in the first embodiment.

FIG. 15 is a sequence chart showing the operation of the display system 100 concerning the display deviation correction processing. Specifically, FIG. 15 shows an example in which the display system 100 executes the display deviation correction processing according to the method (3) described above.

Operations in steps t1 to t6 are processing same as the operations shown in FIGS. 13 and 14. Therefore, explanation of the operations is omitted.

In the example shown in FIG. 15, the first display device 30 repeatedly displays a frame according to the control by the control section 310. For example, when the second display device 40 performs display later than the first display device 30 by five frames (when a deviation amount is five frames), the first display device 30 performs the repeated display for the five frames. Specifically, after displaying one frame, the first display device 30 repeats the display of the frame five times. In this case, since the one frame is displayed six times, it is possible to eliminate the deviation for the five frames.

In FIG. 15, the control section 310 calculates and sets the number of times of repetition of display according to the deviation amount detected in step t6, that is, the number of frames deviating in display (step t21). In the processing for setting the number of times of repetition, the control section 310 may set the number of times of repetition of a plurality of frames. For example, if the number of times of repetition of one frame is set to two and the number of times of repetition of the next frame is set to three, it is possible to correct the display deviation of the five frames in total.

The control section 310 repeatedly executes the display of the frames by the number of times set in step t21 (step t22). In step t22, for example, the control section 310 executes processing for repeatedly reading out one frame data 341 from the reception buffer 340 and displaying the one frame data 341. In this case, the control section 310 only has to execute the processing for reading out data of the frames from the reception buffer 440 in the same manner as when the repetition is not performed. Therefore, there is an advantage that it is possible to simplify the display deviation correction processing.

Figure 16:
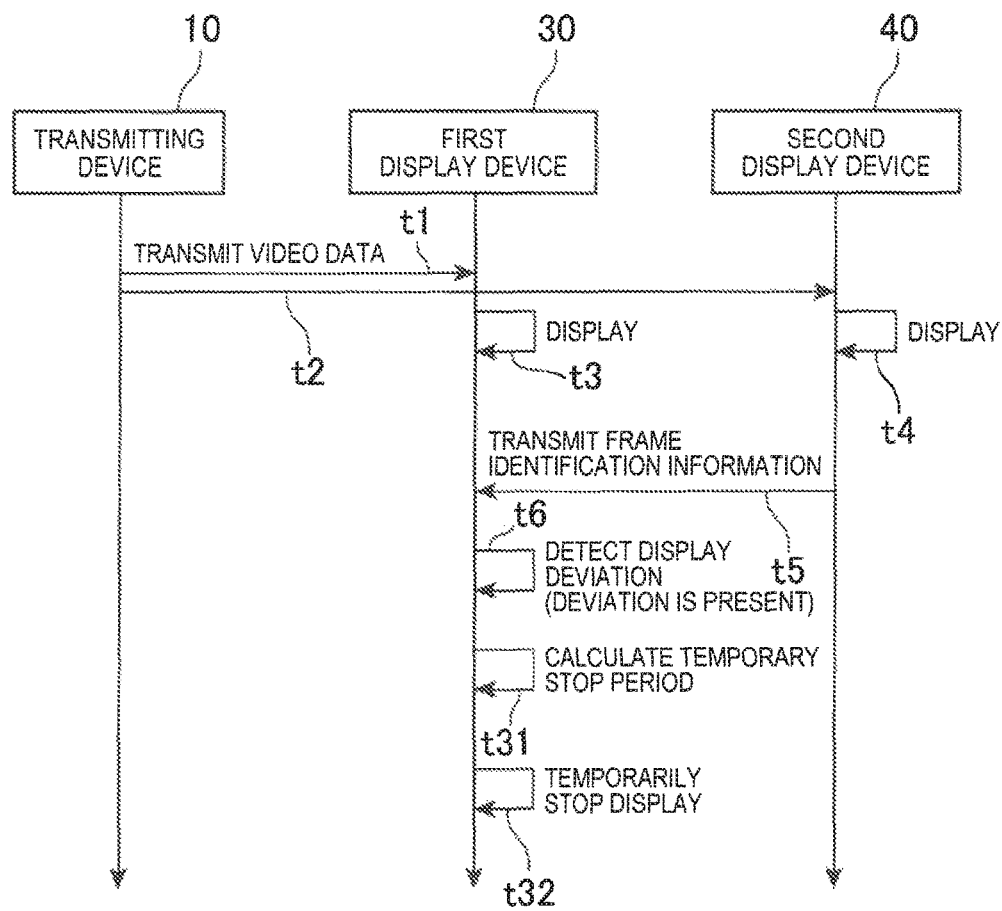
FIG. 16 is a sequence chart showing an operation example of the display system in the first embodiment.

FIG. 16 is a sequence chart showing the operation of the display system 100 concerning the display deviation correction processing. Specifically, FIG. 16 shows an example in which the display system 100 executes the display deviation correction processing according to the method (4) described above.

Operations in step t1 to t6 are processing same as the operations shown in FIGS. 13 to 15. Therefore, explanation of the operations is omitted.

In the example shown in FIG. 16, the first display device 30 temporarily stops display according to the control by the control section 310. During the stop, the first display device 30 does not perform display by the OLED unit 221. Therefore, there is no image displayed by the OLED unit 221. That is, an image is not visually recognized by the right eye RE of the user. The control section 310 sets, according to a deviation amount of display deviation, a period in which the display is temporarily stopped. For example, when the second display device 40 performs display later than the first display device 30 by five frames (when a deviation amount is five frames), the first display device 30 stops the display for time equivalent to a display period of the five frames.

In FIG. 16, the control section 310 calculates, according to the deviation amount detected in step t6, that is, the number of frames deviating in display, the period in which the display is temporarily stopped (step t31). The control section 310 stops the display by the OLED unit 221 by the period calculated in step t31 (step t32). After the period in which the display is stopped elapses, the control section 310 resumes the processing for reading out the frame data 341 from the reception buffer 340 and displaying the frame data 341. Note that, even while the display is temporarily stopped, the control section 310 stores frames of video data and frame identification information received from the control device 10 in the reception buffer 340. It is also possible that the first display device 30 stores image data for the temporary stop (e.g., an image of a single color of black) in the reception buffer 340 and, during the temporary stop, the control section 310 reads out the image data for the temporary stop from the reception buffer 340 and displays the image data for the temporary stop. In this case, the control section 310 only has to execute the processing for reading out data from the reception buffer 340 and displaying the data even during the temporary stop. Therefore, there is an advantage that it is possible to simplify the display deviation correction processing.

As explained above, the display system 100 in the embodiment applied with the invention includes the control device 10 that transmits video data and the first display device 30 and the second display device 40 that display videos on the basis of the video data transmitted by the control device 10. The control device 10 includes the wireless communication section 190 that wirelessly transmits the video data formed by continuous frames to the first display device 30 and the second display device 40. The first display device 30 includes the wireless communication section 33 that receives the video data transmitted by the control device 10, the OLED unit 221 that displays a video on the basis of the video data received by the wireless communication section 33, and the inter-device communication section 34 that communicates with the second display device 40. The second display device 40 includes the wireless communication section 43 that receives the video data transmitted by the control device 10, the OLED unit 241 that displays a video on the basis of the video data received by the wireless communication section 43, and the inter-device communication section 44 that communicates with the first display device 30. The inter-device communication section 34 included in the first display device 30 and the inter-device communication section 44 included in the second display device 40 execute communication to detect deviation between the video displayed by the OLED unit 221 and the video displayed by the OLED unit 241.

Consequently, when the control device 10 transmits the video data to the first display device 30 and the second display device 40, which are the plurality of display devices included in the HMD 20, it is possible to detect the deviation between the videos in the first display device 30 and the second display device 40. Therefore, for example, since it is possible to detect deviation between timings for displaying the videos, it is possible to match the videos displayed by the plurality of display devices by taking measures against the deviation of this type.

In the display system 100, the control device 10 transmits video data formed by frames. The first display device 30 displays a video with the OLED unit 221 in units of frames on the basis of the video data received by the wireless communication section 33. The second display device 40 displays a video with the OLED unit 241 in units of frames on the basis of the video data received by the wireless communication section 43. The inter-device communication section 34 and the inter-device communication section 44 execute communication to detect deviation between a frame displayed by the OLED unit 221 and a frame displayed by the OLED unit 241. Consequently, it is possible to detect deviation between frames displayed by the first display device 30 and the second display device 40, which are the plurality of display devices included in the HMD 20. Therefore, it is possible to match display timings of the videos displayed by the plurality of display devices.

The control device 10 transmits the video data and frame identification information for identifying the respective frames of the video data. In the first display device 30 and the second display device 40, the inter-device communication section 34 and the inter-device communication section 44 execute communication. Consequently, the first display device 30 and the second display device 40 compare the frame identification information of the frame displayed by the OLED unit 221 and the frame identification information of the frame displayed by the OLED unit 241 and detect deviation. Therefore, since it is possible to identify the frames transmitted by the control device 10, it is possible to more surely detect deviation between the frames displayed by the plurality of display devices.

The second display device 40 transmits, through the inter-device communication section 44, data including the frame identification information of the frame displayed by the OLED unit 241 to the first display device 30. The first display device 30 receives, through the inter-device communication section 34, the data transmitted by the second display device 40, compares the frame identification information included in the data received by the inter-device communication section 34 with the frame identification information of the frame displayed by the OLED unit 221, and detects deviation. Consequently, the first display device 30 can surely detect deviation between the frame displayed by the first display device 30 and the frame displayed by the second display device 40.

When the frame displayed by the OLED unit 221 is a frame transmitted by the control device 10 later than the frame displayed by the OLED unit 241, the display system 100 executes the display deviation correction processing.

The display system 100 may reset, according to the method (1) described above, the display of the frame received by the wireless communication section 43 in the second display device 40. In this case, the second display device 40 displays, with the OLED unit 221, a frame received by the wireless communication section 43 next. That is, when deviation between the frame displayed by the first display device 30 and the frame displayed by the second display device 40 is present, the second display device 40, which is a display device on a display side of an old frame, that is, a display device on a delayed display side, is reset. Consequently, it is possible to eliminate display deviation between the first display device 30 and the second display device 40.

The display system 100 may stop, according to the method (2) described above, the display of the OLED unit 241 in the second display device 40. In this case, when display deviation between the first display device 30 and the second display device 40 occurs, the display of the display device on the display side of an old frame, that is, the display device on the delayed display side is stopped. Consequently, it is possible to avoid a state in which the first display device 30 and the second display device 40 continue the display in a state in which the frames deviate.

The first display device 30 may include the reception buffer 340 that stores frames received by the wireless communication section 33. In this case, the display system 100 may display, according to the method (3) described above, the frames stored in the reception buffer 340 a plurality of times with the OLED unit 221. In this case, when display deviation between the first display device 30 and the second display device 40 occurs, the first display device 30, which is a display device on a display side of a new frame, that is, a display device on an advanced display side, displays the same frame a plurality of times. Consequently, it is possible to eliminate advance of the frame to be displayed and eliminate the display deviation between the first display device 30 and the second display device 40.

The display system 100 may stop, according to the method (4) described above, in the first display device 30, the display by the OLED unit 221 by time equivalent to time in which a predetermined number of frames are displayed. Thereafter, the first display device 30 displays, with the OLED unit 221, the frames stored in the reception buffer 340. In this case, when display deviation between the first display device 30 and the second display device 40 occurs, the first display device 30, which is the display device on the display side of a new frame, that is, the display device on the advanced display side, stops the display and eliminates advance of the frame to be displayed. Consequently, it is possible to eliminate the display deviation between the first display device 30 and the second display device 40.

The first display device 30 includes the wireless communication section 33, the OLED unit 221, the inter-device communication section 34, and the control section 310. The first display device 30 receives, with the wireless communication section 33, video data wirelessly transmitted from the control device 10. The first display device 30 displays, with the OLED unit 221, a video on the basis of the video data received by the wireless communication section 33. The first display device 30 communicates with the second display device 40 through the inter-device communication section 34. The first display device 30 executes, with the control section 310, communication with the second display device 40 through the inter-device communication section 34 and detects deviation between a video displayed by the OLED unit 221 and a video displayed by the second display device 40. With this configuration, the first display device 30 can detect deviation between a video displayed by the first display device 30 and a video displayed by the second display device 40. Therefore, for example, since it is possible to detect deviation between timings for displaying the videos, it is possible to match the videos displayed by the first display device 30 and the second display device 40 by taking measures against the deviation of this type.

The first display device 30 displays, with the OLED unit 221, in units of frames, an image based on the video data received by the wireless communication section 33. The control section 310 detects deviation between the frame displayed by the OLED unit 221 and the frame displayed by the second display device 40. With this configuration, it is possible to detect deviation between the frame displayed by the first display device 30 and the frame displayed by the second display device 40. Therefore, it is possible to match display timings of the videos displayed by the first display device 30 and the second display device 40.

The first display device 30 receives, with the wiles communication section 33, the frame identification information for identifying the respective frames included in the video data. Consequently, since it is possible to identify the frames received and displayed by the first display device 30, it is possible to more accurately detect deviation between the frames displayed by the first display device 30 and the second display device 40.

The control section 310 detects deviation by comparing the frame identification information of the frame displayed by the OLED unit 221 and the frame identification information of the frame displayed by the second display device 40. With this configuration, since it is possible to identify the frames transmitted by the control device 10, it is possible to more accurately detect deviation between the frames displayed by the first display device 30 and the second display device 40.

The first display device 30 receives, through the inter-device communication section 34, the frame identification information of the frame displayed by the second display device 40. The control section 310 detects deviation by comparing the frame identification information of the frame displayed by the second display device 40 received by the inter-device communication section 34 with the frame identification information of the frame displayed by the OLED unit 221. With this configuration, the first display device 30 and the second display device 40 can surely detect display deviation between the first display device 30 and the second display device 40 by transmitting and receiving the frame identification information.

The second display device 40 transmits, through the inter-device communication section 44, the frame identification information of the frame displayed by the OLED unit 241 to the first display device 30. With this configuration, the first display device 30 and the second display device 40 can surely detect display deviation between the first display device 30 and the second display device 40 by transmitting and receiving the frame identification information.

The first display device 30 and the second display device 40 configure the HMD 20 functioning as a head-mounted display device. The first display device 30 includes the wireless communication section 33 that receives video data transmitted by the control device 10 and the OLED unit 221 that causes, on the basis of the video data received by the wireless communication section 33, one eye (the right eye) of the user to visually recognize a video. The first display device 30 includes the inter-device communication section 34 that communicates with the second display device 40. The second display device 40 includes the wireless communication section 43 that receives video data transmitted by the control device 10 and the OLED unit 241 that causes, on the basis of the video data received by the wireless communication section 43, the other eye (the left eye) of the user to visually recognize a video. The second display device 40 includes the inter-device communication section 44 that communicates with the first display device 30. The inter-device communication section 34 and the inter-device communication section 44 execute communication, whereby the HMD 20 detects deviation between the videos visually recognized by the user with the right eye and the left eye. Consequently, it is possible to detect deviation between the videos respectively visually recognized by the left and right eyes of the user. Therefore, for example, since it is possible to detect deviation between timings for displaying the videos, it is possible to match the videos visually recognized by the user by taking measures against the deviation of this type. It is possible to prevent or reduce a sense of discomfort of the user involved in the deviation between the videos and so-called visually induced motion sickness.

In the configuration explained in the embodiment, a configuration may be adopted in which the control device 10 transmits video data of a 3D (stereoscopic) video and the HMD 20 displays the 3D video on the basis of the 3D video data. In this case, frames of the video data transmitted to the first display device 30 by the control device 10 and frames of the video data transmitted to the second display device 40 by the control device 10 are video data having a parallax. In this case, when determining in step S28 (FIG. 11) that display deviation is present, the control section 310 may switch a video displayed by the HMD 20 to a 2D (plane) video. Specific operations are as indicated by (A) and (B) below.

(A) The video data transmitted from the control device 10 to the first display device 30 is transmitted to the second display device 40 by the inter-device communication section 34. The second display device 40 displays a video on the basis of the video data received by the inter-device communication section 44. Alternatively, frames of the video data received by the second display device 40 from the control device 10 may be transmitted to the first display device 30.

(B) The first display device 30 requests the control device 10 to transmit frames of the same video data not having a parallax to the first display device 30 and the second display device 40. The control device 10 transmits, in response to the request, the frames of the same video data to the first display device 30 and the second display device 40.

Note that, as a modification of the method (B), it is also conceivable to adopt a method of reducing a parallax between the frames of the video data transmitted to the first display device 30 and the frames of the video data transmitted to the second display device 40 by the control device 10.

By executing these methods, when the user views a 3D video with the HMD 20, the control device 10 can suppress or prevent occurrence of an unpleasant feeling, a sense of discomfort, or so-called visually induced motion sickness of the user due to deviation between frames visually recognized by the left and right eyes.

Further, in step S28 in the embodiment, the control section 310 may have a plurality of references for determining that display deviation is present. For example, when the number of deviating frames is equal to or larger than a first threshold, the control section 310 may determine that display deviation is present (Yes in step S28) and set display deviation correction processing for coping with the display deviation (step S29). In this case, when the number of deviating frames is smaller than the first threshold and equal to or larger than a second threshold, the control section 310 may perform, for example, processing different from the display deviation correction processing illustrated in FIGS. 13 to 16. Specifically, when the number of deviating frames is smaller than the first threshold and equal to or larger than the second threshold, the control section 310 may perform the switching from a 3D video to a 2D video. When the number of deviating frames is smaller than the first threshold and equal to or larger than the second threshold, the control section 310 may execute the operation shown in FIG. 15 or FIG. 16 as the deviation correction processing. In this case, further, when the number of deviating frames is equal to or larger than the first threshold, the control section 310 may execute the operation shown in FIG. 13 or FIG. 14 as the deviation correction processing.

The first threshold and the second threshold may be determined according to a frame rate of the video data transmitted by the control device 10. For example, the first threshold may be set to the number of frames equivalent to 100 milliseconds. In this case, in video data of 30 fps (frames/second), three frames are equivalent to the first threshold. The second threshold only has to be a number smaller than the first threshold.

In the display system 100, when the user wearing the HMD 20 is moving, a threshold related to processing for detecting occurrence of deviation may be changed to make the detection looser. The movement of the user may be determined from, for example, detection results of the various sensors included in the display system 100. Specifically, the movement of the user may be detected from a picked-up image of the camera 61 and a detection value or a change in the detection value of the six-axis sensor 235, the magnetic sensor 237, the six-axis sensor 111, or the magnetic sensor 113. In this case, when a movement amount or speed or acceleration of the movement per unit time is equal to or larger than a set reference value, it is sufficient to switch the second threshold to the first threshold or change values of the first and second thresholds.

Second Embodiment

Figure 17:
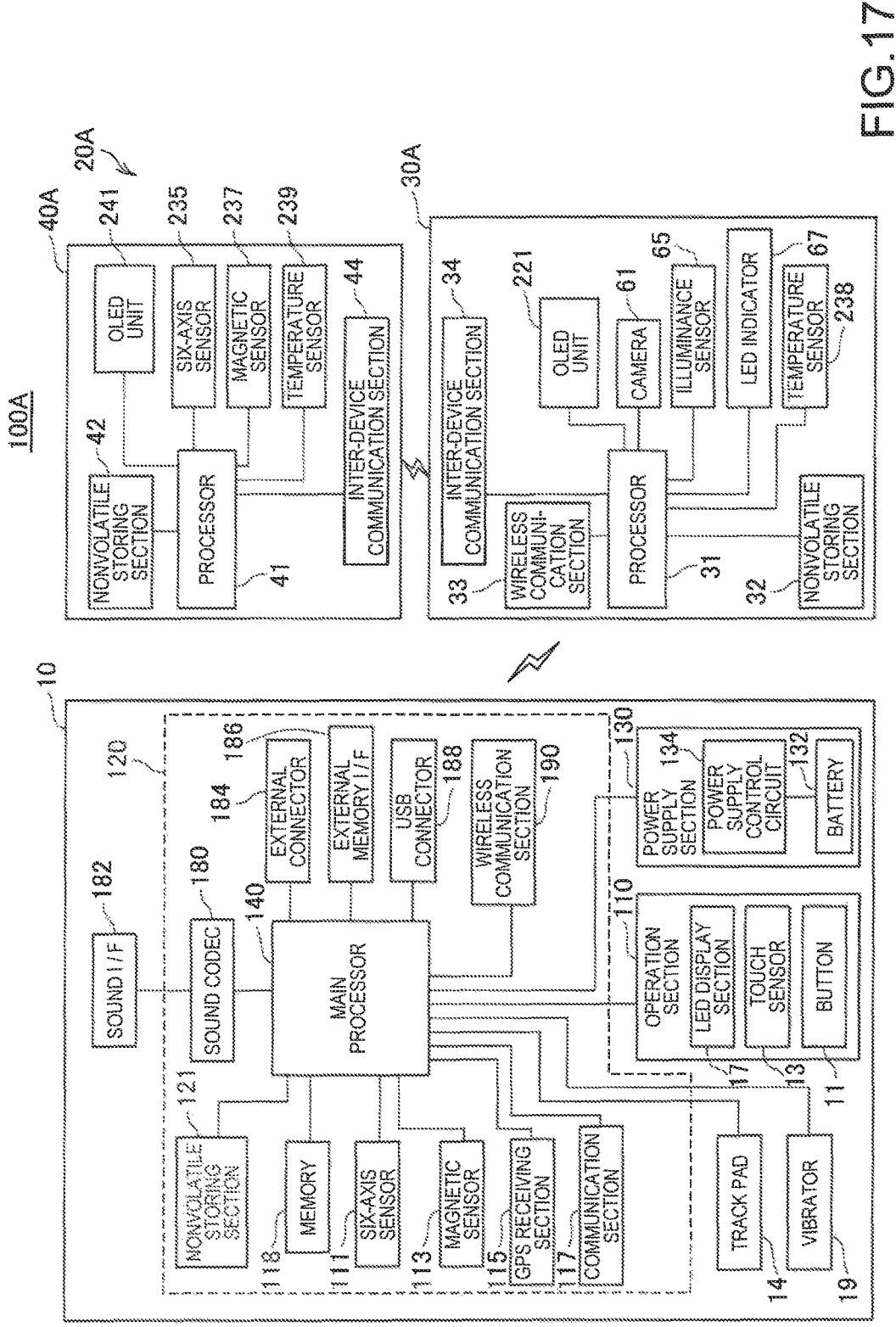
FIG. 17 is a block diagram of devices configuring a display system in a second embodiment.

FIG. 17 is a block diagram of devices configuring a display system 100A according to a second embodiment. In the display system 100A in the second embodiment shown in FIG. 17, components common to the display system 100 explained in the first embodiment are denoted by the same reference numerals and signs and explanation of the components is omitted.

The display system 100A includes a first display device 30A and a second display device 40A instead of the first display device 30 and the second display device 40 included in the HMD 20 in the display system 100 (FIG. 5) explained in the first embodiment. The first display device 30A and the second display device 40A configure a HMD 20A.

The configuration of the control device 10 is the same as the configuration explained in the first embodiment. In the second embodiment, the control device 10 transmits video data to the first display device 30A in units of frames. However, the control device 10 does not transmit the video data to the second display device 40.

The configuration of the first display device 30A is common to the first display device 30. The first display device 30A receives frames of video data and frame identification information from the control device 10 and stores the frames of the video data and the frame identification information in the reception buffer 340. The first display device 30A transmits the frames of the video data and the frame identification information received from the control device 10 to the second display device 40A.

The second display device 40A has a configuration excluding the wireless communication section 43 in the second display device 40 (FIG. 5). The second display device 40A receives, through the inter-device communication section 44, the frames of the video data and the frame identification information from the first display device 30A and stores the frames of the video data and the frame identification information in the reception buffer 440.

Figure 18:
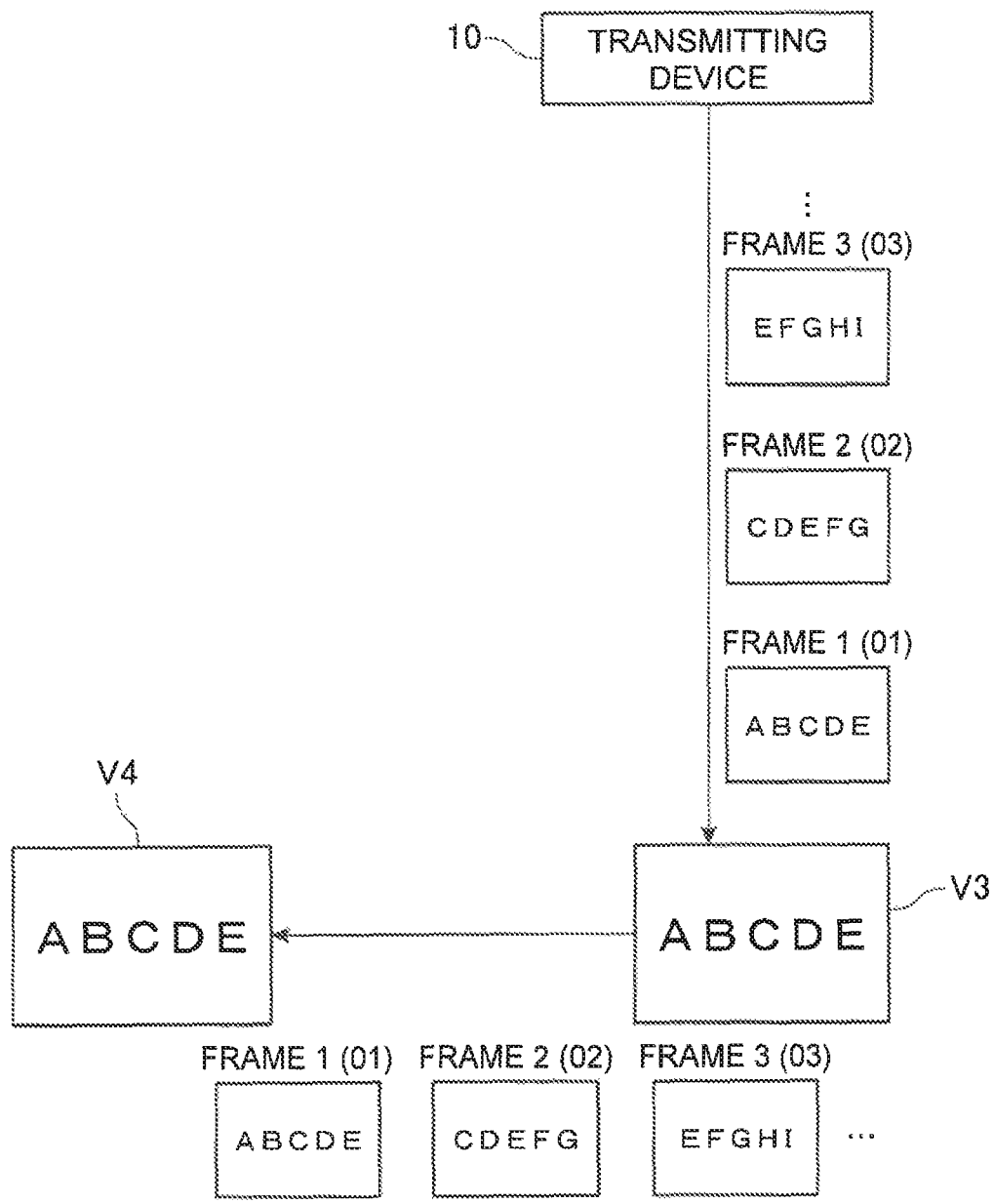
FIG. 18 is an explanatory diagram schematically showing the operation and display deviation of the display system in the second embodiment.

FIG. 18 is an explanatory diagram schematically showing the operation and display deviation of the display system 100A in the second embodiment.

As shown in FIG. 18, the control device 10 transmits video data to the first display device 30A in units of frames. In FIG. 18, an example is shown in which the control device performs the transmission frame by frame. However, naturally, the control device 10 is also capable of collectively transmitting a plurality of frames.

The first display device 30A receives, in units of frames, the video data transmitted by the control device 10. The control device 10 transmits the frames of the video data and the frame identification information for identifying the frame to the first display device 30A in association with each other. A specific example and the like of the frame identification information are the same as the specific example and the like in the first embodiment.

The first display device 30A stores, in units of frames, the video data received from the control device 10 in the reception buffer 340 (FIG. 7) as the frame data 341. The first display device 30A stores the frame identification information received from the control device 10 in the reception buffer 340 as the frame identification information 343.

The first display device 30A transmits the video data received from the control device 10 to the second display device 40A in units of frames. The first display device 30A transmits the frame identification information to the second display device 40A. The first display device 30A may transmit the frames of the video data and the frame identification information received from the control device 10 and once stored in the reception buffer 340 to the second display device 40A.

The second display device 40A stores the frames of the video data and the frame identification information transmitted by the first display device 30A in the reception buffer 440 as the frame data 441 and the frame identification information 443.

The first display device 30A displays, in units of frames, the video data received from the control device 10. The second display device 40A displays, in units of frames, the video data received from the first display device 30A. The first display device 30A synchronizes transmission timing for transmitting the video data to the second display device 40A and timing for reading out the frame data 341 and displaying the frame data 341 in the OLED unit 221.

Consequently, in the HMD 20A, the first display device 30A and the second display device 40A can display the same frame in synchronization with each other.

In the display system 100A, when the control device 10 transmits the video data to the first display device 30A in units of frames, the first display device 30A transmits the frame identification information of the frames of the received video data to the control device 10. The control device 10 receives the frame identification information transmitted by the first display device 30A and compares the frame identification information with the frame identification information already transmitted. Consequently, it is possible to detect deviation between the frame transmitted by the control device 10 and the frame received by the first display device 30A. The control device 10 can calculate a delay time from a time difference between timing when the frame identification information is transmitted to the first display device 30A and timing when the frame identification information is received from the first display device 30A.

Deviation between the control device 10 and the first display device 30A and a phenomenon in which the delay time of the frame identification information increases occur because of, for example, the influence of a communication environment between the control device 10 and the first display device 30A. A delay of processing in the first display device 30A is also a cause of the deviation and the phenomenon. In this case, timing when a user visually recognizes an image displayed by the HMD 20A is delayed. Therefore, for example, when display is changed according to operation on the operation section 110 included in the control device 10, it is likely that the user senses a delay of the display and feels a sense of discomfort.

Therefore, in the second embodiment, a configuration is explained in which the display system 100A detects deviation of the frame identification information and a delay between the control device 10 and the first display device 30A.

Figure 19:
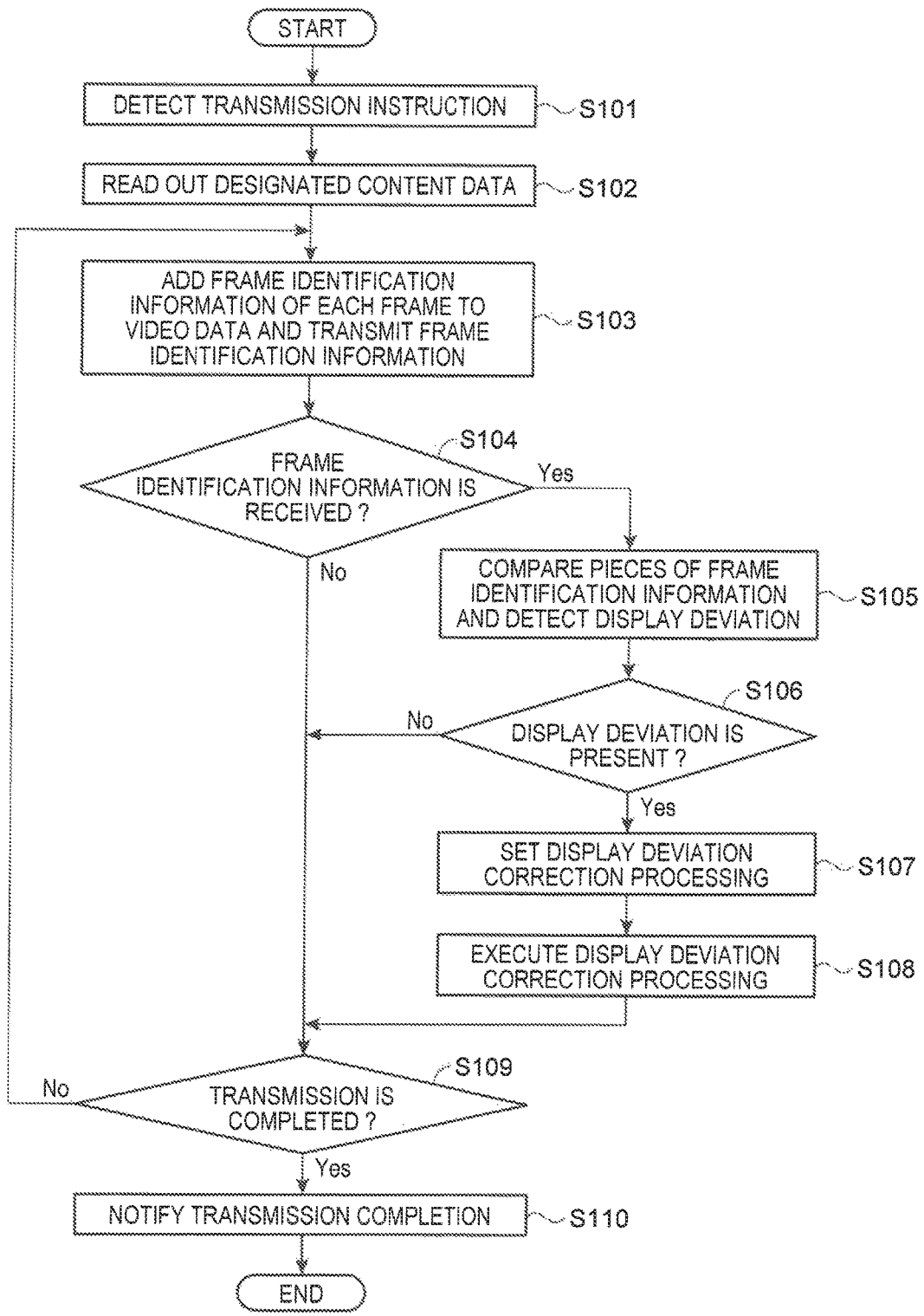
FIG. 19 is a flowchart for explaining the operation of a control device in the second embodiment.

FIG. 19 is a flowchart for explaining the operation of the control device 10 in the second embodiment.

When detecting that an instruction for transmission of the content data 125 is received by the operation section 110 (S101), the control section 150 of the control device 10 reads out the content data 125 designated by the instruction from the storing section 122 (step S102). The control section 150 performs, on video data of the content data 125 read out from the storing section 122, processing for adding frame identification information to frames and transmits data of the frames and the frame identification information (step S103). In step S103, the control section 150 transmits the data of the frames and the frame identification information to the first display device 30A.

The control section 150 determines whether the frame identification information is received from the first display device 30A (step S104).

When receiving the frame identification information (Yes in step S104), the control section 150 detects display deviation on the basis of the received frame identification information (step S105). Specifically, the control section 150 compares the frame identification information received from the first display device 30A and the frame identification information transmitted in step S103 and determines presence or absence of deviation on the basis of whether the pieces of frame identification information coincide with each other. In step S105, the control section 150 performs processing for calculating the number of deviating frames by comparing the pieces of frame identification information.

When determining that the pieces of frame identification information coincide with each other and display deviation or a delay is absent (No in step S106), the control section 150 shifts to step S109 explained below. When the pieces of frame identification information do not coincide with each other, the control section 150 determines that display deviation is present (Yes in step S106) and sets display deviation correction processing to be executed (step S107). In step S107, the control section 150 sets contents of processing executed to correct the display deviation or the delay and the number of frames to be corrected.

The control section 150 executes the set display deviation correction processing in step S108 and shifts to step S109.

In step S108, the control section 150 performs, for example, processing for jumping the frames and the frame identification information transmitted to the first display device 30A by a number equivalent to the display deviation or the delay. In this case, a part of frames of the content data 125 scheduled to be transmitted to the first display device 30A by the control device 10 is not transmitted. However, the frames displayed by the first display device 30A and the second display device 4 OA are fast-forwarded. Therefore, the display deviation and the delay are eliminated. In step S108, the control device 10 may perform processing for retransmitting an already-transmitted frame to the first display device 30A. In this case, for example, when the first display device 30A cannot receive a part of the frames transmitted by the control device 10 and the display stops, the display can be normally continued. In step S108, the control device 10 may instruct the first display device 30A to perform reset processing including clearing of the frames stored in the reception buffer 340. In this case, the first display device 30A executes the reset processing for clearing the frame data 341. The first display device 30A may transmit, to the second display device 40A, control data for instructing the reset processing transmitted by the control device 10. In this case, the second display device 40A executes the reset processing for clearing the frame data 441. In this case, the first display device 30A and the second display device 40A display a frame received from the control device 10 next. Therefore it is possible to eliminate the display deviation and the delay.

In step S109, the control section 150 determines whether the transmission of all the frames forming the designated content data 125 is completed. While the transmission is not completed (No in step S109), the control section 150 returns to step S103. When the transmission is completed (Yes in step S109), the control section 150 transmits, to the first display device 30A, control data for notifying the completion of the transmission of the content data 125 (step S110) and ends the processing. When receiving the control data for notifying the completion of the transmission of the content data 125 from the control device 10, the first display device 30A may transmit the received control data to the second display device 40A.

Figure 20:
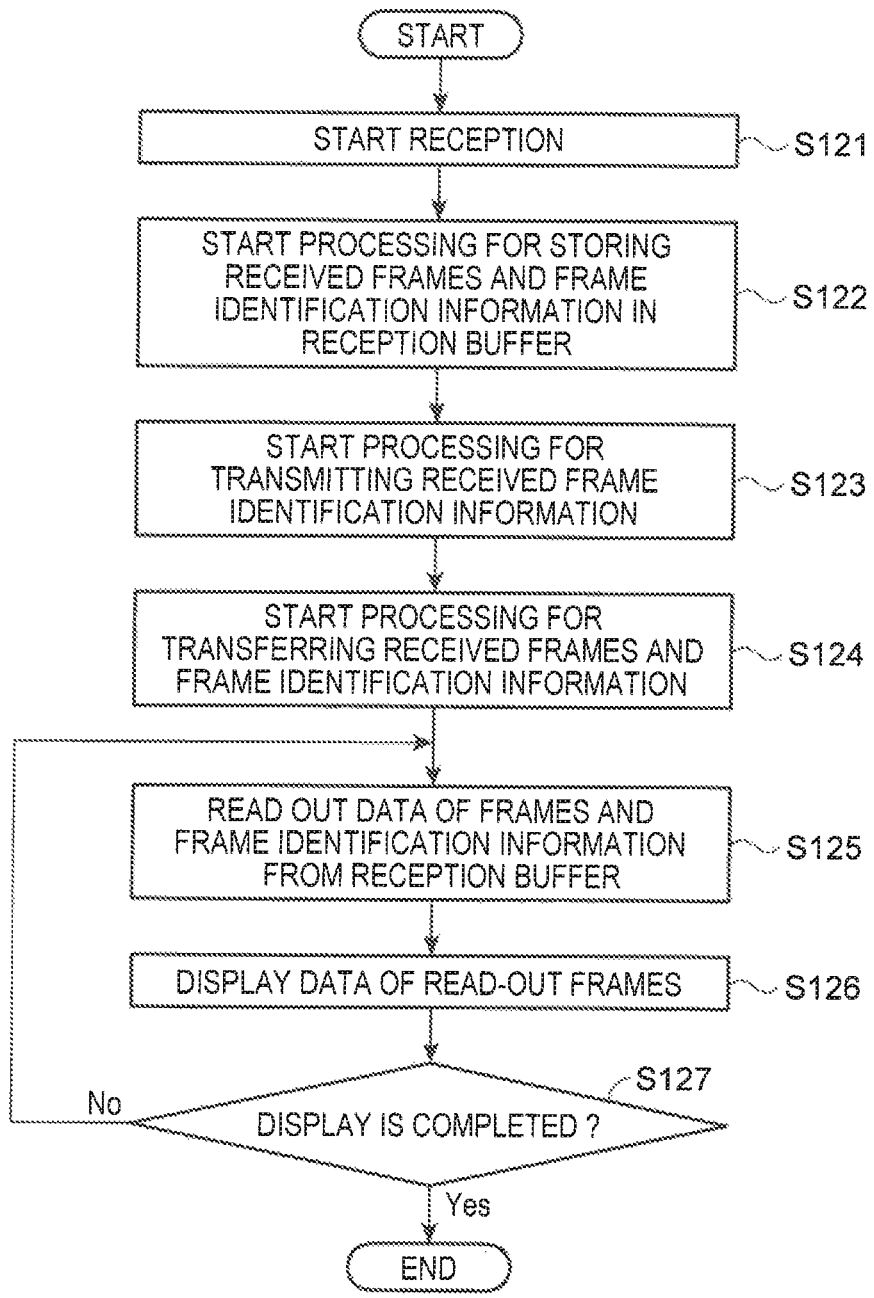
FIG. 20 is a flowchart for explaining the operation of a first display device in the second embodiment.

FIG. 20 is a flowchart for explaining the operation of the first display device 30A.

The control section 310 of the first display device 30A starts, according to the control data transmitted by the control device 10, reception of video data transmitted by the control device 10 (step S121). The control section 310 starts processing for storing, in the reception buffer 340, frames received from the control device 10 and frame identification information corresponding to the received frames (step S122).

The control section 310 starts processing for transmitting the frame identification information received from the control device 10 to the control device 10 (step S123). The control section 310 may transmit the frame identification information to the control device 10 every time the control section 310 receives data of frames from the control device 10. The control section 310 may transmit the frame identification information to the control device 10 every time the control section 310 receives data of a number of frames set in advance.

The control section 310 starts processing for transferring the frames received from the control device 10 and the frame identification information corresponding to the received frames to the second display device 40A (step S124).

The control section 310 reads out the frame data 341 and the frame identification information 343 corresponding to the frame data 341 from the reception buffer 340 (step S125) and displays an image on the basis of the read-out frame data 341 (step S126). When the reception buffer 340 stores data of a plurality of frames, the control section 310 reads out the frames in order from the oldest frame among the frames not displayed. That is, the control section 310 reads out and displays the data of the frames in the order of the reception from the control device 10.

The control section 310 determines whether to end the display (step S127). When a condition for completing the display is satisfied, for example, when the control device 10 ends the transmission of the video data or when a display stop is instructed by control data from the control device 10 (Yes in step S127), the control section 310 ends the processing. When the display is not completed (No in step S127), the control section 310 returns to step S125.

Figure 21:
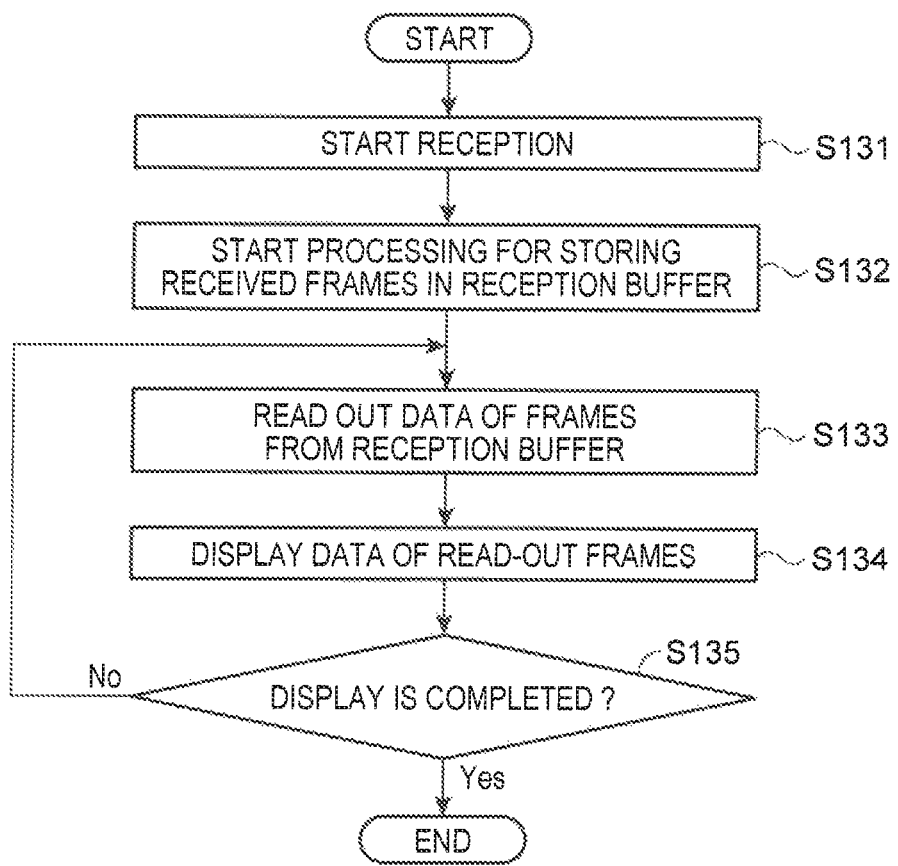
FIG. 21 is a flowchart for explaining the operation of a second display device in the second embodiment.

FIG. 21 is a flowchart for explaining the operation of the second display device 40A.

The control section 410 of the second display device 40A starts reception of video data transmitted by the first display device 30A (step S131). The control section 410 starts processing for storing frames received from the first display device 30A and frame identification information corresponding to the received frames in the reception buffer 440 (step S132).

The control section 410 reads out the frame data 441 and the frame identification information 443 corresponding to the frame data 441 from the reception buffer 440 (step S133) and displays an image on the basis of the read-out frame data 441 (step S134). When the reception buffer 440 stores data of a plurality of frames, the control section 410 reads out the frames in order from the oldest frame among the frames not displayed. That is, the control section 410 reads out and displays the data of the frames in the order of the reception from the control device 10.

The control section 410 determines whether to end the display (step S135). When a condition for completing the display is satisfied, for example, when the first display device 30A ends the transmission of the video data or when a display stop is instructed by control data transmitted via the first display device 30A (Yes in step S135), the control section 410 ends the processing. When the display is not completed (No in step S135), the control section 410 returns to step S133.

Figure 22:
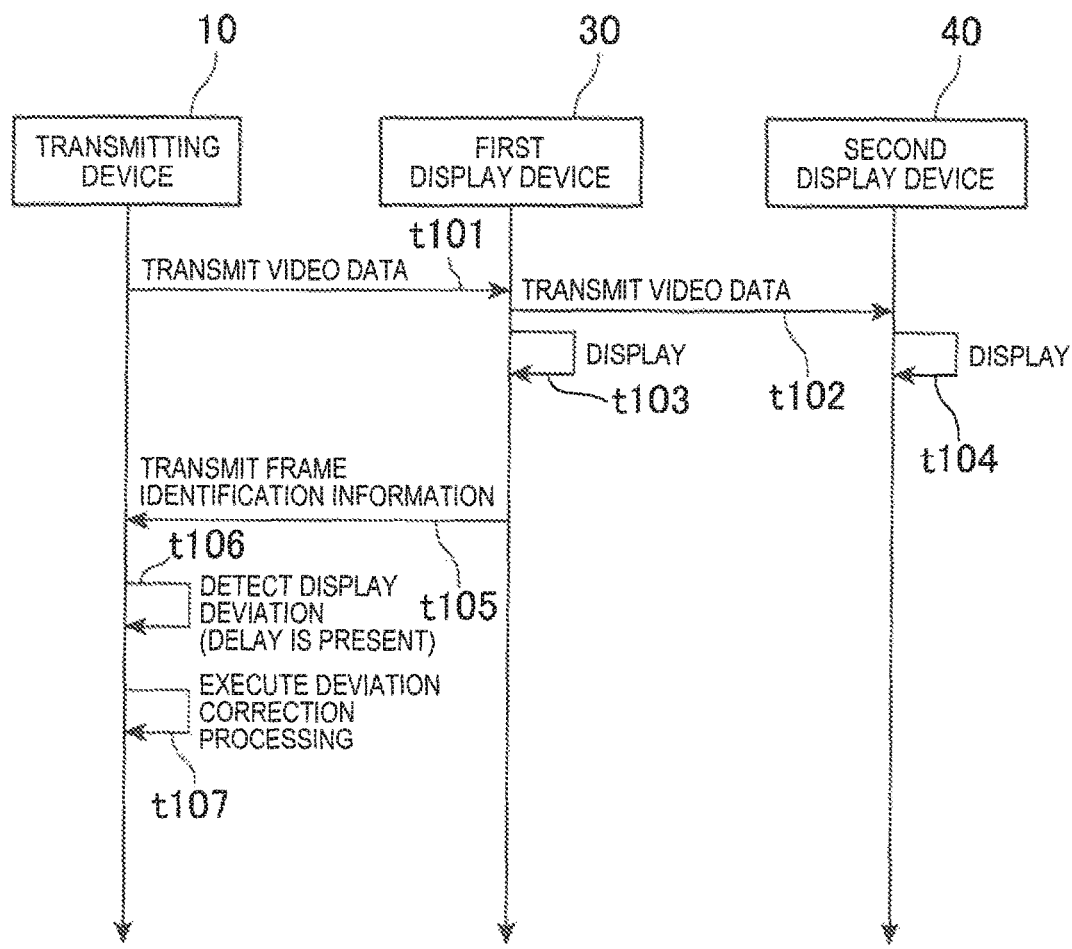
FIG. 22 is a sequence chart showing an operation example of the display system in the second embodiment.

FIG. 22 is a sequence chart showing an operation example of the display system 100A in the second embodiment.

The control device 10 transmits video data to the first display device 30A (step t101).

The first display device 30A transmits the video data received from the control device 10 to the second display device 40A (step t102). The first display device 30A displays, in units of frames, the video data received from the control device 10 (step t103). The second display device 40A displays, in units of frames, the video data received from the first display device 30A (step t104).

The first display device 30A transmits frame identification information received from the control device 10 to the control device 10 (step t105). The control device 10 detects display deviation or a delay on the basis of the frame identification information transmitted by the first display device 30A (step t106).

When detecting display deviation or a delay, the control device 10 executes, on the first display device 30A, processing for correcting the display deviation (step t107). Examples of the processing in step t107 include, as explained above, processing for retransmitting transmitted frames and processing for transmitting control data for instructing reset to the first display device 30A.

With the display system 100A in the second embodiment, videos can be displayed by the first display device 30A and the second display device 40A according to the processing for transmitting video data from the control device 10 to the first display device 30A. When a delay or deviation of display occurs because frames of video data transmitted by the control device 10 are received by the first display device 30A with a delay or the first display device 30A fails in the reception, the control device 10 can detect the delay or the deviation of display. By performing control for eliminating the delay or the deviation of display, the control device 10 can avoid or eliminate a phenomenon in which, for example, display timing is later than timing expected by the user.

Third Embodiment

Figure 23:
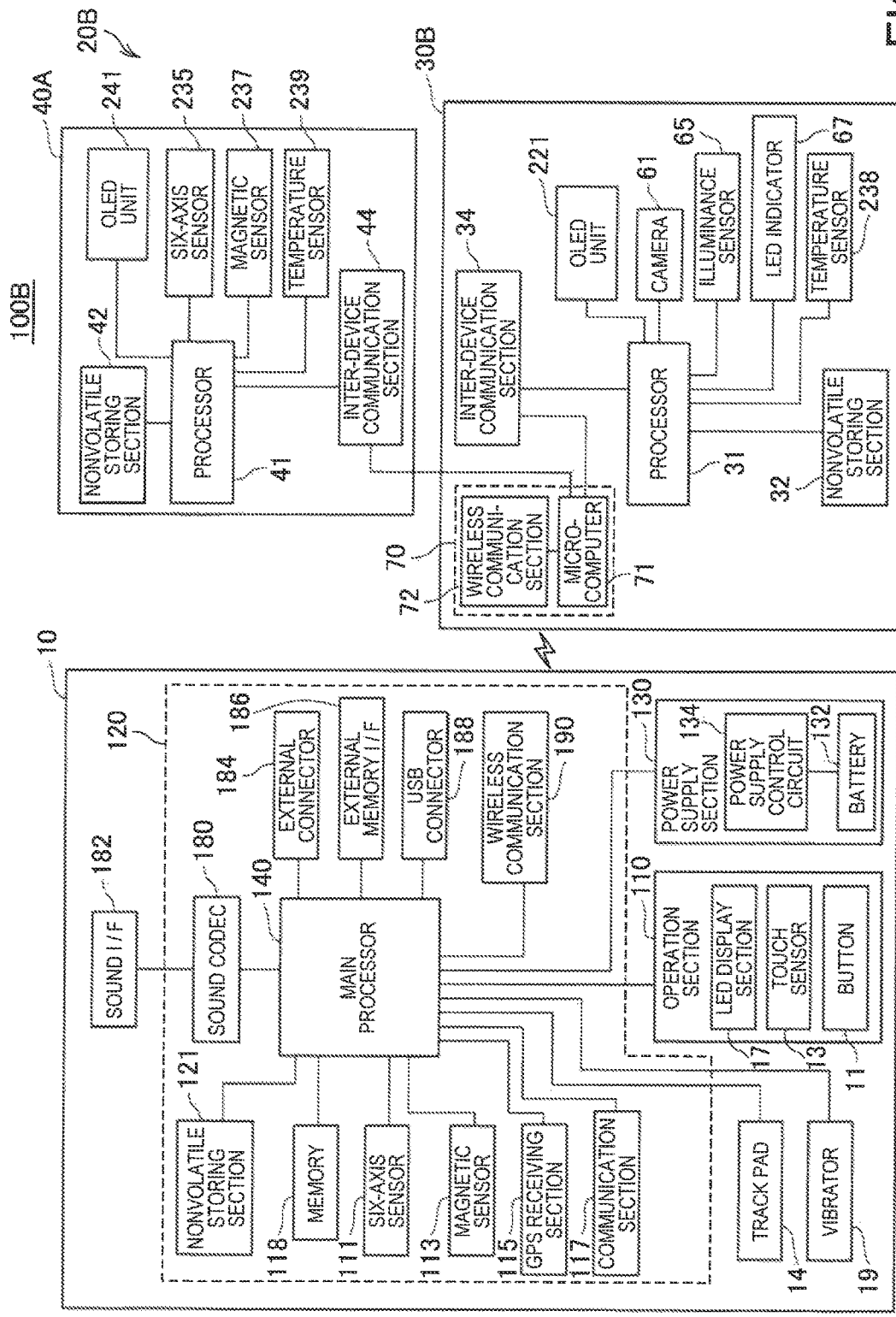
FIG. 23 is a block diagram of devices configuring a display system in a third embodiment.

FIG. 23 is a block diagram of devices configuring a display system 100B according to a third embodiment. In the display system 100B in the third embodiment shown in FIG. 23, components common to the display system 100A explained in the second embodiment are denoted by the same reference numerals and signs and explanation of the components is omitted.

The display system 100B includes a first display device 30B instead of the first display device 30A included in the HMD 20A in the display system 100A (FIG. 19) explained in the second embodiment. The first display device 30B and the second display device 40A configure a HMD 20B.

The configurations and the operations of the control device 10 and the second display device 40A are the same as the configurations and the operations in the second embodiment.

The first display device 30B includes a receiving device 70 in the first display device 30A (FIG. 17). The receiving device 70 includes a microcomputer 71 and a wireless communication section 72.

The microcomputer 71 is connected to the wireless communication section 72. The microcomputer 71 transmits and receives various data with radio signals to and from the control device 10 via the wireless communication section 72. The microcomputer 71 is connected to the inter-device communication section 34.

The microcomputer 71 outputs data received from the control device 10 to the processor 31 via the inter-device communication section 34. The microcomputer 71 is connected to the inter-device communication section 44 included in the second display device 40A. The microcomputer 71 outputs the data received from the control device 10 to the processor 41 of the second display device 40A via the inter-device communication section 44. The receiving device 70 may be connected to each of the processors 31 and 41 via a wireless communication line.

Figure 24:
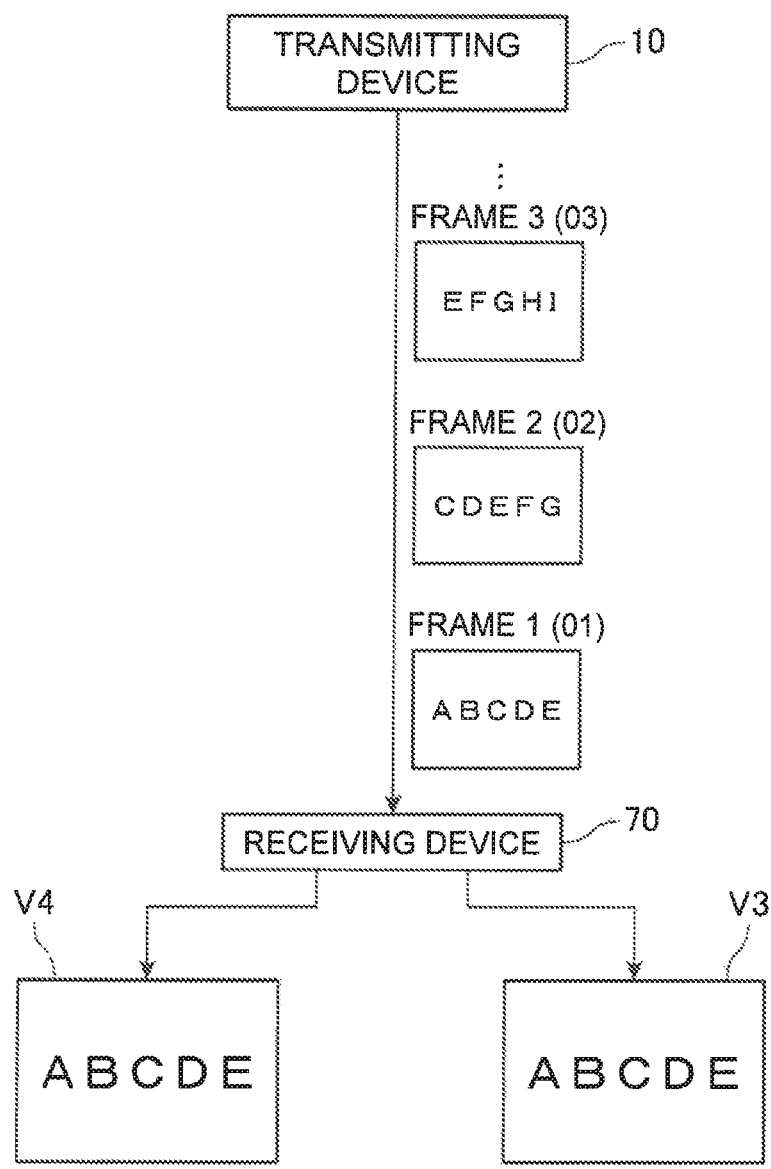
FIG. 24 is an explanatory diagram schematically showing the operation and display deviation of the display system in the third embodiment.

FIG. 24 is an explanatory diagram schematically showing the operation and display deviation of the display system 100B in the third embodiment.

The control device 10 transmits video data in units of frames. The receiving device 70 receives the video data. In FIG. 24, an example is shown in which the control device performs the transmission frame by frame. However, naturally, the control device 10 is also capable of collectively transmitting a plurality of frames. The control device 10 transmits frames of video data and frame identification information for identifying the frames to the receiving device 70 in association with each other. A specific example of the frame identification information is the same as the specific examples in the first and second embodiments.

The receiving device 70 receives, in units of frames, the video data transmitted by the control device 10 and transmits the video data to the first display device 30B and the second display device 40A. The control section 310 of the first display device 30B stores, in units of frames, the video data received from the receiving device 70 in the reception buffer 340 as the frame data 341. The control section 310 stores the frame identification information received from the control device 10 in the reception buffer 340 as the frame identification information 343.

The second display device 40A receives frames of the video data and the frame identification information from the receiving device 70 and stores the frames of the video data and the frame identification information in the reception buffer 440 as the frame data 441 and the frame identification information 443.

The first display device 30B displays, in units of frames, the video data received from the control device 10. The second display device 40A displays, in units of frames, the video data received from the first display device 30B. The receiving section 70 synchronizes transmission timings for transmitting the video data to the first display device 30B and the second display device 40A. Consequently, in the HMD 20B, the first display device 30B and the second display device 40A can display the same frame in synchronization with each other.

In the display system 100B, when the control device 10 transmits the video data to the receiving device 70 in units of frames, the receiving device 70 transmits the frame identification information of the frame of the received video data to the control device 10. The control device 10 receives the frame identification information transmitted by the receiving device 70 and compares the frame identification information and the already-transmitted frame identification information. Consequently, it is possible to detect deviation between the frames transmitted by the control device 10 and the frames received by the receiving device 70. The control device 10 can calculate a delay time from a time difference between timing when the frame identification information is transmitted to the receiving device 70 and timing when the frame identification information is received from the receiving device 70.

In the third embodiment, as in the second embodiment, it is possible to detect and avoid display deviation and a delay of frames between the control device 10 and the HMD 20B. In the third embodiment, the first display device 30B and the second display device 40A only have to execute operation same as the operation of the second display device 40A explained with reference to FIG. 21. Therefore, it is possible to reduce loads of the processor 31 and the control section 310 executed by the processor 31. For example, it is possible to stably execute display.

Figure 25:
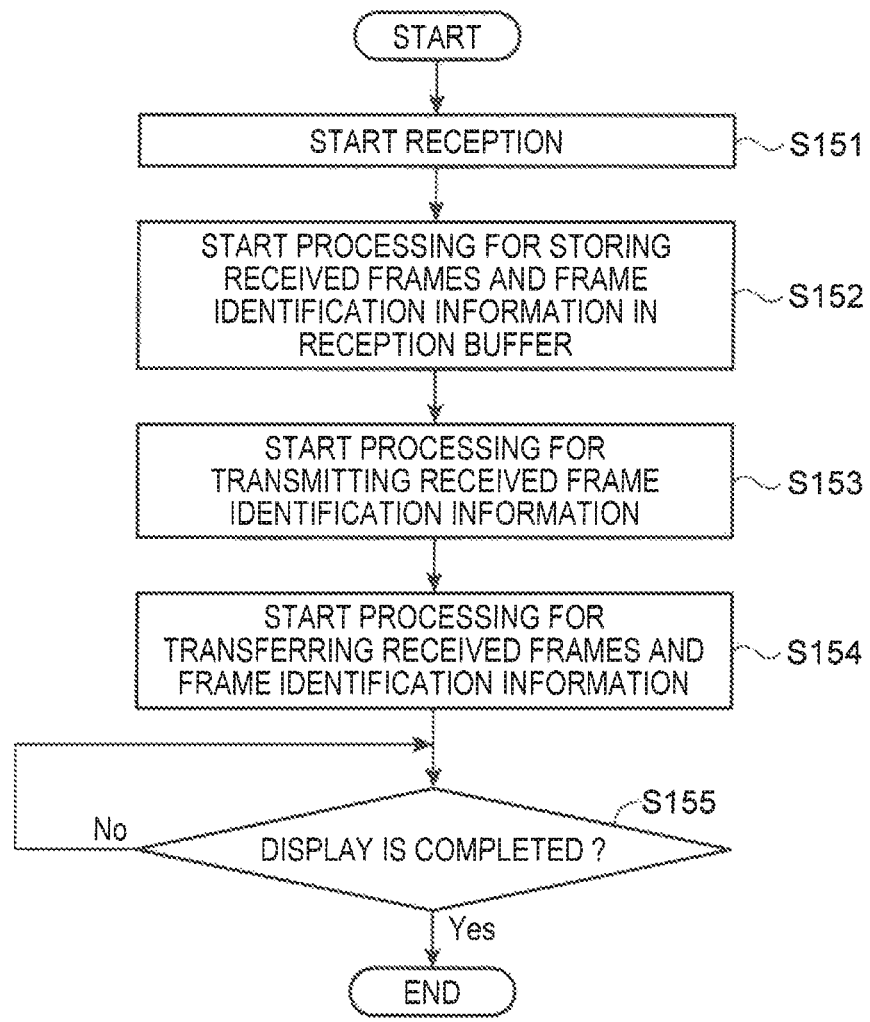
FIG. 25 is a flowchart for explaining the operation of a receiving device in the third embodiment.

FIG. 25 is a flowchart for explaining the operation of the receiving device 70.

The microcomputer 71 starts, according to control data transmitted by the control device 10, reception of video data transmitted by the control device 10 (step S151). The microcomputer 71 starts processing for storing, in a not-shown reception buffer, frames received from the control device 10 and frame identification information corresponding to the received frames (step S152).

The microcomputer 71 starts processing for transmitting the frame identification information received from the control device 10 to the control device 10 (step S153). The microcomputer 71 may transmit the frame identification information to the control device 10 every time the microcomputer 71 receives data of frames from the control device 10. The microcomputer 71 may transmit frame identification information to the control device 10 every time the microcomputer 71 receives data of a number of frames set in advance.

The microcomputer 71 starts processing for transferring the frames received from the control device 10 and the frame identification information corresponding to the received frames to the first display device 30A and the second display device 40A (step S154).

The microcomputer 71 determines whether to end the display by the HMD 20B (step S155). When a condition for completing the display is satisfied, for example, when the control device 10 ends the transmission of the video data or when a display stop is instructed by control data from the control device 10 (Yes in step S155), the microcomputer 71 ends the processing. When the display is not completed (No in step S155), the microcomputer 71 continues the processing started in steps S152 to S154 until the display is completed.

According to the third embodiment, by providing the receiving device 70 for exclusive use that receives frames of video data and frame identification information from the control device 10 and transmits the frame identification information to the control device 10, it is possible to reduce loads of the processor 31 and the control section 310 that display a video.

Fourth Embodiment

Figure 26:
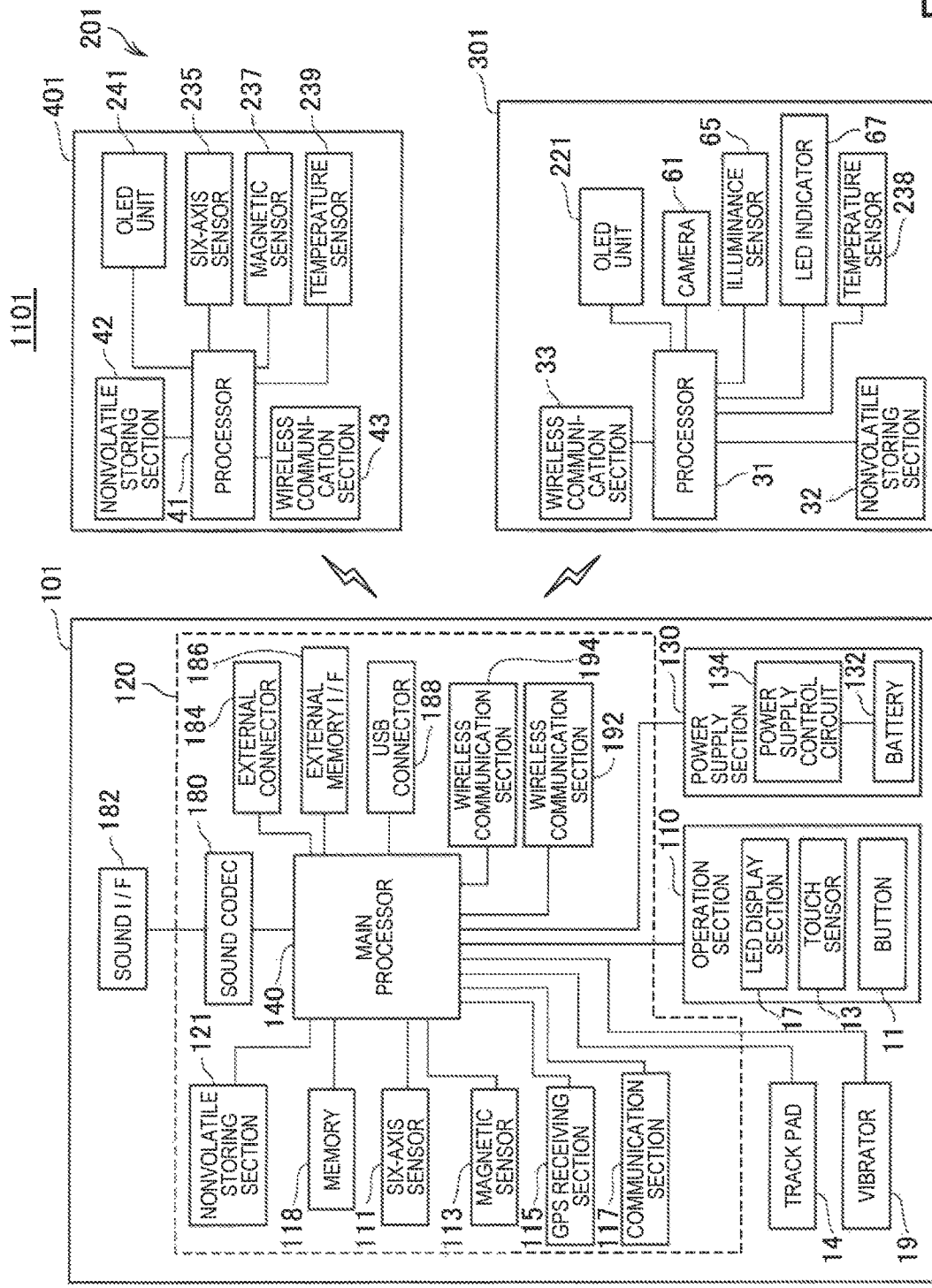
FIG. 26 is a block diagram of devices configuring a display system in a fourth embodiment.

FIG. 26 is a block diagram showing the configuration of sections configuring a display system 1001 according to a fourth embodiment.

In the display system 1001 in the fourth embodiment shown in FIG. 26 and subsequent figures, components common to the display system 100 explained in the first embodiment are denoted by the same reference numerals and signs and explanation of the components is omitted.

The display system 1001 includes a first display device 301 and a second display device 401 instead of the first display device 30 and the second display device 40 included in the HMD 20 in the display system 100 (FIG. 5) explained in the first embodiment. The first display device 301 and the second display device 401 configure a HMD 201. The HMD 201 corresponds to the HMD 20 (FIG. 5).

The configuration of a control device 101 is the same as the configuration of the control device 10 explained in the first embodiment. As explained below, like the control device 10 shown in FIG. 9, the control device 101 transmits video data to each of the first display device 301 and the second display device 401.

The configuration of the first display device 301 is common to the first display device 30. The first display device 301 receives frames of video data and frame identification information from the control device 101 and stores the frames of the video data and the frame identification information in the reception buffer 340. The first display device 301 transmits the frames of the video data and the frame identification information received from the control device 101 to the second display device 401.

The second display device 401 is configured by excluding the wireless communication section 43 in the second display device 40 (FIG. 5). The second display device 401 receives, through the inter-device communication section 44, frames of video data and frame identification information from the first display device 301 and stores the frames of the video data and the frame identification information in the reception buffer 440.

The memory 118 and the nonvolatile storing section 121 are connected to the main processor 140 included in the control device 101. The track pad 14 and the operation section 110 are connected to the main processor 140 as input devices. The six-axis sensor 111, the magnetic sensor 113, and the GPS 115 are connected to the main processor 140 as sensors.

The communication section 117, the sound codec 180, the external connector 184, the external memory interface 186, and the USB connector 188 are connected to the main processor 140. Further, the control device 101 includes a wireless communication section 192 and a wireless communication section 194 instead of the wireless communication section 190 (FIG. 5) included in the control device 10. The wireless communication section 192 and the wireless communication section 194 are connected to the main processor 140. The communication section 117, the sound codec 180, the external connector 184, the external memory interface 186, the USB connector 188, and the wireless communication sections 192 and 194 function as interfaces with the outside.

The wireless communication sections 192 and 194 (data transmitting sections) execute wireless communication between the wireless communication sections 192 and 194 and each of the first display device 301 and the second display device 401. Specifically, the wireless communication section 192 executes wireless data communication between the wireless communication section 192 and the first display device 301. The wireless communication section 194 performs wireless data communication between the wireless communication section 194 and the second display device 401.

The wireless communication sections 192 and 194 include antennas, RF circuits, baseband circuits, and communication control circuits or are configured by devices obtained by integrating the antennas, the RF circuits, the baseband circuits, the communication control circuits, and the like. A communication system executed by the wireless communication sections 192 and 194 can be, for example, Bluetooth, a wireless LAN (including Wi-Fi), or other short-range wireless communication systems. The wireless communication section 192 transmits, according to the control by the main processor 140, video data forming content data to the first display device 301. The wireless communication section 194 transmits, according to the control by the main processor 140, video data forming content data to the second display device 401. Transmission operations of the wireless communication section 192 and the wireless communication section 194 are synchronized by the control by the main processor 140. That is, timing when the wireless communication section 192 transmits video data to the first display device 301 and timing when the wireless communication section 194 transmits video data to the second display device 401 are synchronized.

The wireless communication sections 192 and 194 may be configured by one communication module capable of performing data communication with both of the first display device 301 and the second display device 401.

The wireless communication section 192 only has to be capable of communicating with the first display device 301. The wireless communication section 194 only has to be capable of communicating with the second display device 401. Therefore, a frequency band, output intensity, a coding system, an authentication system, an encryption system, and the like of radio transmitted and received by the wireless communication sections 192 and 194 are optional. The frequency band, the output intensity, the coding system, the authentication system, the encryption system, and the like may be different in the wireless communication section 192 and the wireless communication section 194.

The HMD 201 includes various sensors for detecting a state of the HMD 201 and the camera 61. Specifically, the HMD 201 includes the camera 61, the illuminance sensor 65, the six-axis sensor 235, and the magnetic sensor 237. The HMD 201 includes the LED indicator 67 that indicates an operation state of the HMD 201. The sections only have to be provided in the HMD 201. Therefore, the first display device 301 may include the sections or the second display device 401 may include the sections. In this embodiment, the first display device 301 includes the camera 61, the illuminance sensor 65, and the LED indicator 67. The second display device 401 includes the six-axis sensor 235, the magnetic sensor 237, and the temperature sensor 239. This is an example. It is possible to change, as appropriate, whether the first display device 301 or the second display device 401 includes or both of the first display device 301 and the second display device 401 include the sensors and the temperature sensor 68.

The first display device 301 includes the processor 31 that executes a computer program to control the first display device 301. The nonvolatile storing section 32 is connected to the processor 31. The wireless communication section 33 is connected to the processor 31. The OLED unit 221 is connected to the processor 31. The processor 31 controls display of an image by the OLED unit 221. The camera 61, the illuminance sensor 65, the LED indicator 67, and the temperature sensor 238 are connected to the processor 31.

The nonvolatile storing section 32 stores, in a nonvolatile manner, computer programs to be executed by the processor 31, data referred to during the execution of the computer programs, and the like. The nonvolatile storing section 32 stores various data to enable the processor 31 to read the data. The nonvolatile storing section 32 stores, for example, data concerning light emission characteristics and display characteristics of the OLED unit 221 and data concerning characteristics of the sensors included in the first display device 301.

The wireless communication section 33 (a first video receiving section and a first transmitting section) executes wireless communication between the wireless communication section 33 and the control device 101. The wireless communication section 33 includes an antenna, an RF circuit, a baseband circuit, and a communication control circuit or includes a device obtained by integrating the antenna, the RF circuit, the baseband circuit, the communication control circuit, and the like. The wireless communication section 33 is configured to be capable of communicating with the wireless communication section 192. A communication system executed by the wireless communication section 33 is common to at least a part of a communication system executed by the wireless communication section 192 and can be, for example, Bluetooth, a wireless LAN (including Wi-Fi), or other short-range wireless communication systems. The wireless communication section 33 receives, according to the control by the processor 31, video data and/or control data transmitted by the wireless communication section 192.

The second display device 401 includes the processor 41 that executes a computer program to control the second display device 401. The nonvolatile storing section 42 is connected to the processor 41. The wireless communication section 43 is connected to the processor 41. The OLED unit 241 is connected to the processor 41. The processor 41 controls display of an image by the OLED unit 241. The six-axis sensor 235, the magnetic sensor 237, and the temperature sensor 239 are connected to the processor 41.

The nonvolatile storing section 42 stores, in a nonvolatile manner, computer programs to be executed by the processor 41, data referred to during the execution of the computer programs, and the like. The nonvolatile storing section 42 stores various data to enable the processor 41 to read the data. The nonvolatile storing section 42 stores, for example, data concerning light emission characteristics and display characteristics of the OLED unit 241 and data concerning characteristics of the various sensors included in the second display device 401.

The wireless communication section 43 (a second video receiving section and a second transmitting section) executes wireless communication between the wireless communication section 43 and the control device 101. The wireless communication section 43 includes an antenna, an RF circuit, a baseband circuit, and a communication control circuit or includes a device obtained by integrating the antenna, the RF circuit, the baseband circuit, the communication control circuit, and the like. The wireless communication section 43 is configured to be capable of communicating with the wireless communication section 194. A communication system executed by the wireless communication section 43 is common to at least a part of the communication system executed by the wireless communication section 194 and can be, for example, Bluetooth, a wireless LAN (including Wi-Fi), or other short-range wireless communication systems. The wireless communication section 43 receives, according to the control by the processor 41, video data and/or control data transmitted by the wireless communication section 194.

The HMD 201 does not include the inter-device communication sections 34 and 44 (FIG. 5). Therefore, the HMD 201 does not execute the operation in which the first display device 30 and the second display device 40 in the first embodiment communicate with each other through the inter-device communication sections 34 and 44.

Each of the first display device 301 and the second display device 401 includes a not-shown battery. Each of the first display device 301 and the second display device 401 supplies electric power to the sections from the battery. It is also possible to provide one battery in the HMD 201 and supply electric power from the one battery to the first display device 301 and the second display device 401.

Figure 27:
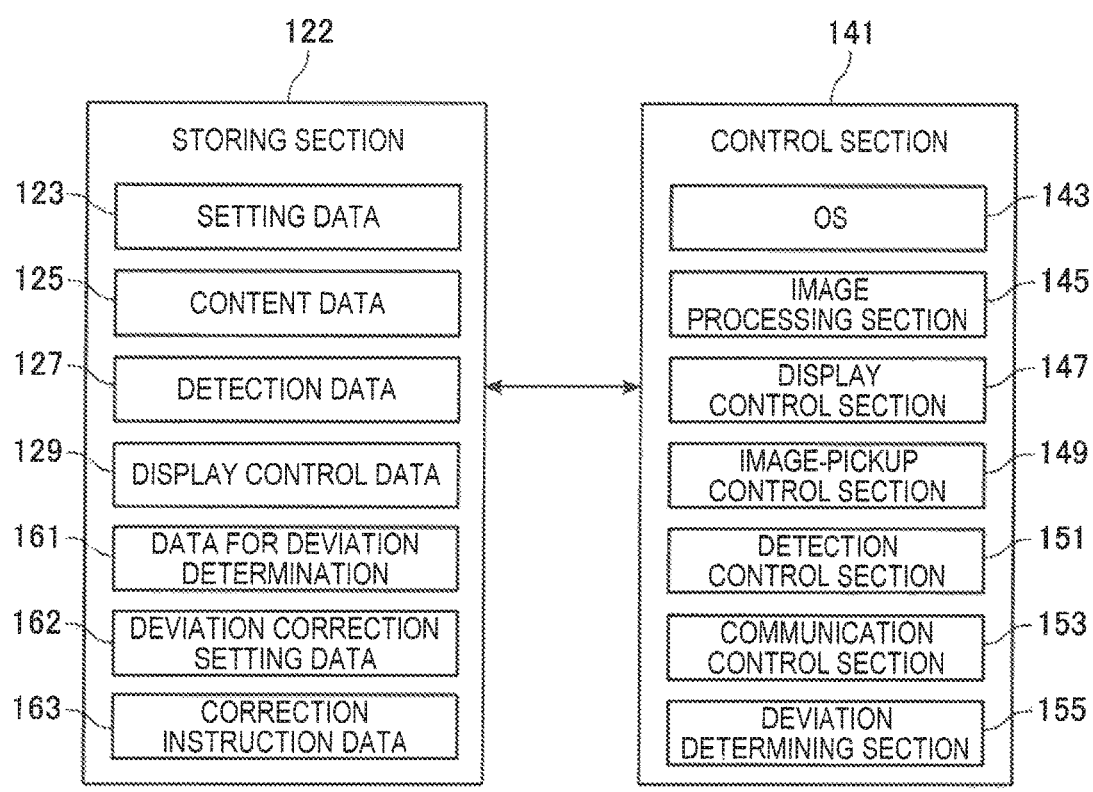
FIG. 27 is a functional block diagram of a control device in the fourth embodiment.

FIG. 27 is a functional block diagram of the storing section 122 and a control section 141 configuring a control system of the control device 101. The storing section 122 shown in FIG. 27 is a logical storing section configured by the nonvolatile storing section 121 (FIG. 26). The main processor 140 executes computer programs, whereby the control section 141 and various functional sections included in the control section 141 are formed by cooperation of software and hardware. The control section 141 and the functional sections configuring the control section 141 are configured by, for example, the main processor 140, the memory 118, and the nonvolatile storing section 121.

The control section 141 executes various kinds of processing using data stored by the storing section 122 to control the control device 101.

The storing section 122 stores various data to be processed by the control section 141. The storing section 122 stores the setting data 123, the content data 125, the detection data 127, and the display control data 129. The storing section 122 stores data for deviation determination 161, deviation correction setting data 162, and correction instruction data 163.

The setting data 123 includes various setting values related to the operation of the control device 101. When the control section 141 uses parameters, determinants, operational expressions, LUTs, and the like in controlling the control device 101, the parameters, the determinants, the operational expressions, the LUTs, and the like may be included in the setting data 123.

The setting data 123 includes data of various kinds of setting related to communication executed by the control device 101 between the control device 101 and the first display device 301 and the second display device 401. Examples of this kind of data include data for designating a communication system, identification data for identifying the control device 101, the first display device 301, and the second display device 401, and authentication data such as a password.

The content data 125 is data of contents including images and videos displayed by the first display device 301 and the second display device 401 according to control by the control section 141. The content data 125 includes video data (which may be a moving image or may be a still image). The content data 125 may include sound data. The content data 125 may include image data of a plurality of images. The plurality of images are not limited to a form in which the first display device 301 and the second display device 401 simultaneously display the plurality of images and may be, for example, a form in which the first display device 301 and the second display device 401 display the plurality of images in order.

The content data 125 may be bidirectional content. When the bidirectional content is displayed by the HMD 201, the control device 101 receives operation of the user and the control section 141 executes processing for coping with the received operation. In this case, the content data 125 may include image data of a menu screen displayed when the operation is received and data defining processing and the like corresponding to items included in the menu screen.

When the content data 125 stored in the storing section 122 is data of AR (Augmented Reality) content, the control section 141 may perform AR display on the basis of the content data 125. In the AR display, the control section 141 displays an image that achieves a so-called AR effect (hereinafter referred to as AR image) according to a target object in a real space visually recognized by the user through the right light guide plate 26 and the left light guide plate 28. When the AR display is performed, in a state in which the user is viewing the target object present in the real space, for the user, the AR image is seen in a position overlapping the target object or a position corresponding to the target object. Therefore, the user can visually recognize the target object in the real space with a virtual display object including characters and images added to the target object in the real space. Therefore, there is an effect that the user feels as if the reality is augmented.

The detection data 127 is detection values of the sensors (the picked-up image data of the camera 61) included in the first display device 301 and the second display device 401. When receiving data including the detection values of the sensors from the first display device 301 or the second display device 401, the control section 141 stores the detection values of the sensors as the detection data 127.

The display control data 129 includes various setting data concerning processing for transmitting video data to the first display device 301 and the second display device 401 and processing for controlling display of the first display device 301 and the second display device 401. For example, the display control data 129 includes a log of transmission results of transmission of video data to the first display device 301 and the second display device 401 by the wireless communication sections 192 and 194. For example, the display control data 129 includes data indicating processing executed by the control section 141 when display deviation explained below occurs in the first display device 301 and the second display device 401.

The data for deviation determination 161 is data used when the control section 141 determines display deviation with a function of a deviation determining section 155 explained below. The data for deviation determination 161 includes frame identification information of frames of video data transmitted to the first display device 301 and the second display device 401 according to the control by the control section 141. The data for deviation determination 161 includes frame identification information received from each of the first display device 301 and the second display device 401 according to the control by the control section 141.

The deviation correction setting data 162 includes data indicating processing executed by the first display device 301 and the second display device 401 when display deviation explained below occurs between the first display device 301 and the second display device 401.

The correction instruction data 163 is data of an instruction transmitted to the first display device 301 and/or the second display device 401 when display deviation occurs between the first display device 301 and the second display device 401.

The control section 141 includes the functions of the operating system (OS) 143, the image processing section 145, the display control section 147, the image-pickup control section 149, the detection control section 151, and the communication control section 153. The function of the operating system 143 is a function of a control program stored by the storing section 122. The functions of the other sections are functions of application programs executed on the operating system 143.

The image processing section 145 generates, on the basis of the content data 125, video data having a data format processable by the first display device 301 and the second display device 401. The video data generated by the image processing section 145 is data processed according to, for example, display resolutions of the OLED units 221 and 241 and relative positions of the right light guide plate 26 and the left light guide plate 28 and the head of the user. The image processing section 145 may perform, according to necessity, resolution conversion processing for converting the resolution of image data into resolution suitable for the first display device 301 and the second display device 401. The image processing section 145 may execute, for example, image adjustment processing for adjusting the luminance and the chroma of image data and 2D/3D conversion processing for creating 2D image data from 3D image data or creating 3D image data from 2D image data.

The image processing section 145 is not limited to a configuration realized by the main processor 140 executing the computer program and may be configured by hardware (e.g., a DSP) separate from the main processor 140.

The display control section 147 generates, on the basis of the image data processed by the image processing section 145, control data for instructing a start and an end of display in the first display device 301 and the second display device 401. The display control section 147 generates control data for designating display luminances of the OLED units 221 and 241. The control data generated by the display control section 147 is transmitted from each of the wireless communication sections 192 and 194 according to the control by the communication control section 153. When display deviation occurs between the first display device 301 and the second display device 401, the display control section 147 controls operation for eliminating the display deviation.

The image-pickup control section 149 generates control data for instructing image pickup execution by the camera 61. The control data is transmitted from the wireless communication section 192 to the first display device 301 according to the control by the communication control section 153. When the wireless communication section 192 receives the picked-up image data of the camera 61 transmitted by the first display device 301, the image-pickup control section 149 stores the received picked-up image data in the storing section 122.

The detection control section 151 generates control data for instructing acquisition of the detection values of the sensors included in the first display device 301 and the second display device 401. The detection control section 151 may generate control data targeting the camera 61 or may generate control data targeting the sensors other than the camera 61. The control data is transmitted from each of the wireless communication sections 192 and 194 to the first display device 301 and the second display device 401 according to the control by the communication control section 153. When the wireless communication sections 192 and 194 receive data including the detection values transmitted by the first display device 301 and the second display device 401, the image-pickup control section 149 stores the received data in the storing section 122.

The communication control section 153 controls the wireless communication section 192 to execute communication between the communication control section 153 and the first display device 301. The communication control section 153 controls the wireless communication section 194 to execute communication between the communication control section 153 and the second display device 401.

The communication control section 153 controls the wireless communication section 192 according to data concerning the communication included in the setting data 123 to establish a wireless communication line between the communication control section 153 and the wireless communication section 33. The communication control section 153 controls the wireless communication section 194 according to data concerning the communication included in the setting data 123 to establish a wireless communication line between the communication control section 153 and the wireless communication section 43.

The communication control section 153 transmits video data and control data generated by the control section 141 to one or both of the first display device 301 and the second display device 401. When transmitting the video data, the communication control section 153 causes the wireless communication section 192 and the wireless communication section 194 to operate in synchronization with each other. Consequently, the wireless communication section 192 and the wireless communication section 194 transmit the video data to each of the first display device 301 and the second display device 401 in synchronization with each other. The communication control section 153 executes processing for receiving control data transmitted by the first display device 301 and processing for receiving control data transmitted by the second display device 401. For example, the communication control section 153 receives, with the wireless communication section 192, data including frame identification information transmitted by the first display device 301. The communication control section 153 causes the storing section 122 to store the frame identification information received by the wireless communication section 192. The frame identification information is stored in the storing section 122 while being included in the data for deviation determination 161. For example, the communication control section 153 receives, with the wireless communication section 194, data including frame identification information transmitted by the second display device 401. The communication control section 153 causes the storing section 122 to store the frame identification information received by the wireless communication section 194. The frame identification information is stored in the storing section 122 while being included in the data for deviation determination 161.

The deviation determining section 155 detects display deviation by determining presence or absence of the display deviation on the basis of the data for deviation determination 161 including the frame identification information transmitted from the first display device 301 and the second display device 401. The deviation determining section 155 specifies, on the basis of the data for deviation determination 161, a frame displayed by the first display device 301 and a frame displayed by the second display device 401. The deviation determining section 155 detects display deviation by determining whether the frame displayed by the first display device 301 and the frame displayed by the second display device 401 coincide with each other. When detecting display deviation, that is, when determining that display deviation between the first display device 301 and the second display device 401 is present, the deviation determining section 155 executes processing for correcting the display deviation.

The deviation determining section 155 determines a difference between the frames displayed by the first display device 301 and the second display device 401 and a frame transmitted according to the control by the communication control section 153. Consequently, the deviation determining section 155 detects a delay until frames transmitted by the wireless communication sections 192 and 194 are actually displayed by the first display device 301 and the second display device 401.

Figure 28:
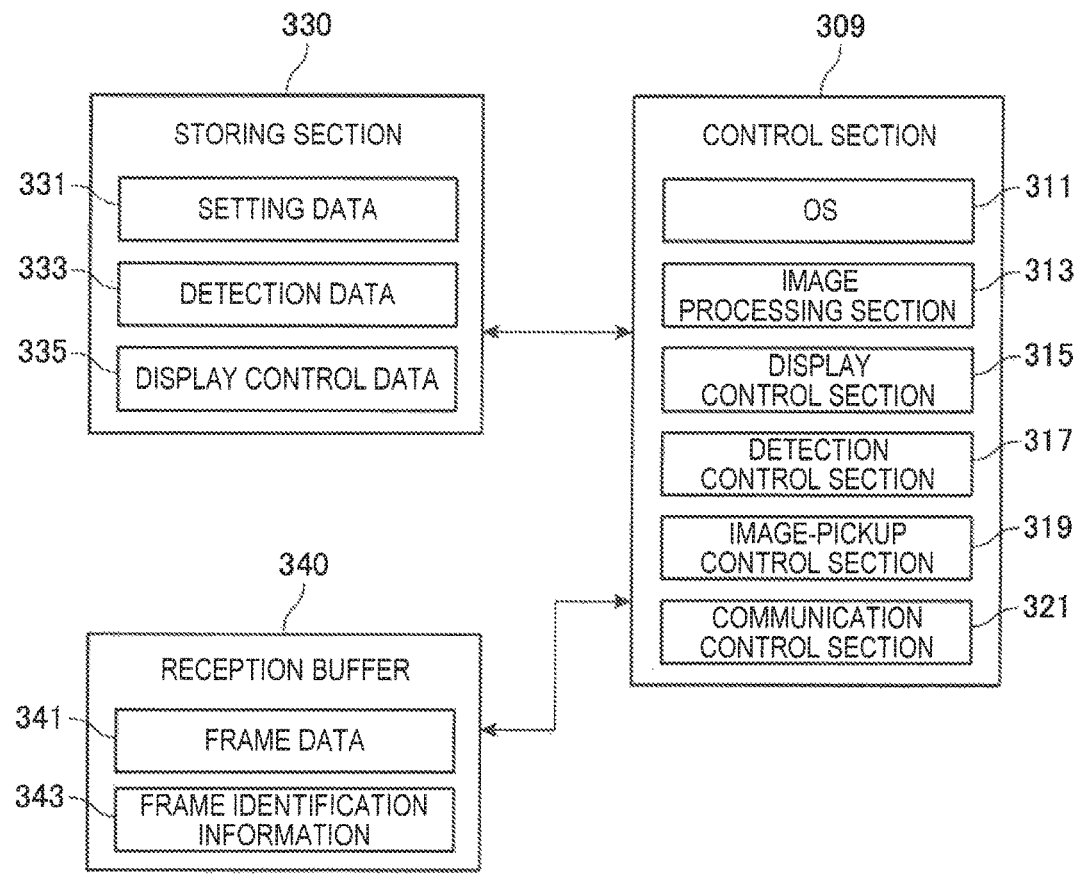
FIG. 28 is a functional block diagram of a first display device in the fourth embodiment.

FIG. 28 is a functional block diagram of a control section 309, the storing section 330, and the reception buffer 340 configuring a control system of the first display device 301. The storing section 330 shown in FIG. 28 is a logical storing section configured by the nonvolatile storing section 32 (FIG. 26). The reception buffer 340 is a logical storing section configured by the nonvolatile storing section 32 and/or a memory incorporated in the processor 31. The processor 31 executes computer programs, whereby the control section 309 and various functional sections included in the control section 309 are formed by cooperation of software and hardware. The reception buffer 340 is equivalent to a storing section that stores data received from the control device 101.

The control section 309 executes various kinds of processing using data stored by the storing section 330 to control the first display device 301.

The storing section 330 stores various data to be processed by the control section 309. The storing section 330 stores the setting data 331, the detection data 333, and the display control data 335. The setting data 331 includes various setting values related to the operation of the first display device 301. When the control section 309 uses parameters, determinants, operational expressions, LUTs, and the like in controlling the first display device 301, the parameters, the determinants, the operational expressions, the LUTs, and the like may be included in the setting data 331.

The setting data 331 includes data of various kinds of setting related to communication executed by the first display device 301 between the first display device 301 and the control device 101. Examples of this kind of data include data for designating a communication system, identification data for identifying the control device 101 and the first display device 301, an authentication data such as a password.

The detection data 333 is detection values of the sensors (including picked-up image data of the camera 61) included in the first display device 301. When acquiring picked-up image data of the camera 61 and detection values of the illuminance sensor 65 and the temperature sensor 238, the control section 309 stores the picked-up image data and the detection values in the storing section 330 as the detection data 333.

The display control data 335 includes various setting data concerning processing for displaying video data received from the control device 101. For example, the display control data 335 includes data related to control of the OLED unit 221 performed when the video data is displayed.

The reception buffer 340 is a temporary storage region for storing video data and the like received by the first display device 301 from the control device 101. The reception buffer 340 stores the frame data 341 and the frame identification information 343. The frame data 341 is data of frames forming the video data received from the control device 101. The frame identification information 343 is information for identifying the respective frames forming the video data received from the control device 101. The frame identification information 343 is transmitted from the control device 101 in association with the frames of the video data. The reception buffer 340 stores the frame data 341 and the frame identification information 343 in association with each other.

The control section 309 includes the functions of the operating system (OS) 311, the image processing section 313, the display control section 315, the detection control section 317, the image-pickup control section 319, and the communication control section 321. The function of the operating system 311 is a function of a control program stored by the storing section 330. The functions of the other sections are functions of application programs executed on the operating system 311.

The image processing section 313 executes processing for displaying, with the OLED unit 221, the frame data 341 stored by the reception buffer 340 and generates video data suitable for display by the OLED unit 221.

The display control section 315 controls the OLED unit 221 on the basis of the image data generated by the image processing section 313 to display a video on the right light guide plate 26. The display control section 315 controls luminance and the like in the OLED unit 221 according to control data transmitted from the control device 101.

The display control section 315 acquires, from the reception buffer 340, the frame identification information 343 corresponding to the frame data 341 acquired by the image processing section 313 from the reception buffer 340.

The detection control section 317 acquires detection values of the illuminance sensor 65 and the temperature sensor 238 according to control data transmitted from the control device 101 and stores the detection values as the detection data 333.

The image-pickup control section 319 causes, according to control data transmitted from the control device 101, the camera 61 to execute image pickup and stores picked-up image data output by the camera 61 in the storing section 330 as the detection data 333.

The communication control section 321 controls the wireless communication section 33 to execute communication between the communication control section 321 and the control device 101. The communication control section 321 receives control data transmitted by the wireless communication section 192 of the control device 101. The communication control section 321 receives video data transmitted by the control device 101 and stores the video data in the reception buffer 340. The frame data 341 stored by the reception buffer 340 is data of frames forming the video data received by the communication control section 321. The reception buffer 340 can store data of one or a plurality of frames. The communication control section 321 stores the received video data in the reception buffer 340 in units of frames as the frame data 341. The communication control section 321 receives frame identification information transmitted by the control device 101 together with a frame of the video data and stores the frame identification information in the reception buffer 340 as the frame identification information 343.

The communication control section 321 transmits, with the wireless communication section 33, the detection data 333 stored by the storing section 330 to the control device 101. Consequently, the control device 101 can acquire detection values of the sensors included in the first display device 301. Timing when the communication control section 321 transmits the detection data 333, types of the detection values of the sensors to be transmitted, and the like are designated by control data transmitted to the first display device 301 by the control device 101.

The communication control section 321 transmits the frame identification information 343 to the control device 101.

The configuration of a control system of the second display device 401 is the same as the configuration of the control system of the second display device 40 explained with reference to FIG. 8. Therefore, explanation of the configuration of the control system of the second display device 401 is omitted. The second display device 401 includes the control section 410, the storing section 430, and the reception buffer 440. The configurations of the control section 410, the storing section 430, and the reception buffer 440 are as shown in FIG. 8. The storing section 430 is a logical storing section configured by the nonvolatile storing section 42 (FIG. 26). The reception buffer 430 is a logical storing section configured by the nonvolatile storing section 42 and/or a memory incorporated in the processor 41. The processor 41 executes computer programs, whereby the control section 410 and various functional sections included in the control section 410 are formed by cooperation of software and hardware. The control section 410 and the functional sections configuring the control section 410 are configured by, for example, the processor 41 and the nonvolatile storing section 42. The reception buffer 440 is equivalent to a storing section that stores data received from the control device 101.

The control section 410 executes various kinds of processing using data stored by the storing section 430 to control the second display device 401. The storing section 430 stores various data to be processed by the control section 410. The storing section 430 stores the setting data 431, the detection data 433, and the display control data 435 as in the configuration of the second display device 40 shown in FIG. 8.

The reception buffer 440 is a temporary storage region for storing video data received by the second display device 401 from the control device 101. The reception buffer 440 stores the frame data 441 and the frame identification information 443. The configurations of the frame data 441 and the frame identification information 443 are as explained with reference to FIG. 8.

The control section 410 includes the functions of the operating system (OS) 411, the image processing section 413, the display control section 415, the detection control section 417, and the communication control section 421. The function of the operating system 411 is a function of a control program stored by the storing section 430. The functions of the other sections are functions of application programs executed on the operating system 411. The operations of the sections are as explained with reference to FIG. 9.

Like the control device 10 shown in FIG. 9, the control device 101 transmits video data to each of the first display device 301 and the second display device 401. The video data transmitted by the control device 101 is formed by a plurality of frames. For example, when the control device 101 transmits video data of 30 FPS (Frames Per Second), video data of thirty frames is transmitted per one second. The control device 101 transmits the video data to each of the first display device 301 and the second display device 401 in units of frames. Like the control device 10 shown in FIG. 9, the control device 101 can perform the transmission, for example, frame by frame. Naturally, the control device 101 is also capable of collectively transmitting a plurality of frames to each of the first display device 301 and the second display device 401.

Each of the first display device 301 and the second display device 401 receives, in units of frames, the video data transmitted by the control device 101. The first display device 301 stores, in units of frames, the video data received from the control device 101 in the reception buffer 340 (FIG. 28) as the frame data 341. The second display device 401 stores the video data received from the control device 101 in the reception buffer 440 as the frame data 441.

The control device 101 transmits the frames of the video data and frame identification information for identifying the frames to each of the first display device 301 and the second display device 401 in association with each other. The control device 10 shown in FIG. 9 sequentially transmits the frame 1, the frame 2, the frame 3, and the like. The control device 101 transmits frames in the same manner. The frame identification information is also as explained with reference to FIG. 9.

The control device 101 may add the frame identification information to vertical synchronization signals (Vsync) included in data of the respective frames of the video data and transmit the frame identification information. The control device 101 may encode the vertical synchronization signals and include the frame identification information in the vertical synchronization signals. In this case, the vertical synchronization signals can also be used as signals for transmitting the frame identification information.

The control section 309 of the first display device 301 receives the video data transmitted by the control device 101, stores the video data in the reception buffer 340 in units of frames as the frame data 341, and stores the frame identification information of the received frames as the frame identification information 343. The frame data 341 and the frame identification information 343 stored in the reception buffer 340 are associated while maintaining association at the time when the control device 101 transmits the video data.

The control section 309 reads out, in units of frames, in the order of reception, the frame data 341 stored in the reception buffer 340 and displays the frame data 341 with the OLED unit 221. At this point, the control section 309 acquires the frame identification information 343 of the frame displayed by the OLED unit 221 from the reception buffer 340. Therefore, the control section 309 can specify the frame identification information of the frame being displayed. The control section 309 transmits the frame identification information of the frame to be displayed to the control device 101.

The control section 410 of the second display device 401 receives the video data transmitted by the control device 101, stores the video data in the reception buffer 440 in units of frames as the frame data 441, and stores the frame identification information of the received frames as the frame identification information 443. The frame data 441 and the frame identification information 443 stored in the reception buffer 440 are associated while maintaining association at the time when the control device 101 transmits the video data.

The control section 410 reads out, in units of frames, in the order of reception, the frame data 441 stored in the reception buffer 440 and displays the frame data 441 with the OLED unit 241. At this point, the control section 410 acquires the frame identification information 443 of the frame displayed by the OLED unit 241 from the reception buffer 440. Therefore, the control section 410 can specify the frame identification information of the frame being displayed. The control section 410 transmits the frame identification information of the frame to be displayed to the control device 101.

The control device 101 transmits the frames of the same video data to the first display device 301 and the second display device 401. As explained above, timing when the control device 101 transmits the frames to the first display device 301 with the wireless communication section 192 and timing when the control device 101 transmits the frames to the second display device 401 with the wireless communication section 194 are synchronized. Therefore, the first display device 301 and the second display device 401 display, at the same timing, the same frame transmitted by the control device 101. Consequently, the same frame is visually recognized by the right eye RE and the left eye LE of the user.

When display deviation occurs between the first display device 301 and the second display device 401, the display system 1001 can perform deviation correction processing for correcting the display deviation and shifting to a state shifting the first display device 301 and the second display device 401 display the same frame.

In the deviation correction processing, the display system 1001 detects the display deviation by collating the frame identification information of the frame displayed by the first display device 301 and the frame identification information of the frame displayed by the second display device 401. When the display deviation is detected, processing for coping with the display deviation is performed such that a sense of discomfort of the user is not caused by the display deviation.

In the fourth embodiment, an example is explained in which the control device 101 executes processing for detecting display deviation. An example is explained in which the first display device 301 and the second display device 401 execute processing for coping with the display deviation according to control by the control device 101. Since the control device 101 executes the processing for detecting display deviation, when receiving and displaying the video data transmitted from the control device 101, the first display device 301 and the second display device 401 transmit the frame identification information of the frame to be displayed to the control device 101. The control device 101 detects display deviation using the frame identification information received from the first display device 301 and the second display device 401.

The detection of display deviation and the processing for coping with the display deviation in the display system 1001 are explained in detail.

Figure 29:
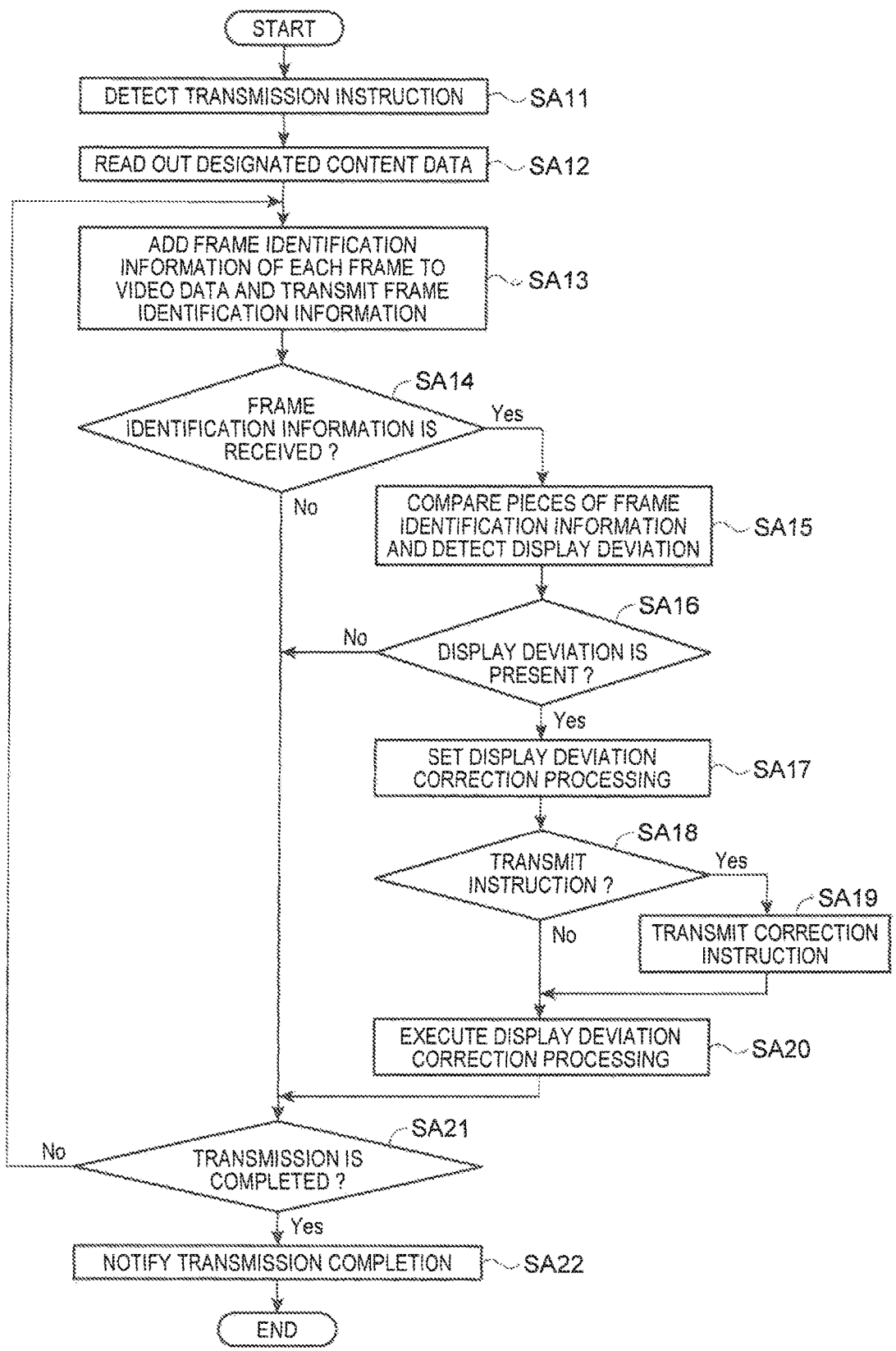
FIG. 29 is a flowchart for explaining the operation of the control device in the fourth embodiment.

FIG. 29 is a flowchart for explaining the operation of the control device 101 in the fourth embodiment.

When detecting that an instruction for transmission of the content data 125 is received by the operation section 110 (step SA11), the control section 141 of the control device 101 reads out the content data 125 designated by the instruction from the storing section 122 (step SA12). The control section 141 performs, on video data of the content data 125 read out from the storing section 122, processing for adding frame identification information to frames and transmits data of the frames and the frame identification information (step SA13). In step SA13, the control section 141 transmits the data of the frames and the frame identification information to each of the first display device 301 and the second display device 401. The control section 141 desirably synchronizes timing for transmitting the data to the first display device 301 and timing for transmitting the data to the second display device 401. Under conditions in which a communication environment is satisfactory, the first display device 301 and the second display device 401 receive, from the control device 101, the data of the frames added with the same frame identification information simultaneously or with a time difference of a degree regarded as substantially simultaneous.

The control section 141 determines whether the frame identification information is received from at least one of the first display device 301 and the second display device 401 (step SA14).

When receiving the identification information (Yes in step SA14), the control section 141 detects display deviation on the basis of the received frame identification information (step SA15). Specifically, the control section 141 compares the frame identification information received from the first display device 301 and the frame identification information received from the second display device 401. The control section 141 determines, on the basis of whether the pieces of frame identification information coincide with each other, whether a frame displayed by the first display device 301 and a frame displayed by the second display device 401 deviate from each other. In step SA15, the control section 141 performs processing for calculating the number of deviating frames by comparing the pieces of frame identification information. The number of deviating frames is considered to be a deviation amount.

When the pieces of frame identification information coincide with each other and the control section 141 determines that display deviation is absent (No in step SA16), the control section 141 shifts to step SA21 explained below. When the pieces of frame identification information do not coincide with each other, the control section 310 determines that display deviation is present (Yes in step SA16) and sets display deviation correction processing to be executed (step SA17). In step SA17, the control section 141 sets contents of processing executed to correct the display deviation and the number of frames to be corrected.

That is, in the fourth embodiment, as a specific example of a configuration for detecting deviation between frames displayed by the OLED units 221 and 241 in the display system 1001, an example is explained in which the control section 141 compares pieces of frame identification information. Processing for comparing pieces of frame identification information is an example of processing for detecting display deviation. For example, the control section 141 may detect deviation between timing when the OLED unit 221 displays a frame and timing when the OLED unit 241 displays the frame. Specifically, the control section 141 may detect deviation of display by detecting timing when the OLED unit 221 displays a frame having frame identification information set in advance and timing when the OLED unit 241 displays the frame. The control section 141 may detect deviation by comparing timing when the wireless communication section 192 transmits a predetermined frame of video data to the first display device 301 and timing when the wireless communication section 194 transmits the predetermined frame to the second display device 401. For example, in a configuration in which the wireless communication section 192 repeats data transmission to the first display device 301 and reception of a response as in packet communication, the timing when the wireless communication section 192 transmits the predetermined frame reflects progress of processing by the first display device 301. Similarly, in a configuration in which the wireless communication section 194 repeats data transmission to the second display device 401 and reception of a response as in the packet communication, the timing when the wireless communication section 194 transmits the predetermined frame reflects progress of processing by the second display device 401. Therefore, in this case, the control section 141 can detect deviation by comparing timing when each of the wireless communication sections 192 and 194 transmit frames of video data. Processing by the control section 141 for detecting deviation is not limited to the processing explained above.

As the display deviation correction processing executed in the display system 1001, for example, four kinds of methods can be used. The control section 141 may be set in advance to execute any one of the four kinds of display deviation correction processing. A plurality of kinds of display deviation correction processing among the four kinds of display deviation correction processing may be executable according to the control by the control section 141. In this case, a kind of display deviation correction processing executed by the control section 141 may be able to be set. A kind of display deviation correction processing selected in advance may be executed.

When display deviation occurs, a frame displayed by one of the first display device 301 and the second display device 401 is a frame transmitted earlier by the control device 101 than a frame displayed by the other device, that is, an old frame. In the following explanation, an example is explained in which a frame displayed by the second display device 401 is older than a frame displayed by the first display device 301. That is, an example is explained in which processing by the second display device 401 for displaying a frame is later than the processing by the first display device 301. In this example, the first display device 301 can also be referred to as device on a preceding side of a frame to be displayed and the second display device 401 can also be referred to as a device on a delayed side of a frame to be displayed. Naturally, opposite display deviation could occur in the display system 1001. It is also possible to correct the display deviation.

Specific methods of the display deviation correction processing are, for example, (M1) to (M6) described below.

(M1) Display of the second display device 401 is reset to shift the second display device 401 to a state in which the second display device 401 receives the latest frame from the control device 101.

(M2) The display of the second display device 401 is stopped.

(M3) While frames displayed by the second display device 401 are switched in order, the first display device 301 displays the same frame a plurality of times.

(M4) While frames displayed by the second display device 401 are switched in order, display of the first display device 301 is temporarily stopped.

(M5) A frame corresponding to a frame displayed by the first display device 301 is transmitted from the control device 101 to the second display device 401.

(M6) A frame corresponding to a frame displayed by the second display device 401 is transmitted from the control device 101 to the first display device 301.

The method (M1) is explained below with reference to FIG. 31. The method (M2) is explained below with reference to FIG. 32. The method (M3) is explained below with reference to FIG. 33. The method (M4) is explained below with reference to FIG. 34. The method (M5) is explained below with reference to FIG. 35. The method (M6) is explained below with reference to FIG. 36.

The control section 141 performs setting concerning display deviation correction processing (step SA17). The control section 141 determines whether to transmit an instruction to at least one of the first display device 301 and the second display device 401 in the set display deviation correction processing (step SA18). For example, when executing the display deviation correction processing according to the methods (M1) and (M2), the control section 141 transmits an instruction to the second display device 401. When executing the display deviation correction processing according to the methods (M3) and (M4), the control section 141 transmits an instruction to the first display device 301.

When transmitting an instruction to the first display device 301 or the second display device 401 (Yes in step SA18), the control section 141 transmits control data indicating an instruction related to correction (step SA19). In step SA19, the control section 141 transmits the control data to the first display device 301 and/or the second display device 401 and shifts to step SA20. When not transmitting the instruction to both of the first display device 301 and the second display device 401 (No in step SA18), the control section 141 shifts to step SA20.

In step SA20, the control section 141 executes the display deviation correction processing set in step SA29 and shifts to step SA21.

In step SA21, the control section 141 determines whether transmission of all the frames forming the designated content data 125 is completed. While the transmission is not completed (No in step SA21), the control section 141 returns to step SA13. When the transmission is completed (Yes in step SA21), the control section 141 transmits control data for notifying the completion of the transmission of the content data 125 to the first display device 301 and the second display device 401 (step SA22) and ends the processing.

Figure 30:
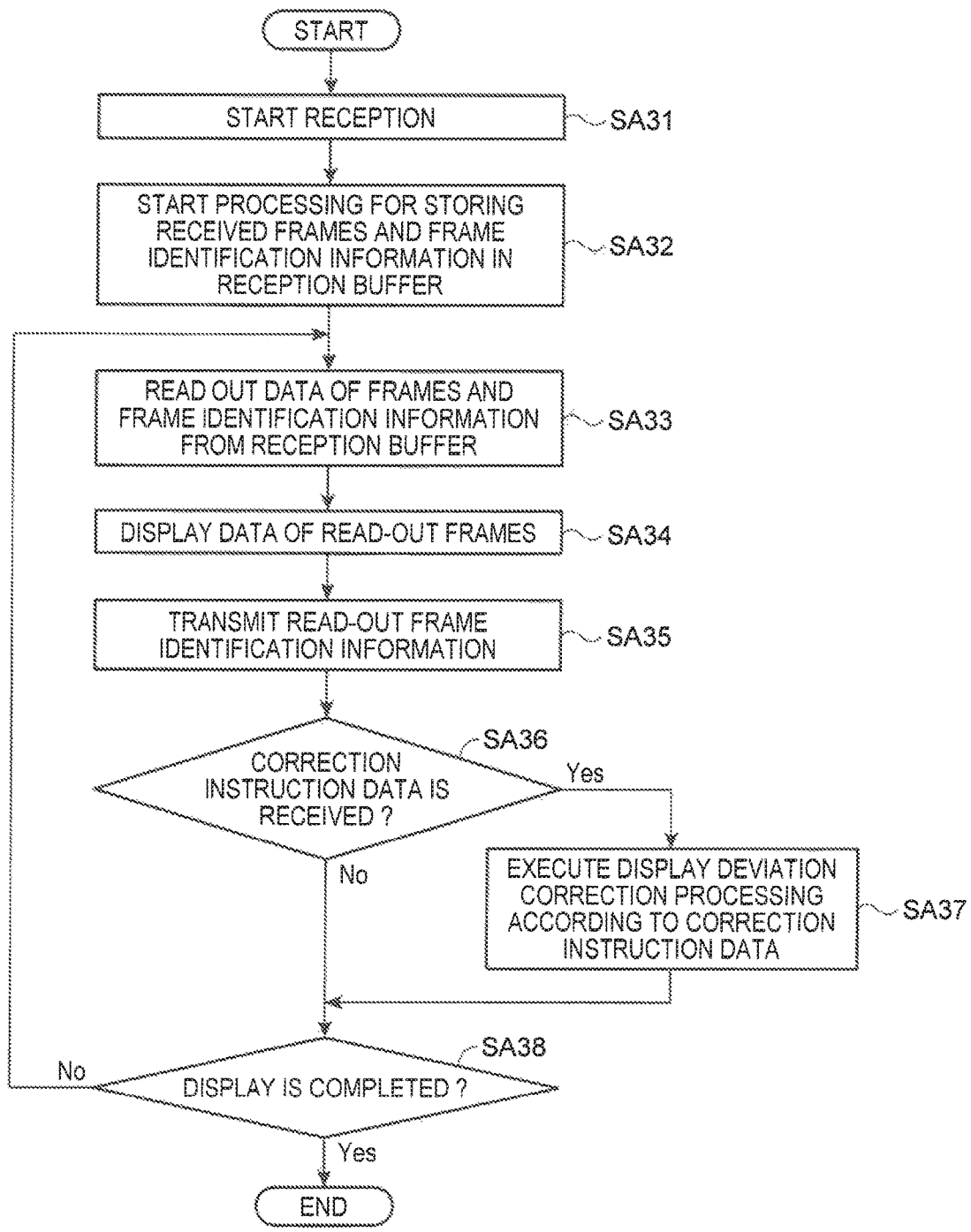
FIG. 30 is a flowchart for explaining the operation of the first display device in the fourth embodiment.

FIG. 30 is a flowchart for explaining the operation of the first display device 301. The operations of the first display device 301 and the second display device 401 are common to each other. Therefore, the operation of the first display device 301 is explained with reference to FIG. 30. The operation of the second display device 401 is explained as well.

The control section 309 of the first display device 301 starts, according to control data transmitted by the control device 101, reception of video data transmitted by the control device 101 (step SA31). The control section 309 starts processing for storing frames received from the control device 101 and frame identification information corresponding to the received frames in the reception buffer 340 (step SA32).

The control section 309 reads out the frame data 341 and the frame identification information 343 corresponding to the frame data 341 from the reception buffer 340 (step SA33) and displays an image on the basis of the read-out frame data 341 (step SA34). When the reception buffer 340 stores data of a plurality of frames, the control section 309 reads out the frames in order from the oldest frame among the frames not displayed. That is, the control section 309 reads out and displays the data of the frames in the order of the reception from the control device 101.

The control section 309 transmits the frame identification information read out in step SA33 to the control device 101 (step SA35).

The control section 309 determines whether control data indicating an instruction concerning the display deviation correction processing is received from the control device 101 (step SA36).

When receiving the instruction (Yes in step SA36), the control section 309 executes the display deviation correction processing according to the received instruction (step SA37) and shifts to step SA38. Specific contents of the display deviation correction processing executed in step SA37 are explained below with reference to FIGS. 31 to 34.

When not receiving the instruction from the control device 101 (No in step SA36), the control section 309 shifts to step SA38.

In step SA38, the control section 309 determines whether to end the display. When a condition for completing the display is satisfied, for example, when the control device 101 ends the transmission of the video data or when a display stop is instructed by control data from the control device 101 (Yes in step SA38), the control section 309 ends the processing. When the display is not completed (No in step SA38), the control section 309 returns to step SA33.

The control section 410 of the second display device 401 executes the operations in steps SA31 to SA38 shown in FIG. 30. That is, the control section 410 starts, according to control data transmitted by the control device 101, reception of video data transmitted by the control device 101 (step SA31). The control section 410 starts processing for storing frames received from the control device 101 and frame identification information corresponding to the received frames in the reception buffer 440 (step SA32).

The control section 410 reads out the frame data 441 and the frame identification information 443 corresponding to the frame data 441 from the reception buffer 440 (step SA33) and displays an image on the basis of the read-out frame data 441 (step SA34). When the reception buffer 440 stores data of a plurality of frames, the control section 410 reads out the frames in order from the oldest frame among the frames not displayed. That is, the control section 410 reads out and displays the data of the frames in the order of the reception from the control device 101.

The control section 410 transmits the frame identification information read out in step SA33 to the control device 101 (step SA35). The control section 410 determines whether control data indicating an instruction concerning the display deviation correction processing is received from the control device 101 (step SA36). When receiving the instruction (Yes in step SA36), the control section 410 executes the display deviation correction processing according to the received instruction (step SA37) and shifts to step SA38. The control section 410 determines whether to end the display (step SA38). When a condition for completing the display is satisfied, for example, when the control device 101 ends the transmission of the video data or when a display stop is instructed by control data from the control device 101 (Yes in step SA38), the control section 410 ends the processing. When the display is not completed (No in step SA38), the control section 410 returns to step SA33.

Figure 31:
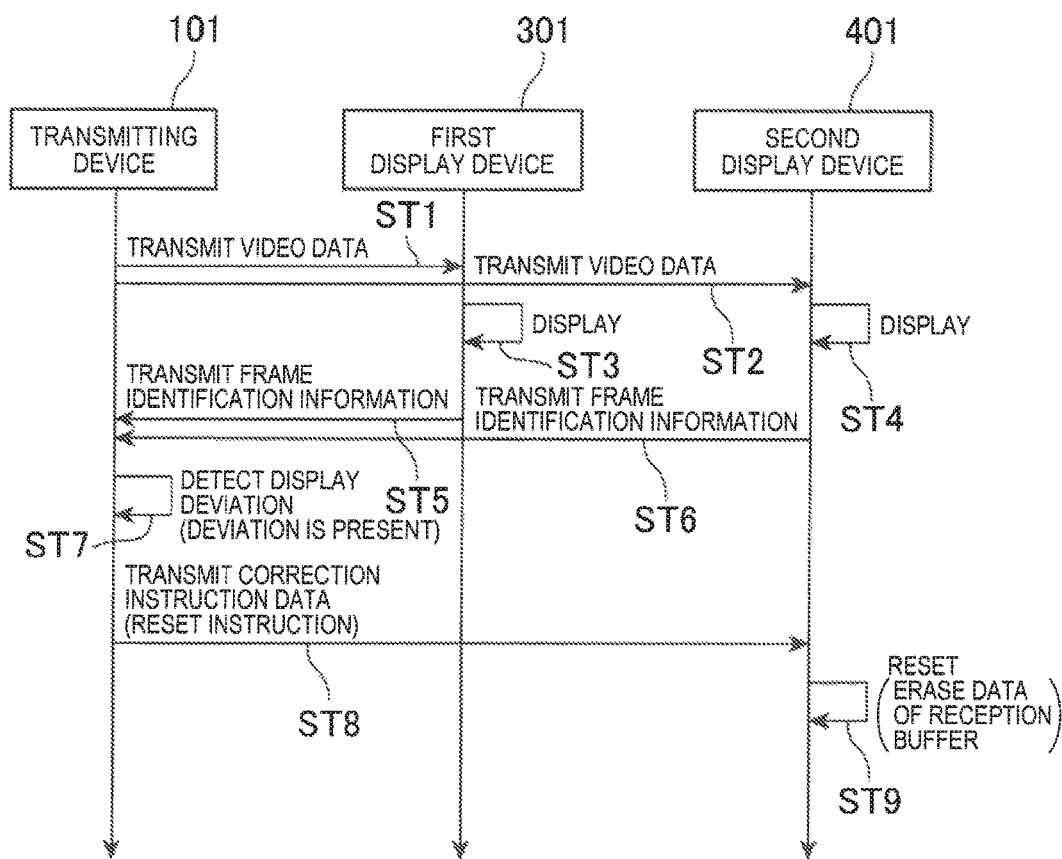
FIG. 31 is a sequence chart showing an operation example of the display system in the fourth embodiment.

FIG. 31 is a sequence chart showing the operation of the display system 1001 concerning the display deviation correction processing. Specifically, FIG. 31 shows an example in which the display system 1001 executes the display deviation correction processing according to the method (M1). As explained above, in the following explanation, operation performed when display deviation in which the display of the second display device 401 is delayed occurs is explained as an example.

The control section 141 of the control device 101 executes processing for transmitting video data from the wireless communication section 192 to the first display device 301 (step ST1) and processing for transmitting video data from the wireless communication section 194 to the second display device 401 (step ST2). The two kinds of processing are executed in synchronization with each other as shown in FIG. 9. Frames of the video data are transmitted to the first display device 301 and the second display device 401 at the same timing or timing that can be regarded as substantially simultaneous.

The first display device 301 displays, in units of frames, the video data received from the control device 101 (step ST3). The second display device 401 displays, in units of frames, the video data received from the control device 101 (step ST4).

The first display device 301 transmits frame identification information of a frame to be displayed to the control device 101 (step ST5). The operation in step ST5 may be performed simultaneously with the operation for displaying the frames of the video data in step ST3 or may be either before or after step ST3. The second display device 401 transmits the frame identification information to the control device 101 (step ST6). The operation in step ST6 may be simultaneous with the operation for displaying the frame of the video data in step ST4 or may be either before or after step ST4.

The control section 141 performs processing for detecting display deviation on the basis of the frame identification information received from the first display device 301 and the second display device 401 (step ST7). The above operation is as explained with reference to FIGS. 29 and 30.

In the example shown in FIG. 31, the control section 141 transmits control data for instructing reset to the second display device 401 (step ST7). When receiving the control data for instructing reset from the control device 101, the control section 410 executes data reset and erases the frame data 441 stored in the reception buffer 440 (step ST9). In the data rest, the control section 410 may erase the frame identification information 443 stored by the reception buffer 440. In the data reset, the control section 410 may erase the frame being displayed and temporarily stop the display.

By performing the data reset, the control section 410 stores a frame received from the control device 101 next in the reception buffer 440 and displays data of the frame. Therefore, it is possible to eliminate a state in which the display of the second display device 401 is later than the display of the first display device 301 and correct the display deviation.

Figure 32:
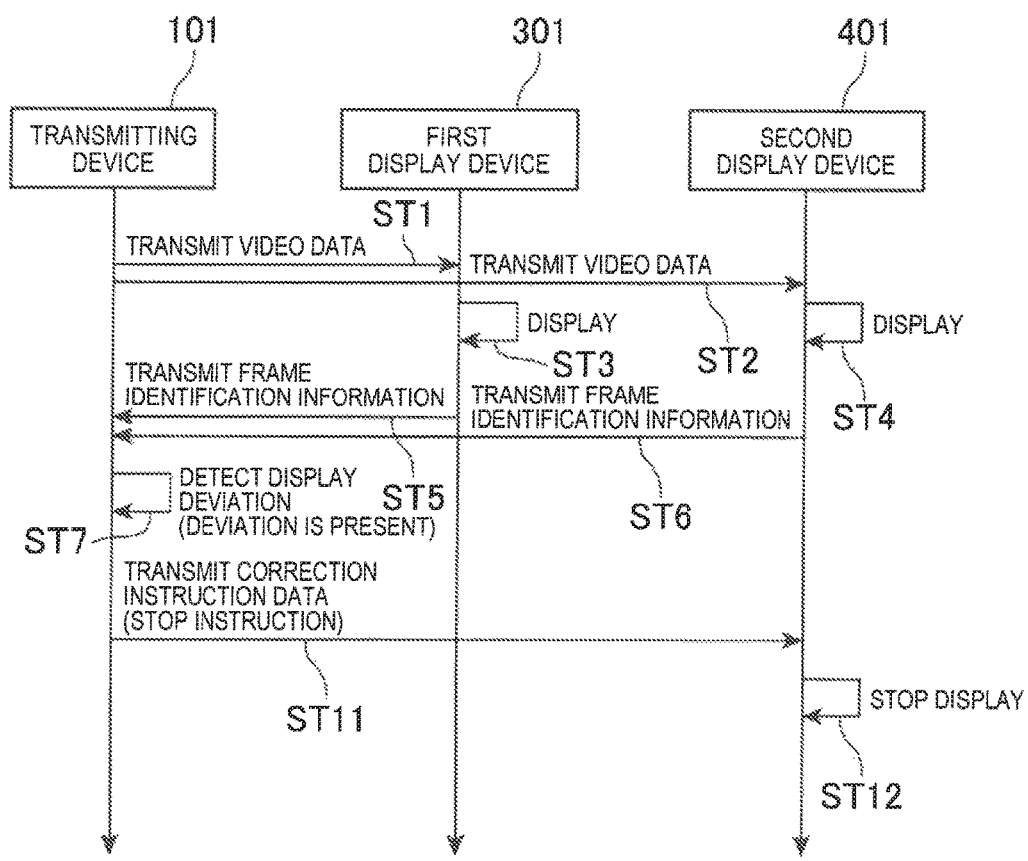
FIG. 32 is a sequence chart showing an operation example of the display system in the fourth embodiment.

FIG. 32 is a sequence chart showing the operation of the display system 1001 concerning the display deviation correction processing. Specifically, FIG. 32 shows an example in which the display system 1001 executes the display deviation correction processing according to the method (M2) described above. Note that kinds of processing same as the kinds of processing in the operation shown in FIG. 31 are denoted by the same step numbers.

The control section 141 executes processing for transmitting video data from the wireless communication section 192 to the first display device 301 (step ST1) and processing for transmitting video data from the wireless communication section 194 to the second display device 401 (step ST2).

The first display device 301 displays, in units of frames, the video data received from the control device 101 (step ST3). The second display device 401 displays, in units of frames, the video data received from the control device 101 (step ST4).

The first display device 301 transmits frame identification information of a frame to be displayed to the control device 101 (step ST5). The second display device 401 transmits frame identification information to the control device 101 (step ST6).

The control section 141 performs processing for detecting display deviation on the basis of the frame identification information received from the first display device 301 and the second display device 401 (step ST7).

In the example shown in FIG. 32, the control section 141 transmits control data for instructing a display stop to the second display device 401 (step ST11). When receiving the control data for instructing the display stop from the first control device 101, the control section 410 erases the frame being displayed and stops the display (step ST12). Consequently, the OLED unit 241 (FIG. 26) displays nothing. For the user wearing the HMD 201, an image is displayed to the right eye RE by the OLED unit 221. On the other hand, the displayed image is not visually recognized by the left eye LE.

In the HMD 201, the first display device 301 and the second display device 401 respectively cause the right eye RE and the left eye LE to visually recognize an image. Therefore, when display deviation occurs, the user feels a strong sense of discomfort. In this case, if the display of one of the OLED units 221 and 241 is stopped, the user visually recognizes the image on one side of the right eye RE or the left eye LE. Therefore, it is possible to prevent the user from feeling a sense of discomfort because of inconsistency of the left display and the right display. In the HMD 201, when the display of the OLED unit 241 is stopped, an outside scene is visually recognized by the left eye LE with the external light OL transmitted through the left light guide plate 28. Naturally, the outside scene matches an outside scene visually recognized by the right eye RE with the external light OL transmitted through the right light guide plate 26. Therefore, it is less likely that a sense of discomfort is given to the user when the OLED unit 241 stops the display.

Figure 33:
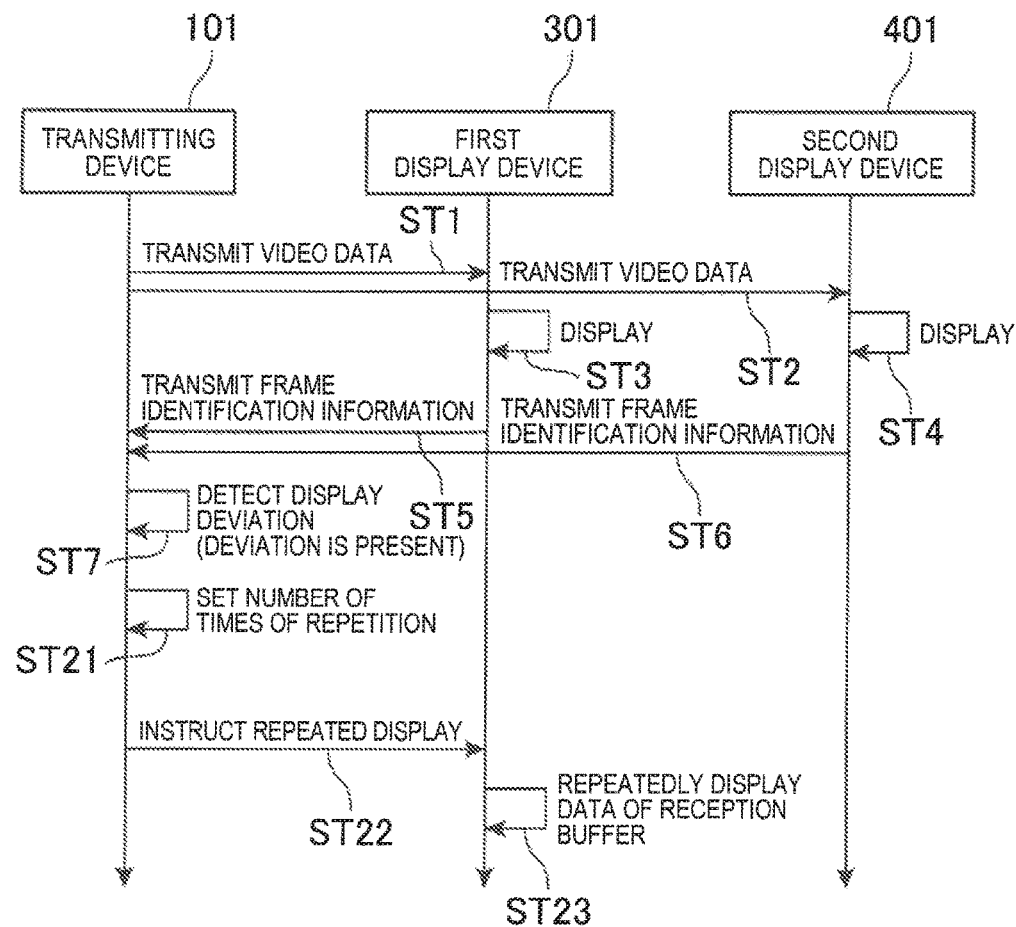
FIG. 33 is a sequence chart showing an operation example of the display system in the fourth embodiment.

FIG. 33 is a sequence chart showing the operation of the display system 1001 concerning the display deviation correction processing. Specifically, FIG. 33 shows an example in which the display system 1001 executes the display deviation correction processing according to the method (M3) described above.

Operations in steps ST1 to ST7 are processing same as the operations shown in FIGS. 31 and 32. Therefore, explanation of the operations is omitted.

In the example shown in FIG. 33, the first display device 301 repeatedly displays a frame according to the control data transmitted by the control section 141. For example, when the second display device 401 performs display later than the first display device 301 by five frames (when a deviation amount is five frames), the first display device 301 performs the repeated display for the five frames. Specifically, after displaying one frame, the first display device 301 repeats the display of the frame five times. In this case, since the one frame is displayed six times, it is possible to eliminate the deviation for the five frames.

In FIG. 33, the control section 141 calculates and sets the number of times of repetition of display according to the deviation amount detected in step ST7, that is, the number of frames deviating in display (step ST21). In the processing for setting the number of times of repetition, the control section 141 may set the number of times of repetition of a plurality of frames. For example, if the number of times of repetition of one frame is set to two and the number of times of repetition of the next frame is set to three, it is possible to correct the display deviation of the five frames in total.

The control section 141 transmits an instruction for repeated display and control data including the number of times of repetition to the first display device 301 (step ST22). The control section 309 repeatedly executes, according to the control data transmitted by the control device 101, the display of frames by the number of times set in step ST21 (step ST23). In step ST23, the control section 309 executes, for example, processing for repeatedly reading out one frame data 341 from the reception buffer 340 and displaying the frame data 341. In this case, the control section 309 only has to execute processing for reading out data of frames from the reception buffer 440 in the same manner as when the repetition is not performed. Therefore, there is an advantage that it is possible to simplify the display deviation correction processing.

Figure 34:
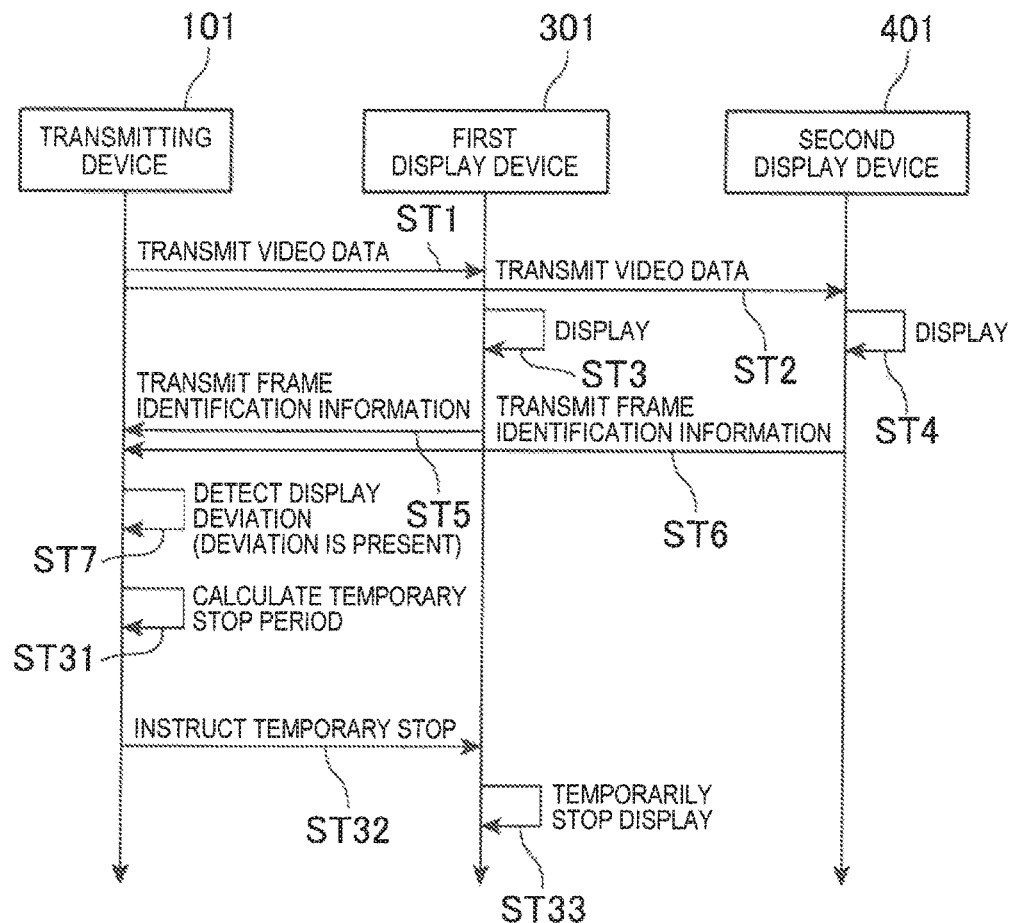
FIG. 34 is a sequence chart showing an operation example of the display system in the fourth embodiment.

FIG. 34 is a sequence chart showing the operation of the display system 1001 concerning the display deviation correction processing. Specifically, FIG. 34 shows an example in which the display system 1001 executes the display deviation correction processing according to the method (M4).

Operations in steps ST1 to ST7 are processing same as the operations shown in FIGS. 31 to 33. Therefore, explanation of the operations is omitted.

In the example shown in FIG. 34, the first display device 301 temporarily stops display according to control data transmitted by the control device 101. During the stop, the first display device 301 does not perform display by the OLED unit 221. Therefore, there is no image displayed by the OLED unit 221. That is, an image is not visually recognized by the right eye RE of the user. The control section 309 sets, according to a deviation amount of display deviation, a period in which the display is temporarily stopped. For example, when the second display device 401 performs display later than the first display device 301 by five frames (when a deviation amount is five frames), the first display device 301 stops the display for time equivalent to a display period of the five frames.

In FIG. 34, the control section 141 calculates, according to the deviation amount detected in step ST7, that is, the number of frames deviating in display, the period in which the display is temporarily stopped (step ST31). The control section 141 transmits an instruction for the temporary stop and control data including the temporary stop period calculated in step ST31 (step ST32). The control section 141 stops, according to the control data transmitted by the control device 101, the display by the OLED unit 221 for the period designated by the control data (step ST33). After the period in which the display is stopped elapses, the control section 309 resumes the processing for reading out the frame data 341 from the reception buffer 340 and displaying the frame data 341. Note that, even while the display is temporarily stopped, the control section 309 stores frames of video data and frame identification information received from the control device 101 in the reception buffer 340. It is also possible that the first display device 301 stores image data for the temporary stop (e.g., an image of a single color of black) in the reception buffer 340 and, during the temporary stop, the control section 309 reads out the image data for the temporary stop from the reception buffer 340 and displays the image data for the temporary stop. In this case, the control section 309 only has to execute the processing for reading out data from the reception buffer 340 and displaying the data even during the temporary stop. Therefore, there is an advantage that it is possible to simplify the display deviation correction processing.

Figure 35:
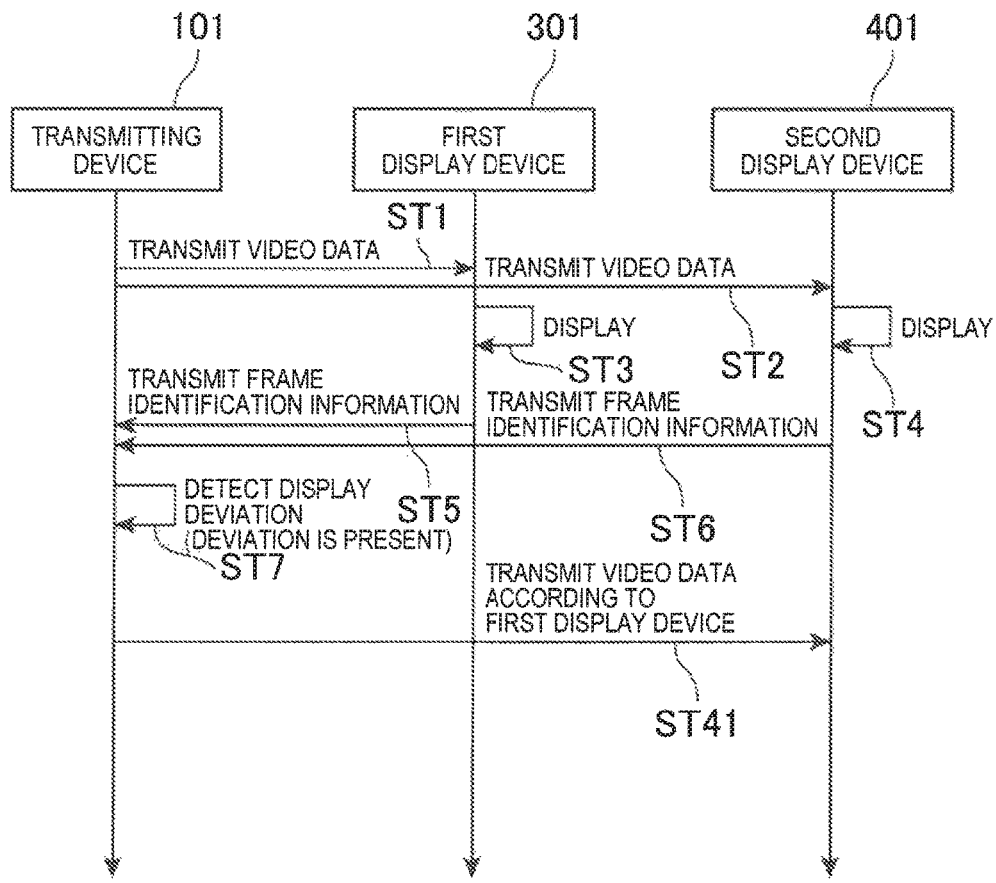
FIG. 35 is a sequence chart showing an operation example of the display system in the fourth embodiment.

FIG. 35 is a sequence chart showing the operation of the display system 1001 concerning the display deviation correction processing. Specifically, FIG. 35 shows an example in which the display system 1001 executes the display deviation correction processing according to the method (M5) described above.

Operations in steps ST1 to ST7 are processing same as the operations shown in FIGS. 31 and 34. Therefore, explanation of the operations is omitted.

In the example shown in FIG. 35, the control device 101 transmits data of frames corresponding to a frame displayed by the first display device 301 to the second display device 401. For example, the control device 101 transmits, to the second display device 401, a frame displayed by the first display device 301 or the next frame of the frame displayed by the first display device 301. Consequently, the second display device 401 delayed in display displays a frame same as or a frame corresponding to the frame displayed by the first display device 301. Therefore, it is possible to eliminate the delay in the display of the second display device 401.

That is, in FIG. 35, the control section 141 transmits, according to the shift amount detected in step ST7, that is, the number of frames deviating in display, a frame corresponding to the frame displayed by the first display device 301 to the second display device 401 (step ST41). In step ST41, the control section 141 may transmit frame identification information together with data of the frame. The control section 410 stores the data of the frame and the frame identification information transmitted by the control device 101 in the reception buffer 440 and displays the data of the frame and the frame identification information.

In step ST41, the control section 141 may transmit control data for instructing reset of the reception buffer 440. In this case, the control section 410 clears the frame data 441 and the frame identification information 443 of the reception buffer 440 and then displays the frame transmitted in step ST41.

In the operation shown in FIG. 35, when a difference between the frame displayed by the first display device 301 and the frame displayed by the second display device 401 is equal to or larger than a predetermined number set in advance, the control section 141 can also eliminate the display deviation stepwise.

In this case, the control section 141 determines, on the basis of the deviation amount calculated in step ST7, a deviation amount reduced in one operation. For example, when deviation of ten frames occurs, the control section 141 reduces the deviation two frames at a time in one operation. In this case, in step ST41 in FIG. 35, the control section 141 transmits, to the second display device 401, data of a frame ahead of the frame displayed by the second display device 401 by two frames. The control section 141 can eliminate the deviation of ten frames if the control section 141 repeatedly executes the operation five times every time the control section 141 transmits data of frames to the first display device 301 and the second display device 401 in step SA13 (FIG. 29). For example, the control device 101 only has to store the predetermined number in this case as the deviation correction setting data 162.

Figure 36:
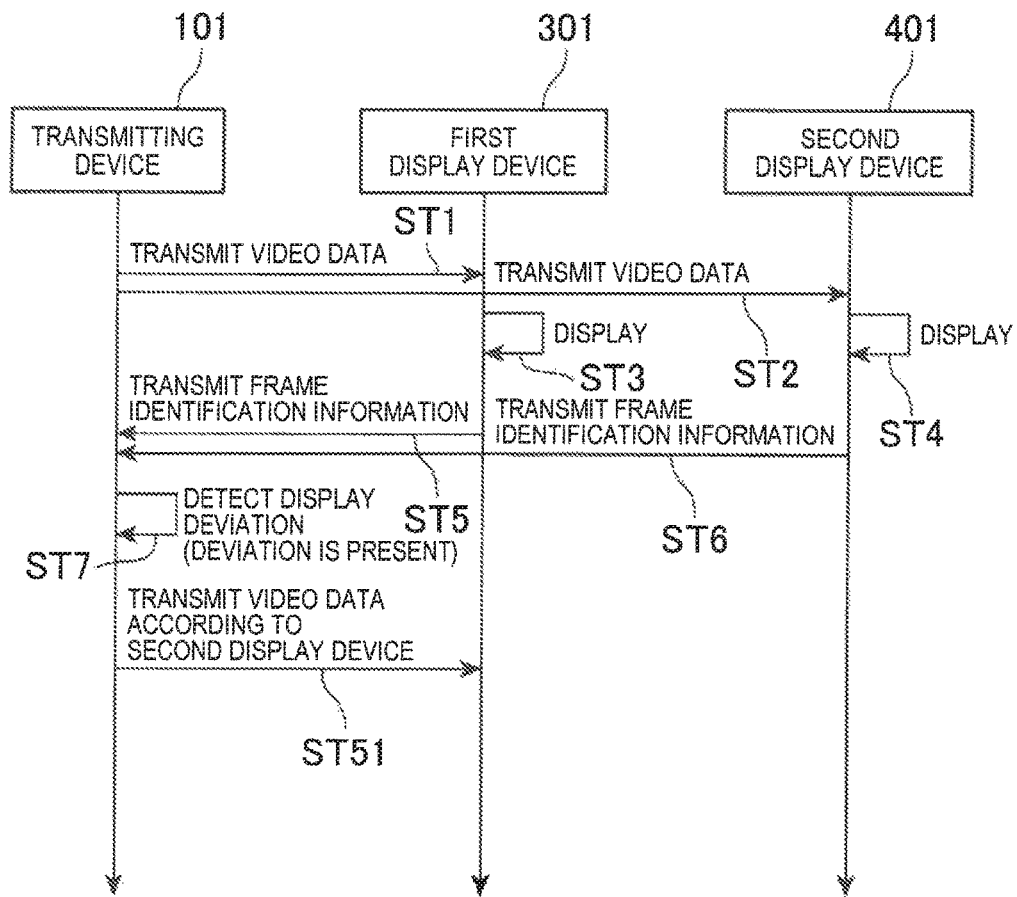
FIG. 36 is a sequence chart showing an operation example of the display system in the fourth embodiment.

FIG. 36 is a sequence chart showing the operation of the display system 1001 concerning the display deviation correction processing. Specifically, FIG. 36 shows an example in which the display system 1001 executes the display deviation correction processing according to the method (M6) described above.

Operations in steps ST1 to ST7 are processing same as the operations shown in FIGS. 31 and 35. Therefore, explanation of the operations is omitted.

In the example shown in FIG. 36, the control device 101 transmits data of a frame corresponding to a frame displayed by the second display device 401 to the first display device 301. For example, the control device 101 transmits, to the first display device 301, a frame displayed by the second display device 401 or the preceding frame or the next frame of the frame displayed by the second display device 401. Consequently, the frame displayed by the first display device 301 is delayed according to the second display device 401 delayed in display. Therefore, it is possible to eliminate display deviation.

That is, in FIG. 36, the control section 141 transmits, according to the shift amount detected in step ST7, that is, the number of frames deviating in display, a frame corresponding to the frame displayed by the second display device 401 to the first display device 301 (step ST51). In step ST45, the control section 141 may transmit frame identification information together with data of the frame. The control section 309 stores the data of the frame and the frame identification information transmitted by the control device 101 in the reception buffer 340 and displays the data of the frame and the frame identification information. In step ST51, the control section 141 may transmit control data for instructing reset of the reception buffer 340. In this case, the control section 309 clears the frame data 341 and the frame identification information 343 of the reception buffer 340 and then displays the frame transmitted in step ST51.

In the configuration explained in the embodiment, a configuration may be adopted in which the control device 101 transmits video data of a 3D (stereoscopic) video and the HMD 201 displays the 3D video on the basis of the 3D video data. In this case, frames of video data transmitted to the first display device 301 by the control device 101 and frames of video data transmitted to the second display device 401 by the control device 101 are video data having a parallax. In this case, when determining in step SA16 (FIG. 29) that display deviation is present, the control section 141 may switch a video displayed by the HMD 201 to a 2D (plane) video. Specifically, in the case of the affirmative determination in step SA16, the control section 141 starts transmission of frames of the same video data not having a parallax to the first display device 301 and the second display device 401. The control section 141 only has to transmit one of a frame for the right eye and a frame for the left eye forming 3D video data to both of the first display device 301 and the second display device 401. In this case, it is possible to prevent occurrence of an unpleasant feeling, a sense of discomfort, or so-called visually induced motion sickness of the user due to deviation between frames visually recognized by the left and right eyes.

Further, in step SA16, the control section 141 may have a plurality of references for determining that display deviation is present. For example, when the number of deviating frames is equal to or larger than a first threshold, the control section 141 may determine that display deviation is present (Yes in step SA16) and set display deviation correction processing for coping with the display deviation (step SA17). In this case, when the number of deviating frames is smaller than the first threshold and equal to or larger than a second threshold, the control section 141 may perform, for example, processing different from the display deviation correction processing illustrated in FIGS. 31 to 36. Specifically, when the number of deviating frames is smaller than the first threshold and equal to or larger than the second threshold, the control section 141 may perform the switching from a 3D video to a 2D video. When the number of deviating frames is smaller than the first threshold and equal to or larger than the second threshold, the control section 141 may execute the operation shown in FIG. 33 or FIG. 34 as the deviation correction processing. In this case, further, when the number of deviating frames is equal to or larger than the first threshold, the control section 141 may execute the operation shown in any one of FIGS. 31, 32, 35, and 36 as the deviation correction processing.

The first threshold and the second threshold may be determined according to a frame rate of the video data transmitted by the control device 101. For example, the first threshold may be set to the number of frames equivalent to 100 milliseconds. In this case, in video data of 30 fps (frames/second), three frames are equivalent to the first threshold. The second threshold only has to be a number smaller than the first threshold.

In the display system 1001, when the user wearing the HMD 201 is moving, a threshold related to processing for detecting occurrence of deviation may be changed to make the detection looser. The movement of the user may be determined from, for example, detection results of the various sensors included in the display system 1001. Specifically, the movement of the user only has to be determined from a picked-up image of the camera 61 and a detection value or a change in the detection value of the six-axis sensor 235, the magnetic sensor 237, the six-axis sensor 111, or the magnetic sensor 113. In this case, when a movement amount or speed or acceleration of the movement per unit time is equal to or larger than a set reference value, it is sufficient to switch the second threshold to the first threshold or change values of the first and second thresholds.

The display system 1001 in the fourth embodiment includes the control device 101 that transmits video data and the first display device 301 and the second display device 401 that display videos on the basis of the video data transmitted by the control device 101. The control device 101 includes the wireless communication sections 192 and 194 that wirelessly transmit video data formed by continuous frames to the first display device 301 and the second display device 401. The first display device 301 includes the wireless communication section 33 that receives the video data transmitted by the control device 101 and the OLED unit 221 that displays a video on the basis of the video data received by the wireless communication section 33. The wireless communication section 33 transmits, to the control device 101, frame identification information, which is information related to the video displayed by the OLED unit 221. The second display device 401 includes the wireless communication section 43 that receives the video data transmitted by the control device 101 and the OLED unit 241 that displays a video on the basis of the video data received by the wireless communication section 43. The wireless communication section 43 transmits, to the control device 101, frame identification information, which is information related to the video displayed by the OLED unit 241. The control device 101 includes the control section 141 that detects, on the basis of the information transmitted by the first display device 301 and the second display device 401, deviation between the video displayed by the OLED unit 221 and the video displayed by the OLED unit 241.

Consequently, when the control device 101 transmits the video data to the first display device 301 and the second display device 401, it is possible to detect deviation between the videos displayed by the first display device 301 and the second display device 401. Therefore, for example, since it is possible to detect deviation between timings for displaying the videos, it is possible to match the videos displayed by the plurality of display devices by taking measures against the deviation of this type.

The control device 101 transmits video data formed by frames to the first display device 301 and the second display device 401. The first display device 301 displays a video with the OLED unit 221 in units of frames on the basis of the video data received by the first video receiving section. The second display device 401 displays a video with the OLED unit 241 in units of frames on the basis of the video data received by the second video receiving section. The control section 141 detects deviation between a frame displayed by the OLED unit 221 and a frame displayed by the OLED unit 241. Consequently, it is possible to detect deviation between the frames displayed by the first display device 301 and the second display device 401. Therefore, it is possible to match display timings of the videos displayed by the plurality of display devices.

The control device 101 transmits the video data and frame identification information for identifying the respective frames of the video data. The first display device 301 transmits, with the first transmitting section, the frame identification information of the frame displayed by the OLED unit 221. The second display device 401 transmits, with the second transmitting section, the frame identification information of the frame displayed by the OLED unit 241. The control section 141 detects, on the basis of the frame identification information transmitted by the first display device 301 and the frame identification information transmitted by the second display device 401, deviation between the frame displayed by the OLED unit 221 and the frame displayed by the OLED unit 241. Consequently, since it is possible to identify the frames transmitted by the control device 101, it is possible to more accurately detect deviation between the frames displayed by the first display device 301 and the second display device 401.

When the frame displayed by the OLED unit 221 is a frame transmitted by the control device 101 later than the frame displayed by the OLED unit 241, the display system 1001 executes the display deviation correction processing.

The display system 1001 may reset, according to the method (M1) described above, the display of the frame received by the wireless communication section 43 in the second display device 401. In this case, the second display device 401 displays, with the OLED unit 221, a frame received by the wireless communication section 43 next. That is, when deviation between the frame displayed by the first display device 301 and the frame displayed by the second display device 401 is present, the display system 1001 resets the second display device 401, which is the display device on the display side of an old frame, that is, the display device on the delayed display side. Consequently, it is possible to eliminate display deviation between the first display device 301 and the second display device 401.

The display system 1001 may stop, according to the method (M2) described above, the display of the OLED unit 241 in the second display device 401. In this case, when display deviation between the first display device 301 and the second display device 401 occurs, the display system 1001 stops the display of the display device on the display side of an old frame, that is, the display device on the delayed display side. Consequently, it is possible to avoid a state in which the first display device 301 and the second display device 401 continue the display in a state in which the frames deviate.

The first display device 301 may include the reception buffer 340 that stores frames received by the wireless communication section 33. In this case, the display system 1001 may display, according to the method (M3) described above, the frames stored in the reception buffer 340 a plurality of times with the OLED unit 221 in the first display device 301. In this case, when display deviation between the first display device 301 and the second display device 401 occurs, the first display device 301, which is the display device on the display side of a new frame, that is, the display device on the advanced side of display displays the same frame a plurality of times. Consequently, it is possible to eliminate advance of a frame to be displayed and eliminate the display deviation between the first display device 301 and the second display device 401.

The display system 1001 may stop, according to the method (M4) described above, in the first display device 301, the display by the OLED unit 221 by time equivalent to time in which a predetermined number of frames are displayed. Thereafter, the first display device 301 displays, with the OLED unit 221, the frames stored in the reception buffer 340. In this case, when display deviation between the first display device 301 and the second display device 401 occurs, the first display device 301, which is the display device on the display side of a new frame, that is, the display device on the advanced display side, stops the display and eliminates advance of the frame to be displayed. Consequently, it is possible to eliminate the display deviation between the first display device 301 and the second display device 401.

The display system 1001 may transmit, according to the method (M5) described above, data of a frame corresponding to the frame displayed by the first display device 301 from the control device 101 to the second display device 401 and cause the second display device 401 to display the data. In this case, when display deviation between the first display device 301 and the second display device 401 occurs, the display system 1001 transmits data of a new frame to the second display device 401, which is the display device on the display side of an old frame, that is, the display device on the delayed display side, and causes the second display device 401 to display the data. Consequently, it is possible to eliminate the display deviation between the first display device 301 and the second display device 401. In this case, if a deviation amount of the display deviation between the first display device 301 and the second display device 401 is equal to or larger than a predetermined number, the display system 1001 may eliminate the deviation stepwise.

The display system 1001 may transmit, according to the method (M6) described above, data of a frame corresponding to the frame displayed by the second display device 401 from the control device 101 to the first display device 301 and cause the first display device 301 to display the data. In this case, when display deviation between the first display device 301 and the second display device 401 occurs, the display system 1001 transmits data of an old frame to the first display device 301, which is the display device on the display side of a new frame, that is, the display device on the advanced display side and causes the first display device 301 to display the data. Consequently, it is possible to eliminate the display deviation between the first display device 301 and the second display device 401.

The first display device 301 displays, with the OLED unit 221, in units of frames, an image based on video data received by the wireless communication section 33. The control section 309 detects deviation between the frame displayed by the OLED unit 221 and the frame displayed by the second display device 401. With this configuration, it is possible to detect deviation between the frame displayed by the first display device 301 and the frame displayed by the second display device 401. Therefore, it is possible to match display timings of the videos displayed by the first display device 301 and the second display device 401.

The first display device 301 receives, with the wireless communication section 33, frame identification information for identifying the respective frames included in the video data. Consequently, since it is possible to identify the frames received and displayed by the display devices. Therefore, it is possible to more accurately detect deviation between the frames displayed by the first display device 301 and the second display device 401.

The control section 309 detects deviation by comparing the frame identification information of the frame displayed by the OLED unit 221 and the frame identification information of the frame displayed by the second display device 401. With this configuration, since it is possible to identify the frames transmitted by the control device 101, it is possible to more accurately detect deviation between the frames displayed by the first display device 301 and the second display device 401.

The first display device 301 and the second display device 401 configure the HMD 201 functioning as a head-mounted display device. The first display device 301 includes the wireless communication section 33 that receives video data transmitted by the control device 101 and the OLED unit 221 that causes, on the basis of the video data received by the wireless communication section 33, one eye (the right eye) of the user to visually recognize a video. The second display device 401 includes the wireless communication section 43 that receives video data transmitted by the control device 101 and the OLED unit 241 that causes, on the basis of the video data received by the wireless communication section 43, the other eye (the left eye) of the user to visually recognize a video. In the HMD 201, each of the first display device 301 and the second display device 401 transmits information related to the videos displayed by the OLED units 221 and 241 to the control device 101. Consequently, the control device 101 can detect display states in the first display device 301 and the second display device 401. Therefore, for example, since it is possible to detect deviation between timings for displaying the videos, it is possible to match the videos visually recognized by the user by taking measures against the deviation of this type. It is possible to prevent or reduce a sense of discomfort or so-called visually induced motion sickness of the user due to deviation between the videos.

Note that the invention is not limited to the configurations of the embodiments and can be carried out in various forms without departing from the spirit of the invention. For example, in the embodiments, the configuration in which the user visually recognizes an outside scene through the display section is not limited to the configuration in which the right light guide plate 26 and the left light guide plate 28 transmit external light. For example, the invention is also applicable to a display device that displays an image in a state in which an outside scene cannot be visually recognized. Specifically, the invention can be applied to a display device that displays a picked-up image of the camera 61, an image and a CG generated on the basis of the picked-up image, a video based on video data stored in advance or video data input from the outside, and the like. The display device of this type can include a so-called closed type display device with which an outside scene cannot be recognized. The invention can also be applied to a display device that does not perform processing such as AR display for displaying an image to be superimposed on a real space as explained in the embodiment, MR (Mixed Reality) display for combining a picked-up image of a real space and a virtual image, or VR (Virtual Reality) display for displaying a virtual image. For example, a display device that displays video data or an analog video signal input from the outside is also naturally included in application targets of the invention.

In the embodiments, the example is explained in which a video is output by the HMD 20. However, sound may be output. For example, the display system 100 may adopt a configuration in which a sound output section such as a headphone or a speaker is connected to the sound interface 182 (FIG. 5) of the control device 10 by wire or radio to output sound. In this case, it is possible to output sound corresponding to a video that the HMD 20 causes the user to visually recognize. In this configuration, deviation between the video output by the HMD 20 and the sound may be detected. For example, the control device 10 transmits, to the first display 30, information indicating correspondence between output timings of frames of video data transmitted by the control device 10 and the sound. In this configuration, the control section 310 of the first display device 30 may detect deviation between timings of frames displayed by the OLED units 221 and 241 and sound output from the sound interface 182. The control device 10 may detect deviation between output timings of frames of video data transmitted to the first display device 30 and the second display device 40 and sound output by the sound interface 182. When the deviation between the output timings of the frames of the video data and the sound is detected, the control device 10 may correct the deviation according to a method of, for example, temporarily stopping the sound or omitting a part of the sound and fast-forwarding the sound. These configurations are the same concerning the HMDs 20A, 20B, and 201, the first display devices 30A, 30B, and 301, the second display devices 40A and 401, and the display systems 100A, 100B, and 1001.

A configuration may be adopted in which sound data or a sound signal is transmitted from the control device 10 to each of the first display device 30 and the second display device 40 and each of the first display device 30 and the second display device 40 outputs sound. In this case, the control device 10 may encode the sound data or the sound signal or superimpose frame identification information of frames of video data on the sound data or the sound signal and transmit the frame identification information. These configurations are the same concerning the HMDs 20A, 20B, and 201, the first display devices 30A, 30B, and 301, the second display devices 40A and 401, the control device 101, and the display systems 100A, 100B, and 1001.

The display system 100 may transmit video data based on picked-up image data picked up by the camera 61 from the control device 10 to the first display device 30 and the second display device 40. In this case, the HMD 20 displays a picked-up image of the camera 61 with the first display device 30 and the second display device 40. In this configuration, time until the picked-up image picked up by the camera 61 is displayed by the first display device 30 or the second display device 40 may be detected as deviation between image pickup timing of the camera 61 and display timing. These configurations are the same concerning the HMDs 20A, 20B, and 201, the first display devices 30A, 30B, and 301, the second display devices 40A and 401, the control device 101, and the display systems 100A, 100B, and 1001.

In this case, the control section 150 performs processing for generating video data for display from the picked-up image data of the camera 61. When deviation is detected or when an amount of the detected deviation is equal to or larger than a threshold set in advance, the control section 150 may perform processing for correcting or suppressing the deviation. For example, the control section 150 sets a frame rate of video data for display generated from the picked-up image data of the camera 61 to a first frame rate set as a default value. When deviation between the image pickup timing of the camera 61 and the display timing is detected or when a deviation amount is equal to or larger than a predetermined time, the control section 150 may change the frame rate to a second frame rate lower than the first frame rate. For example, the control section 150 sets resolution of the video data for display generated from the picked-up image data of the camera 61 to first resolution set as a default value. When deviation between the image pickup timing of the camera 61 and the display timing is detected and a deviation amount is equal to or larger than the predetermined time, the control section 150 may change the resolution to second resolution lower than the first resolution. In these cases, it is possible to accelerate processing for generating video data and processing required for display of the video data. Therefore, elimination or suppression of deviation can be expected. In order to eliminate deviation that has already occurred, a part of the picked-up image data of the camera 61 may be omitted in the processing for generating video data. The reception buffers 340 and 440 that temporarily store frames of video data in the first display device 30 and the second display device may be cleared. These configurations are the same concerning the HMDs 20A, 20B, and 201, the first display devices 30A, 30B, and 301, the second display devices 40A and 401, the control device 101, and the display systems 100A, 100B, and 1001.

When the user wearing the HMD 20 is moving, the frame rate and the resolution may be reduced. In this case, in a situation in which the user cannot easily sense the reduction in the frame rate and the resolution, it is possible to reduce a load of processing in the display system 100 and suppress or eliminate deviation. As explained above, the movement of the user may be determined from, for example, detection results of the various sensors included in the display system 100. Specifically, the movement of the user only has to be detected from a picked-up image of the camera 61 or detection values or changes in the detection values of the six-axis sensor 235, the magnetic sensor 237, the six-axis sensor 111, or the magnetic sensor 113. In this case, a movement amount per unit time or speed or acceleration of the movement is equal to or larger than a set reference value, the setting may be changed to reduce the frame rte and the resolution. These configurations are the same concerning the HMDs 20A, 20B, and 201, the first display devices 30A, 30B, and 301, the second display devices 40A and 401, the control device 101, and the display systems 100A, 100B, and 1001.

In the display system 100, when deviation is detected or a deviation amount is equal to or larger than the predetermined time, a band of communication between the control device 10 and the first display device 30 and/or between the control device 10 and the second display device 40 may be changed. In this case, the deviation may be suppressed by expanding the communication band and achieving an increase in the speed of the communication. When a frame rate and/or resolution of frames of video data is changed in the display system 100, the band may be changed to a band corresponding to the frame rate and/or the resolution. These configurations are the same concerning the HMDs 20A, 20B, and 201, the first display devices 30A, 30B, and 301, the second display devices 40A and 401, the control device 101, and the display systems 100A, 100B, and 1001.

A specific form of wireless communication between the control device 10 and the first display device 30 and/or between the control device 10 and the second display device 40 is optional. The same applies to wireless communication between the first display devices 30A and 30B and the second display device 40A, wireless communication between the first display device 30 and the second display device 40, and wireless communication between the first display devices 30A and 30B and the second display device 40A. For example, frames of video data or frame identification information may be transmitted and received using packet communication. In this case, an apparatus on a packet receiving side may transmit an ACK (ACKnowledgment) packet and detect deviation using the ACK packet. These configurations are the same concerning the HMDs 20A, 20B, and 201, the first display devices 30A, 30B, and 301, the second display devices 40A and 401, the control device 101, and the display systems 100A, 100B, and 1001.

The HMD 20 only has to be mounted on the head of the user to display an image. For example, display sections of other types such as a display section including a frame worn like a cap may be adopted instead of the frame of the HMD 20. The display system 100 only has to include a first display device that displays an image corresponding to the left eye of the user and a second display device that displays an image corresponding to the right eye of the user. The display device of the invention may be configured as a head mounted display mounted on vehicles such as an automobile and an airplane. The display device may be configured as a head mounted display incorporated in a body protector such as a helmet. In this case, a portion for positioning a position with respect to the body of the user and a portion positioned with respect to the portion can be set as mounting sections. These configurations are the same concerning the HMDs 20A, 20B, and 201, the first display devices 30A, 30B, and 301, the second display devices 40A and 401, the control device 101, and the display systems 100A, 100B, and 1001.

Further, in the embodiments, the configuration in which the HMDs 20, 20A, and 20B and the control device 10 are separated and connected by the wireless communication line is explained as an example. However, the control device 10 and the HMDs 20, 20A, and 20B may be connected by wire. As the control device 10, a notebook computer, a tablet computer, or a desktop computer may be used. As the control device 10, portable electronic devices including a game machine, a cellular phone, a smartphone, and a portable media player, other dedicated devices, and the like may be used. These configurations are the same concerning the HMDs 20A, 20B, and 201, the first display devices 30A, 30B, and 301, the second display devices 40A and 401, the control device 101, and the display systems 100A, 100B, and 1001.

In the embodiments, as the optical system that guides image light to the eyes of the user, the configuration is illustrated in which virtual images are formed in a part of the right light guide plate 26 and the left light guide plate 28 by the half mirrors 261 and 281. The invention is not limited to this. An image may be displayed in a display region having an area occupying the entire or most of the surfaces of the right light guide plate 26 and the left light guide plate 28. In this case, processing for reducing an image may be included in an operation for changing a display position of the image.

Further, the optical element of the invention is not limited to the right light guide plate 26 and the left light guide plate 28 including the half mirrors 261 and 281 and only has to be an optical component that makes image light incident on the eyes of the user. Specifically, a diffraction grating, a prism, and a holography display section may be used.

At least a part of the functional blocks shown in FIGS. 5, 17, 23, 26, and the like may be implemented by hardware or may be implemented by cooperation of hardware and software. The display system is not limited to the configuration in which the independent hardware resources are disposed as shown in the figures. The computer programs to be executed by the control section 150 may be stored in the nonvolatile storing section 121 or other storage devices (not shown in the figure) in the control device 10. The control section 150 may acquire computer programs stored in an external device via the communication section 117 and the external connector 184 and execute the computer programs. Among the components formed in the control device 10, the operation section 110 may be formed as a user interface (UI).

The entire disclosure of Japanese Patent Application Nos. 2016-064878, filed Mar. 29, 2016 and 2016-064879, filed Mar. 29, 2016 are expressly incorporated by reference herein.

What is claimed is:

1. A display system comprising:
a transmitting device configured to transmit video data; and
a first display device and a second display device configured to display videos on the basis of the video data transmitted by the transmitting device, wherein
the transmitting device includes a data transmitting section configured to wirelessly transmit the video data formed by continuous frames to the first display device and the second display device,
the first display device includes:
a first video receiving section configured to receive the video data transmitted by the transmitting device; and
a first display section configured to display a video on the basis of the video data received by the first video receiving section, to only a first eye of the user to visually recognize the video,
the second display device, that is separate from the first display device, includes:
a second video receiving section configured to receive the video data transmitted by the transmitting device; and
a second display section configured to display a video on the basis of the video data received by the second video receiving section, to only a second eye of the user to visually recognize a video, and
the display system detects deviation between (1) timing of displaying frames of the video displayed by the first display section and visually recognized by the first eye and (2) timing of displaying frames of the video displayed by the second display section and visually recognized by the second eye.

2. The display system according to claim 1, wherein
the first display device includes a first inter-device communication section configured to communicate with the second display device,
the second display device includes a second inter-device communication section configured to communicate with the first display device, and
the first inter-device communication section included in the first display device and the second inter-device communication section included in the second display device execute the communication to detect the deviation between the video displayed by the first display section and the video displayed by the second display section.

3. The display system according to claim 2, wherein
the transmitting device transmits the video data formed by frames,
the first display device displays the video with the first display section in units of frames on the basis of the video data received by the first video receiving section,
the second display device displays the video with the second display section in units of frames on the basis of the video data received by the second video receiving section, and the first inter-device communication section and the second inter-device communication section execute the communication to detect deviation between the frame displayed by the first display section and the frame displayed by the second display section.

4. The display system according to claim 3, wherein
the transmitting device transmits the video data and frame identification information for identifying the respective frames of the video data, and
the first inter-device communication section and the second inter-device communication section execute the communication to compare frame identification information of the frame displayed by the first display section and frame identification information of the frame displayed by the second display section and detect deviation.

5. The display system according to claim 4, wherein
the first display device transmits data including the frame identification information of the frame displayed by the first display section to the second display device with the first inter-device communication section, and
the second display device receives the data transmitted by the first display device with the second inter-device communication section, compares the frame identification information included in the data received by the second inter-device communication section with the frame identification information of the frame displayed by the second display section, and detects deviation.

6. The display system according to claim 4, wherein, when the frame displayed by the first display section is a frame transmitted by the transmitting device later than the frame displayed by the second display section, the second display device resets display of the frames received by the second video receiving section and displays, with the first display section, the frames received by the second video receiving section next.

7. The display system according to claim 3, wherein, when the frame displayed by the first display section is a frame transmitted by the transmitting device later than the frame displayed by the second display section, the second display device stops the display of the second display section.

8. The display system according to claim 3, wherein
the first display device includes a storing section configured to store the frames received by the first video receiving section, and
when the frame displayed by the first display section is a frame transmitted by the transmitting device later than the frame displayed by the second display section, the first display device displays the frames stored in the storing section a plurality of times with the first display section.

9. The display system according to claim 3, wherein
the first display device includes a storing section configured to store the frames received by the first video receiving section, and
when the frame displayed by the first display section is a frame transmitted by the transmitting device later than the frame displayed by the second display section, the first display device stops the display by the first display section by time equivalent to time for displaying a predetermined number of the frames and thereafter displays the frames stored in the storing section with the first display section.

10. The display system according to claim 1, wherein
the first display device includes a first transmitting section configured to transmit information related to the video displayed by the first display section to the transmitting device,
the second display device includes a second transmitting section configured to transmit information related to the video displayed by the second display section to the transmitting device, and
the transmitting device includes a control section configured to detect, on the basis of the information transmitted by the first display device and the second display device, deviation between the video displayed by the first display section and the video displayed by the second display section.

11. The display system according to claim 10, wherein
the transmitting device transmits the video data formed by the frames,
the first display device displays the video with the first display section in units of frames on the basis of the video data received by the first video receiving section,
the second display device displays the video with the second display section in units of frames on the basis of the video data received by the second video receiving section, and
the control section included in the transmitting device detects deviation between the frame displayed by the first display section and the frame displayed by the second display section.

12. The display system according to claim 11, wherein
the transmitting device transmits the video data and frame identification information for identifying the respective frames of the video data,
the first display device transmits, with the first transmitting section, the frame identification information of the frame displayed by the first display section,
the second display device transmits, with the second transmitting section, the frame identification information of the frame displayed by the second display section, and
the control device included in the transmitting device detects, on the basis of the frame identification information transmitted by the first display device and the frame identification information transmitted by the second display device, deviation between the frame displayed by the first display section and the frame displayed by the second display section.

13. The display system according to claim 10, wherein, when the frame displayed by the first display section is a frame transmitted from the transmitting device later than the frame displayed by the second display section, the transmitting device transmits the video data corresponding to the frame displayed by the first display section to the second display device.

14. The display system according to claim 10, wherein, when the frame displayed by the first display section is a frame transmitted from the transmitting device later than the frame displayed by the second display section, the transmitting device transmits control data for instructing a stop of the display of the first display section to the second display device.

15. The display system according to claim 10, wherein, when the frame displayed by the first display section is a frame transmitted from the transmitting device later than the frame displayed by the second display section, the transmitting device transmits the video data corresponding to the frame displayed by the second display section to the first display device.

16. The display system according to claim 10, wherein, when the frame displayed by the first display section is a frame transmitted from the transmitting device later than the frame displayed by the second display section, the transmitting device transmits control data for instructing a stop of the display of the second display section to the first display device.

17. A head-mounted display device mounted on a head of a user, the head-mounted display device comprising a first display device and a second display device configured to receive video data and display videos on the basis of the received video data, wherein
the first display device includes:
a first video receiving section configured to receive the video data;
a first display section configured to cause, on the basis of the video data received by the first video receiving section, only one eye of the user to visually recognize the video; and
a first inter-device communication section configured to communicate with the second display device,
the second display device, that is separate from the first display device, includes:
a second video receiving section configured to receive the video data;
a second display section configured to cause, on the basis of the video data received by the second video receiving section, only the other eye of the user to visually recognize a video; and
a second inter-device communication section configured to communicate with the first display device, and
the first inter-device communication section included in the first display device and the second inter-device communication section included in the second display device execute the communication to detect deviation between (1) timing of displaying frames of the video displayed by the first display section and visually recognized by the one eye and (2) timing of displaying frames of the video by the second display section visually recognized by the other eye of the user.

18. A head-mounted display device mounted on a head of a user, the head-mounted display device comprising a first display device and a second display device configured to receive video data transmitted by a transmitting device and display videos on the basis of the received video data, wherein
the first display device includes:
a first video receiving section configured to receive the video data transmitted by the transmitting device;
a first display section configured to cause, on the basis of the video data received by the first video receiving section, only one eye of the user to visually recognize a video; and
a first transmitting section configured to transmit frame identification information identifying frames of the video displayed by the first display section to the transmitting device, and
the second display device, that is separate from the first display device, includes:
a second video receiving section configured to receive the video data transmitted by the transmitting device;
a second display section configured to cause, on the basis of the video data received by the second video receiving section, only the other eye of the user to visually recognize a video; and
a second transmitting section configured to transmit frame identification information identifying frames of the video displayed by the second display section to the transmitting device,
wherein deviation is detected between (1) timing of displaying frames of the video displayed by the first display section and visually recognized by the one eye and (2) timing of displaying frames of the video displayed by the second display section and visually recognized by the other eye.

19. A display control method in a display system including a transmitting device that transmits video data and a first display device and a second display device that display videos on the basis of the video data transmitted by the transmitting device, the first display device being separate from the first display device, the display control method comprising:

the transmitting device wirelessly transmitting the video data formed by continuous frames to the first display device and the second display device;

the first display device receiving the video data transmitted by the transmitting device and displaying a video with a first display section on the basis of the received video data, to only a first eye of a user to visually recognize the video;

the second display device receiving the video data transmitted by the transmitting device and displaying a video with a second display section on the basis of the received video data, to only a second eye of the user to visually recognize a video; and detecting deviation between (1) timing of displaying frames of the video displayed by the first display section and visually recognized by the first eye and (2) timing of displaying frames of the video displayed by the second display section and visually recognized by the second eye.

* * * * *